United States Patent
Kato et al.

(10) Patent No.: US 8,256,593 B2
(45) Date of Patent: Sep. 4, 2012

(54) DRIVING FORCE TRANSMITTING DEVICE

(75) Inventors: Tadahiko Kato, Kosai (JP); Tatsuya Suzuki, Kosai (JP); Akira Nakabayashi, Kosai (JP); Yosuke Masuda, Kosai (JP); Masahiro Takada, Kosai (JP); Yoshitaka Onishi, Kosai (JP)

(73) Assignee: Univance Corporation, Shizuoka (JP)

( * ) Notice: Subject to any disclaimer, the term of this patent is extended or adjusted under 35 U.S.C. 154(b) by 1158 days.

(21) Appl. No.: 12/077,746

(22) Filed: Mar. 21, 2008

(65) Prior Publication Data
US 2008/0277240 A1 Nov. 13, 2008

(30) Foreign Application Priority Data

Mar. 27, 2007 (JP) ................................. 2007-082961
Jun. 20, 2007 (JP) ................................. 2007-162033

(51) Int. Cl.
*F16D 48/06* (2006.01)
*F16D 25/10* (2006.01)
(52) U.S. Cl. .......... 192/35; 192/48.606; 192/49; 74/650
(58) Field of Classification Search .................... 192/35, 192/48.606, 49, 85.49
See application file for complete search history.

(56) References Cited

U.S. PATENT DOCUMENTS

| 5,746,677 | A | 5/1998 | Wakahara et al. |
| 6,349,809 | B1 * | 2/2002 | Isley, Jr. ..................... 192/35 |
| 2001/0011622 | A1 | 8/2001 | Arai |
| 2003/0094343 | A1 | 5/2003 | Showalter |
| 2004/0159523 | A1 | 8/2004 | Duan |
| 2005/0217921 | A1 | 10/2005 | Mori et al. |
| 2007/0023252 | A1 | 2/2007 | Sachsenmaier |

FOREIGN PATENT DOCUMENTS

| EP | 1256478 | 11/2002 |
| EP | 1 371 868 A1 | 12/2003 |
| EP | 1 561 628 A2 | 8/2005 |
| EP | 1559606 | 8/2005 |
| JP | 10-86686 | 4/1998 |
| JP | 2001-206092 | 7/2001 |
| JP | 2003-194104 | 7/2003 |
| JP | 2005-289160 | 10/2005 |
| JP | 2006-070985 | 3/2006 |
| WO | WO 2005/064187 | 7/2005 |

* cited by examiner

*Primary Examiner* — Richard M. Lorence
(74) *Attorney, Agent, or Firm* — Muramatsu & Associates

(57) ABSTRACT

A driving force transmitting devices is able to engage a main clutch with a small amount of hydraulic pressure. The driving force transmitting device includes an input shaft and an output shaft, and a main clutch. The device is formed of a primary clutch that intermittently transmits the driving force transmitted from the input shaft, a hydraulic pump that generates a hydraulic pressure, a piston that presses the primary clutch with the hydraulic pressure by the hydraulic pump, and a cam mechanism that presses the main clutch with a press-contact force which is amplified to be larger than the press-contact force of the piston by utilizing the driving force from the input shaft through the primary clutch, so as to engage the main clutch.

18 Claims, 18 Drawing Sheets

10 : Power plant
20 : Transmission
21 : Transmission section
30 : Longitudinal driving force distributing section
31 : Distributing section
32 : Front-wheel differential section
100a : Driving force adjusting section
100b : Driving force adjusting section

DRIVING FORCE TRANSMITTING DEVICE

BACKGROUND OF THE INVENTION

1. Technical Field

The present invention relates to driving force transmitting devices, and more particularly to a driving force transmitting device that can engage a main clutch with a small amount of hydraulic pressure.

2. Background Art

A driving force transmitting device provided with a main clutch that intermittently transmits a driving force transmitted from an input shaft to an output shaft has conventionally been known. As to the technique of engaging the main clutch, Japanese Patent Application Laid-Open Publication No. 2001-206092, for example, discloses a technique in which a working fluid 30 is supplied from an oil pump 32 to a piston 26 and a multiple disc clutch 23 serving as a main clutch is pressed by the piston 26 so as to engage the multiple disc clutch 23.

PROBLEM TO BE SOLVED BY THE INVENTION

However, in the technique disclosed in Publication No. 2001-206092 note above, the main clutch is pressed by the piston, so that there are the following problems. Specifically, a press-contact force F for engaging the main clutch is defined by a hydraulic pressure P and a magnitude of a sectional area A of the piston. Therefore, when the press-contact force F necessary for engaging the main clutch is large, at least one of the hydraulic pressure P and the sectional area A of the piston must be increased.

When the sectional area A of the piston is set to be large, there arise problems of deteriorating responsiveness, increasing a size or a weight of a unit with the increase in size of the piston, and the like. Therefore, the sectional area A of the piston cannot be increased, and hence, the hydraulic pressure P should be increased. However, when the hydraulic pressure P is set to be high, a large pump that can generate a high hydraulic pressure P and a corresponding motor are required, thereby entailing a problem of increasing a size and weight of a motor. Further, when a high-torque state is maintained, a load to the motor becomes high, with the result that heat rises, which results in burnout of the motor.

SUMMARY OF THE INVENTION

The present invention is accomplished in view of the foregoing problems, and aims to provide a driving force transmitting device that engages a main clutch with a small hydraulic pressure and can secure quick responsiveness.

In order to attain the object, a driving force transmitting device according to the first aspect of the invention includes a power plant, i.e., an engine that generates a driving force, an input, shaft to which the driving force generated by the engine is inputted, an output shaft to which the driving force inputted to the input shaft is outputted, and a main clutch that intermittently transmits the driving force transmitted to the output shaft from the input shaft, the driving force transmitting device comprising a primary clutch that intermittently transmits the driving force transmitted from the input shaft where the primary clutch is located between the input shaft and the main clutch; a hydraulic pump that generates a hydraulic pressure; a piston that presses the primary clutch with the hydraulic pressure generated by the hydraulic pump; and a cam mechanism that is fitted to the primary clutch, and that presses the main clutch with a press-contact force which is amplified to be larger than the press-contact force of the piston by utilizing the driving force inputted from the input shaft through the primary clutch with the primary clutch engaged by the piston, so as to engage the main clutch.

A driving force transmitting device according to the second aspect of the invention includes, in the driving force transmitting device according to the first aspect, an electric motor for driving the hydraulic pump, hydraulic pressure detecting means for detecting the hydraulic pressure in the supply path communicating with the piston from the hydraulic pump, and control means for controlling the electric motor on the basis of the result of the detection by the hydraulic pressure detecting means.

A driving force transmitting device according to the third aspect of the invention is such that, in the driving force transmitting device according to the second aspect, the cam mechanism includes a primary cam that is fitted to the primary clutch, a main cam that is arranged so as to be opposite to the primary cam and fitted to the output shaft so as to be movable for pressing the main clutch, a cam follower arranged between the main cam and the primary cam so as to be movable, and a cam groove that is a moving path of the cam follower and is formed on at least one of the surface of the main cam opposite to the primary cam and the surface of the primary cam opposite to the main cam in such a manner that the depth thereof continuously changes.

A driving force transmitting device according to the fourth aspect of the invention includes, in the driving force transmitting device according to the third aspect, a biasing member that is arranged between the main clutch and the main cam for biasing the main cam in the direction reverse to the direction in which the main cam presses the main clutch.

A driving force transmitting device according to the fifth aspect of the invention is such that, in addition to the fourth aspect, the control means controls the electric motor such that an initial pressure necessary for filling the supply path with the liquid or the initial pressure higher than the sliding resistance of the piston in order to prevent the backlash of the primary clutch is always applied to the liquid in the supply path.

A driving force transmitting device according to the seventh aspect of the invention is such that, in addition to the sixth aspect, the main clutch, the primary clutch, the piston, the cam mechanism, the output shaft, and the biasing member are arranged at both sides across the input shaft, each of the output shafts is a rear wheel axle to which a rear wheel is mounted, and the device includes a gear mechanism that is coupled to the input shaft, and is set thereto a transmission gear ratio for rotating the input shaft with the speed higher than the speed of at least one of a pair of front wheel axles to which each of a pair of front wheels is mounted.

A driving force transmitting device according to eighth aspect of the invention is such that, in the driving force transmitting device according to the fourth aspect, the biasing member is composed of a disc spring into which the output shaft is inserted.

A driving force transmitting device according to the ninth aspect of the invention is such that, in the driving force transmitting device according to the first aspect, a friction member of the primary clutch is made of a sheet material.

A driving force transmitting device according to the tenth aspect of the invention is such that, in the driving force transmitting device according to the second aspect, the control means includes initial value setting means for setting the hydraulic pressure detected by the hydraulic pressure detecting means with the electric motor stopped as the initial value detected by the hydraulic pressure detecting means, correcting means for correcting the actual hydraulic pressure detected by the hydraulic pressure detecting means on the basis of the initial value set by the initial value setting means, and hydraulic pressure adjusting means that adjusts the pressure of the liquid fed to the supply path from the hydraulic pump by driving or stopping the electric motor on the basis of the hydraulic pressure corrected by the correcting means, so as to adjust the hydraulic pressure in the supply path.

In the tenth aspect, the case of pressing the primary clutch by the piston includes the case in which the primary clutch is directly pressed by the piston and the case in which the other member is pressed by the piston and the other member indirectly presses the primary clutch.

As disclosed in Japanese Patent Application Laid-Open Publication No. 10-86686, a transfer device has been known that includes a device main body capable of connecting an input shaft and an output shaft, a hydraulic actuator connected to the device main body through a pipe, and a control circuit for controlling the hydraulic actuator. Provided to the device main body are a multiple disc clutch that transmits a torque inputted to the input shaft to the output shaft and a piston for pressing the multiple disc clutch, and a motor that supplies a hydraulic pressure for moving the piston to the pipe is mounted to the hydraulic actuator. The hydraulic pressure in the pipe is detected by a pressure sensor, and the motor is driven by the control circuit on the basis of the hydraulic pressure detected by the pressure sensor, thereby adjusting the hydraulic pressure in the pipe.

In general, the control circuit that controls the hydraulic pressure in the pipe with the drive of the motor performs a feedback control on the basis of the hydraulic pressure in the pipe detected by the pressure sensor. In the feedback control, a table that stores beforehand the hydraulic pressure actually detected by the pressure sensor and the value of the current flowing through the motor as associated with each other is referred to so as to set the value of the current that is to be flown in the motor, in order to adjust the hydraulic pressure in the pipe. Therefore, the hydraulic pressure in the pipe can be set to a desired hydraulic pressure by performing the feedback control, whereby the driving force transmitted from the input shaft to the output shaft can be adjusted.

However, although the hydraulic pressure in the pipe can be set to a desired hydraulic pressure by performing the feedback control on the basis of the value detected by the pressure sensor (hydraulic pressure detecting means), the detected value of the hydraulic pressure varies depending upon a product, since there is a manufacturing variation, such as a size of a component, in a pressure sensor. Therefore, when the value of the current that is to be flown in the motor is set by referring to the table that stores beforehand the hydraulic pressure actually detected by the pressure sensor and the value of the current flowing through the motor as associated with each other, the hydraulic pressure in the supply path cannot be adjusted to a desired hydraulic pressure, since the detected value of the hydraulic pressure varies for every pressure sensor. Accordingly, there arises a problem that the driving force cannot correctly be transmitted from the input shaft to the output shaft.

Further, as for the pressure sensor, the detected value of the hydraulic pressure varies due to not only the manufacturing variation, such as the size of the component, but also the ambient temperature of the place where the pressure sensor is installed, and moreover, the detected value of the hydraulic pressure varies due to the deterioration according to the duration of service.

The driving force transmitting device according to the tenth aspect is accomplished in order to solve the above-described problem, and aims to provide a driving force transmitting device capable of reducing the variation in the hydraulic pressure detected by the hydraulic pressure detecting means so as to be capable of adjusting the hydraulic pressure in the supply path to a desired hydraulic pressure.

A driving force transmitting device according to the eleventh aspect of the invention is such that, in the driving force transmitting device according to the tenth aspect, the initial value setting means includes negative pressure generating means that sucks the liquid in the supply path by the hydraulic pump by inversely rotating the electric motor so as to adjust the hydraulic pressure in the supply path to a negative pressure, and time determining means that determines whether or not a predetermined time has elapsed after the hydraulic pressure in the supply path is adjusted to the negative pressure by the negative pressure generating means and the inverse rotation of the electric motor is stopped, wherein, when the time determining means determines that the predetermined time has elapsed, the hydraulic pressure detected by the hydraulic pressure detecting means is set as the initial value detected by the hydraulic pressure detecting means.

The predetermined time determined by the time determining means in the eleventh aspect is more than the time taken for the hydraulic pressure in the supply path to be adjusted from the negative pressure to the zero pressure (atmospheric pressure) after the inverse rotation of the electric motor is stopped.

A driving force transmitting device according to the twelfth aspect of the invention is such that, in the driving force transmitting device according to the eleventh aspect, the initial value setting means includes hydraulic pressure initial value adjusting means that adjusts the hydraulic pressure in the supply path to the hydraulic pressure corresponding to the initial value set beforehand through the drive of the electric motor; wherein the negative pressure generating means inversely rotates the electric motor so as to adjust the hydraulic pressure in the supply path to the negative pressure after the hydraulic pressure in the supply path is adjusted to the hydraulic pressure corresponding to the initial value by the hydraulic pressure initial value adjusting means.

In the twelfth aspect, the predetermined initial value may be the initial value previously set by the initial value setting means or may be the hydraulic pressure value by which the hydraulic pressure in the supply path is stabilized and that is set on the basis of the shape of the supply path or the performance of the electric motor (or hydraulic pump).

A driving force transmitting device according to the thirteenth aspect of the invention is such that, in addition to the eleventh or twelfth aspect, the minimum value of the negative pressure by which the hydraulic pressure detecting means can be used from the viewpoint of durability is set beforehand to the hydraulic pressure detecting means, and the negative pressure generating means sets the driving condition of the electric motor such that the hydraulic pressure in the supply path assumes the value larger than the minimum value of the negative pressure by which the hydraulic pressure detecting means can be used.

A driving force transmitting device according to the fourteenth aspect of the invention is such that, in the driving force transmitting device according to the eleventh aspect, a stand-by time of the electric motor necessary for the period from the time when the electric motor is started to be driven to the time when the electric motor is stopped is determined, and the negative pressure generating means sets the driving condition of the electric motor such that the time from when the electric motor is inversely rotated to the time when the predetermined time has elapsed after the stop of the electric motor is within the stand-by time.

A driving force transmitting device according to the fifteenth aspect of the invention is such that, in addition to the eleventh aspect, the minimum value of the negative pressure by which the hydraulic pressure detecting means can be used from the viewpoint of durability is set beforehand to the hydraulic pressure detecting means, and the supply path has formed thereto a communication opening that communicates the supply path and an outer air chamber, wherein the opening amount of the communication opening is set such that, when the electric motor is inversely rotated, the hydraulic pressure in the supply path, which is determined on the basis of a first flow rate sucked from the supply path by the hydraulic pump and a second flow rate of air entering the supply path from the communication opening, becomes the value larger than the minimum value of the negative pressure by which the hydraulic pressure detecting means can be used.

A driving force transmitting device according to the sixteen aspect of the invention is such that, in the driving force transmitting device according to the eleventh aspect, a stand-by time of the electric motor necessary for the period from the time when the electric motor is started to be driven to the time when the electric motor is stopped is determined, and the supply path has formed thereto a communication opening that communicates the supply path and an outer air chamber, wherein the opening amount of the communication opening is set such that the time taken for the air to be flown from the communication opening and for the pressure in the supply path to be recovered to the atmospheric pressure after the stop of the electric motor after the electric motor is inversely rotated is within the stand-by time.

In any one of thirteenth to sixteenth aspects, the driving condition of the electric motor set by the negative pressure setting means includes, for example, the revolution speed, revolution time, total revolution, etc. of the electric motor.

A driving force transmitting device according to the seventeenth aspect of the invention includes, in the driving force transmitting device according to the tenth aspect, instruction detecting means that detects the instruction for starting or stopping the control of the transmission of the driving force from the input shaft to the output shaft by the main clutch or the primary clutch, wherein the initial value setting means sets the initial value by detecting the hydraulic pressure by the hydraulic pressure detecting means every time the instruction detecting means detects the instruction for starting the control of the transmission of the driving force or every time the instruction detecting means detects the instruction for stopping the control of the transmission of the driving force.

The instruction detecting means in the seventeenth aspect may detect the supply or stop of the supply of the power to the electric motor. Alternatively, it may detect the operation of a key for starting or stopping a vehicle or the like. In the configuration of detecting the key operation, the initial value setting means preferably sets the initial value immediately after the key is operated to the start side (ignition-ON) or immediately after the key is operated to the stop side (ignition-OFF). This is because the influence to the control of the transmission of the driving force from the input shaft to the output shaft in a normal state is reduced.

A driving force transmitting device according to the eighteenth aspect of the invention is such that, in the driving force transmitting device according to the tenth aspect, the negative pressure generating means inversely rotates the electric motor such that, when the electric motor is normally rotated to move the piston in the maximum moving amount, the liquid in a flow rate greater than a third flow rate that is supplied in the supply path is sucked from the supply path.

When the supply path is mechanically elastically deformed and when the gas contained in the supply path (mainly in the liquid) is compressed and deformed, the third flow rate supplied into the supply path includes the flow rate supplied with the mechanical elastic deformation of the supply path itself and the flow rate supplied with the compressed deformation of the gas included in the flow path.

A driving force transmitting device according to the nineteenth aspect of the invention includes, in the driving force transmitting device according to the tenth aspect, temperature detecting means for detecting the temperature in the vicinity where the hydraulic pressure detecting means is provided, and hydraulic pressure temperature correcting means for correcting the hydraulic pressure detected by the hydraulic pressure detecting means according to the temperature detected by the temperature detecting means.

According to the driving force transmitting device according to the first aspect, in case where the main clutch is engaged, the piston presses the primary clutch by the hydraulic pressure generated by the hydraulic pump, whereby the primary clutch is engaged. After the primary clutch is engaged, the cam mechanism that is fitted to the primary clutch presses the main clutch with a press-contact force, which is amplified more than the press-contact force of the piston, by utilizing the driving force inputted from the input shaft through the primary clutch, whereby the main clutch is engaged. Specifically, since the main clutch is pressed by the cam mechanism with the press-contact force, which is amplified more than the press-contact force of the piston, by utilizing the driving force inputted from the input shaft through the primary clutch, a small hydraulic pressure is enough for pressing the primary clutch. Therefore, the driving force transmitting device provides an effect that the main clutch can be engaged with a small hydraulic pressure. Even if a high torque state is maintained, a load to the motor is reduced, with the result that the burnout of the motor can be prevented, and the service life of the motor can be increased.

According to the driving force transmitting device according to the second aspect, in addition to the effect of the first aspect, the electric motor is controlled by the control means on the basis of the hydraulic pressure detected by the hydraulic pressure detecting means. For example, the control means can perform the feedback control to the electric motor on the basis of the hydraulic pressure detected by the hydraulic pressure detecting means in accordance with a map indicating the relationship between the hydraulic pressure stored beforehand and the transmission torque of the main clutch. Accordingly, this invention provides an effect that the correct transmission torque of the main clutch can be obtained, whereby the variation in the torque can be prevented.

According to the driving force transmitting device according to the third aspect, in addition to the effect of the second aspect, the difference in revolution between the primary cam fitted to the primary clutch and the main cam is caused, when the input shaft is rotated with the primary clutch engaged, and the cam follower moves along the cam groove so as to press the main cam toward the main clutch according to the difference in the revolution, with the result that the main clutch is pressed by the main cam, and the main clutch is engaged. Accordingly, an effect of being capable of converting the driving force, transmitted from the input shaft, into a press-contact force for pressing the main clutch with a simple structure can be provided.

According to the driving force transmitting device according to the fourth aspect, in addition to the effect of the third aspect, a biasing member is provided that is arranged between the main clutch and the main cam for biasing the main cam in the direction reverse to the direction in which the main cam presses the main clutch. Therefore, when the press-contact force from the main cam to the main clutch is not applied, the main cam is returned to the original position by the biasing force of the biasing member, thereby providing an effect of being capable of preventing the transmission of the drag torque.

According to the driving force transmitting device of the fifth aspect, in addition to the effect of the fourth aspect, the control means controls the electric motor such that an initial pressure necessary for filling the supply path with the liquid or the initial pressure higher than the sliding resistance of the piston in order to prevent the backlash of the primary clutch is always applied to the liquid in the supply path.

Therefore, the present invention achieves an effect that the responsiveness can be enhanced corresponding to the time taken for filling the supply path with the liquid or the time necessary for preventing the backlash of the primary clutch.

According to the driving force transmitting device according to the sixth aspect, in addition to the effect of the fifth aspect, the initial pressure is set to be smaller than the biasing force of the biasing member for biasing the main cam. Therefore, this invention can provide an effect that the drag torque can be suppressed without applying extra load to the main clutch, while securing the responsiveness.

According to the driving force transmitting device of the seventh aspect, in addition to the effect of the sixth aspect, the input shaft always rotates with the speed higher than the speed of at least one of the pair of front wheel axles by the gear mechanism. Accordingly, a vehicle having mounted thereto the driving force transmitting device has an effect that a cornering force upon the cornering can be increased by engaging at least either one of main clutches upon running at the left side or right side. Further, the present invention achieves an effect of being capable of preventing the deterioration in the durability or fuel consumption of the main clutch by preventing the drag torque, even if the differential rotation is always inputted between the input shaft and the output shaft.

This effect will be more specifically explained. Japanese Patent Application Laid-Open Publication No. 2004-11478 discloses a technique in which power transmitting devices for transmitting a torque by crimping a multiple disc clutch with an attraction force, which attracts an armature by an electromagnetic coil, are arranged at both sides of the input shaft, wherein the transmission gear ratio of a gear mechanism for transmitting power to the input shaft is switched between 1 and a speed-increasing side.

When this pair of power transmitting devices are mounted as devices for transmitting power to a pair of rear wheels of a vehicle, the transmission gear ratio is set to the speed-increasing side upon the cornering, and the outer rear wheel is rotated faster than the front wheels, whereby the cornering force upon the cornering can be increased, by utilizing this technique. By switching the transmission gear ratio to 1, it can be prevented that the differential rotation is inputted to the multiple disc clutch when the vehicle goes straight.

On the other hand, Japanese Patent Application Laid-Open Publication No. 2004-52901 discloses a power transmitting device provided with a gear mechanism whose transmission gear ratio is fixed in such a manner that the outer rear wheel is rotated faster than the front wheels in order to increase the cornering force upon the cornering, without providing a switching mechanism of the transmission gear ratio. In this case, the cornering force can be increased with a simplified structure by the switching mechanism of the transmission gear ratio, but the differential rotation is always inputted to the multiple disc clutch.

Therefore, when the drag torque of the multiple disc clutch is large, the clutch generates heat to entail a problem of deteriorating the durability and fuel consumption of the clutch. In order to reduce the drag torque, the endplay of the multiple disc clutch must be increased. When the endplay is increased, there arises a problem of reducing the responsiveness.

However, according to the present invention, the endplay of each main clutch can sufficiently be secured by each biasing member, the drag torque can be reduced, the gap between the primary clutches can be reduced by the initial pressure, and the cam mechanism is operated with high speed by the transmission gear ratio set at the gear mechanism. Therefore, the responsiveness from the primary clutch to the main clutch through the cam mechanism is secured. Accordingly, the present invention provides an effect that the cornering force upon the cornering can be increased with a simple structure without providing the switching mechanism for switching the transmission gear ratio between 1 and the speed-increasing side, and further, the deterioration in the durability and fuel consumption of the main clutch can be prevented, even if the differential rotation is always inputted between the input shaft and the output shaft.

According to the driving force transmitting device according to the eighth aspect, in addition to the effect of the fourth aspect, the biasing member is composed of a disc spring into which the output shaft is inserted. Therefore, this invention provides an effect that the biasing force can be applied uniformly with a simple structure.

According to the driving force transmitting device according to the ninth aspect, in addition to the effect of the first aspect, the friction member of the primary clutch is made of a sheet material. Therefore, this invention provides an effect that satisfactory judder resistance can be obtained. Specifically, when the friction member is made of a metal, a special processing such as optimization of the surface shape or stabilization of friction characteristic by the heat treatment or surface treatment should be performed. However, the friction member made of the sheet material is excellent in judder resistance, and the special processing described above is not needed, so that the present invention can provide the effect of realizing high productivity and low cost.

According to the driving force transmitting device according to the tenth aspect, in addition to the effect of the second aspect, the hydraulic pressure in the supply path is detected by the hydraulic pressure detecting means, and the hydraulic pressure detected by the hydraulic pressure detecting means with the electric motor stopped is set as an initial value by the initial value setting means. When the hydraulic pressure in the supply path is adjusted by the hydraulic pressure adjusting means, the actual hydraulic pressure detected by the hydraulic pressure detecting means on the basis of the initial value set by the initial value setting means is corrected by the correcting means, and the hydraulic pressure fed to the supply path by the hydraulic pump on the basis of the corrected hydraulic pressure with the electric motor driven or stopped is adjusted.

In general, the value of the hydraulic pressure detected by the hydraulic pressure detecting means is different from the actual hydraulic value depending upon the manufacturing variation caused by the dimensional error upon the manufacture, ambient temperature, duration of service, or the like. Therefore, when the hydraulic pressure in the supply path is adjusted by referring to a table that stores beforehand the hydraulic value and the driving condition of the electric motor as associated with each other, it is difficult to adjust the hydraulic pressure in the supply path to a desired hydraulic pressure.

However, the hydraulic pressure detected with the zero pressure (atmospheric pressure) because of the stop of the electric motor can be set to the initial value by the initial value setting means. Therefore, the initial value according to the characteristic of the hydraulic pressure detecting means actually disposed can be set, so that the present invention provides an effect that the variation in the detected value caused by the manufacturing variation, ambient temperature, duration of service, etc. can be prevented. Further, since the actual hydraulic pressure can be corrected to zero by the correcting means on the basis of the actual hydraulic pressure detected by the initial value setting means with the zero pressure, the flow rate of the liquid fed in the supply path can be adjusted on the basis of the corrected hydraulic pressure (zero pressure), whereby the present invention provides an effect that the influence by the manufacturing variation, ambient temperature, duration of service, etc. can be reduced, and the driving force can correctly be transmitted from the input shaft to the output shaft.

According to the driving force transmitting device according to the eleventh aspect, in addition to the effect of the tenth aspect, the negative pressure generating means sucks the liquid in the supply path by the hydraulic pump by inversely rotating the electric motor so as to adjust the hydraulic pressure in the supply path to a negative pressure, and then, when the time determining means determines that the predetermined time has elapsed after the inverse rotation of the electric motor is stopped, the hydraulic pressure detected by the hydraulic pressure detecting means is set as the initial value detected by the hydraulic pressure detecting means.

The remaining pressure of the positive pressure might remain in the supply path immediately after the electric motor is driven and the liquid is fed into the supply path by the hydraulic pump, even if the electric motor is stopped. In this case, the initial value (the value corresponding to the zero pressure) of the hydraulic pressure detecting means might not be able to be set correctly. However, the negative pressure generating means temporarily sets the hydraulic pressure in the supply path to the negative pressure, and the value detected by the hydraulic pressure detecting means is set to the initial value after a predetermined time has elapsed after the electric motor is stopped. Therefore, the hydraulic pressure (zero pressure) with the hydraulic pressure in the supply path almost recovered to the atmospheric pressure can be set as the initial value, so that the present invention provides an effect of being capable of preventing that the correct initial value cannot be set because the remaining pressure of the positive pressure remains in the supply path.

According to the driving force transmitting device according to the twelfth aspect, in addition to the effect of the eleventh aspect, the electric motor is driven and the hydraulic pressure in the supply path is adjusted to the hydraulic pressure corresponding to the initial value set beforehand by the hydraulic pressure initial value setting means, and then, the negative pressure generating means drives the electric motor to inversely rotate so as to set the hydraulic pressure in the supply path to the negative pressure. Therefore, when the initial value is set to the value by which the hydraulic pressure in the supply path becomes generally the atmospheric pressure, for example, the hydraulic pressure in the supply path is adjusted to be the hydraulic pressure corresponding to the initial value set beforehand, and then, the electric motor is inversely rotated, whereby the remaining pressure in the supply path can surely be removed, and the hydraulic pressure in the supply path can be adjusted to be not more than the atmospheric pressure.

Explained here is the case in which the amount of sucking the liquid in the supply path by inversely rotating the electric motor is constant, and the hydraulic pressure at the point of starting the initial value setting means varies from a low value to a high value. When the hydraulic pressure at the point of starting the initial value setting means is high, the hydraulic pressure in the supply path by the mechanical elastic deformation should also be sucked, so that the suction amount of the liquid sucked from the supply path should be set large. On the other hand, when the suction with a large suction amount described above is performed in case where the hydraulic pressure at the point of starting the initial value setting means is low, the negative pressure in the supply path becomes too high to become the value smaller than the minimum value of the negative pressure by which the hydraulic pressure detecting means can be used. Therefore, the hydraulic pressure detecting means might be broken.

However, the electric motor is driven and the hydraulic pressure in the supply path is adjusted to the hydraulic pressure corresponding to the initial value set beforehand by the hydraulic pressure initial value setting means, and then, the negative pressure generating means drives the electric motor to inversely rotate so as to set the hydraulic pressure in the supply path lower than the hydraulic pressure corresponding to the initial value, whereby the present invention achieves an effect that the hydraulic pressure in the supply path is set to a stable negative pressure with a fixed suction amount and a small suction amount.

According to the driving force transmitting device of the thirteenth aspect, in addition to the effect of the eleventh or twelfth or aspect, the negative pressure generating means sets the driving condition of the electric motor such that the hydraulic pressure in the supply path assumes the value larger than the minimum value of the negative pressure by which the hydraulic pressure detecting means can be used. Therefore, the present invention achieves an effect that the hydraulic pressure in the supply path becomes the negative pressure smaller than the minimum value of the negative pressure that can be detected by the hydraulic pressure detecting means, and therefore, the breakdown of the hydraulic pressure detecting means or an erroneous detection by the hydraulic pressure detecting means can be prevented.

According to the driving force transmitting device according to the fourteenth aspect, in addition to the effect of the eleventh aspect, the negative pressure generating means sets the driving condition of the electric motor such that the time from when the electric motor is inversely rotated to the time when the predetermined time has elapsed after the stop of the electric motor is within the stand-by time necessary for the period from when the electric motor is stopped and to when the electric motor is driven again.

For example, when the time from when the electric motor is inversely rotated to the time when the predetermined time has elapsed after the stop of the electric motor is longer than the stand-by time, the electric motor is started to be driven before the initial value is set by the initial value setting means, so that the initial value is not set. However, the driving condition is set such that the time from when the electric motor is inversely rotated to the time when the predetermined time has elapsed after the stop of the electric motor is shorter than the stand-by time, whereby the present invention provides an effect that the initial value set by the initial value setting means can surely be set.

According to the driving force transmitting device of the fifteenth aspect, in addition to the effect of the eleventh aspect, the opening amount of the communication opening that communicates the supply path and an outer air chamber is set such that, when the electric motor is inversely rotated, the hydraulic pressure in the supply path, which is determined on the basis of a first flow rate sucked from the supply path by the hydraulic pump and a second flow rate of air entering the supply path from the communication opening, becomes the value larger than the minimum value of the negative pressure that can be detected by the hydraulic pressure detecting means. Therefore, the present invention achieves an effect that the hydraulic pressure in the supply path becomes the negative pressure smaller than the minimum value of the negative pressure that can be detected by the hydraulic pressure detecting means, and therefore, the breakdown of the hydraulic pressure detecting means or an erroneous detection by the hydraulic pressure detecting means can be prevented.

According to the driving force transmitting device according to the sixteenth aspect, in addition to the effect of the eleventh aspect, the opening amount of the communication opening that communicates the supply path and an outer air chamber is set such that the time taken for the air to be flown from the communication opening and for the pressure in the supply path to be recovered to the atmospheric pressure from the negative pressure after the stop of the electric motor after the electric motor is inversely rotated is within the stand-by time necessary for the period from when the electric motor is stopped and to when the electric motor is driven again.

For example, when the time from when the electric motor is inversely rotated to the time when the predetermined time has elapsed after the stop of the electric motor is longer than the stand-by time, the initial value is not set. However, the opening amount of the communication opening is set such that the time taken for the air to be flown from the communication opening and for the pressure in the supply path to be recovered to the atmospheric pressure from the negative pressure after the stop of the electric motor after the electric motor is inversely rotated is shorter than the stand-by time, the present invention provides an effect that the initial value can surely be set by the initial value setting means.

According to the driving force transmitting device according to the seventeenth aspect, in addition to the effect of the tenth aspect, the initial value setting means sets the initial value every time the instruction detecting means detects the instruction for starting the control of the transmission of the driving force from the input shaft to the output shaft by the main clutch or the primary clutch or every time the instruction detecting means detects the instruction for stopping the control of the transmission of the driving force. Therefore, the initial value is set at the timing of starting or stopping the control, not at the timing when the control of the transmission of the driving force is generally performed, whereby the present invention provides an effect that the influence given to the control of the transmission of the driving force generally performed can be reduced.

According to the driving force transmitting device according to the eighteenth aspect, in addition to the effect of the tenth aspect, the electric motor is inversely rotated such that, when the electric motor is normally rotated to move the piston in the maximum moving amount, the liquid in a flow rate greater than a third flow rate that is supplied in the supply path is sucked from the supply path. Therefore, even when the initial value is set with the positive pressure remaining in the supply path because of the normal operation of the piston, the pressure in the supply path can surely be adjusted to a negative pressure. Accordingly, the initial value can be set at any optional timings even during the normal operation state in which the instruction for operating the piston is issued, whereby the present invention provides an effect that the initial value according to the state of the use of the hydraulic pressure detecting means can be set, and the hydraulic pressure in the supply path can be adjusted to the desired hydraulic pressure.

When the liquid in a flow rate greater than a third flow rate is sucked from the supply path, the suction amount should be set to the value not smaller than the minimum value of the negative value by which the hydraulic pressure detecting means can be used, considering the variation in the hydraulic pressure for setting the initial value.

According to the driving force transmitting device according to the nineteenth aspect, in addition to the effect of the tenth aspect, the hydraulic pressure detected by the hydraulic pressure detecting means is corrected by the hydraulic pressure temperature correcting means according to the temperature detected by the temperature detecting means. Therefore, the present invention provides an effect that the initial value according to the environment of service of the hydraulic pressure detecting means can be set, and the hydraulic pressure in the supply path can be adjusted to the desired hydraulic pressure.

DESCRIPTION OF REFERENCE NUMERALS

Figure 1:
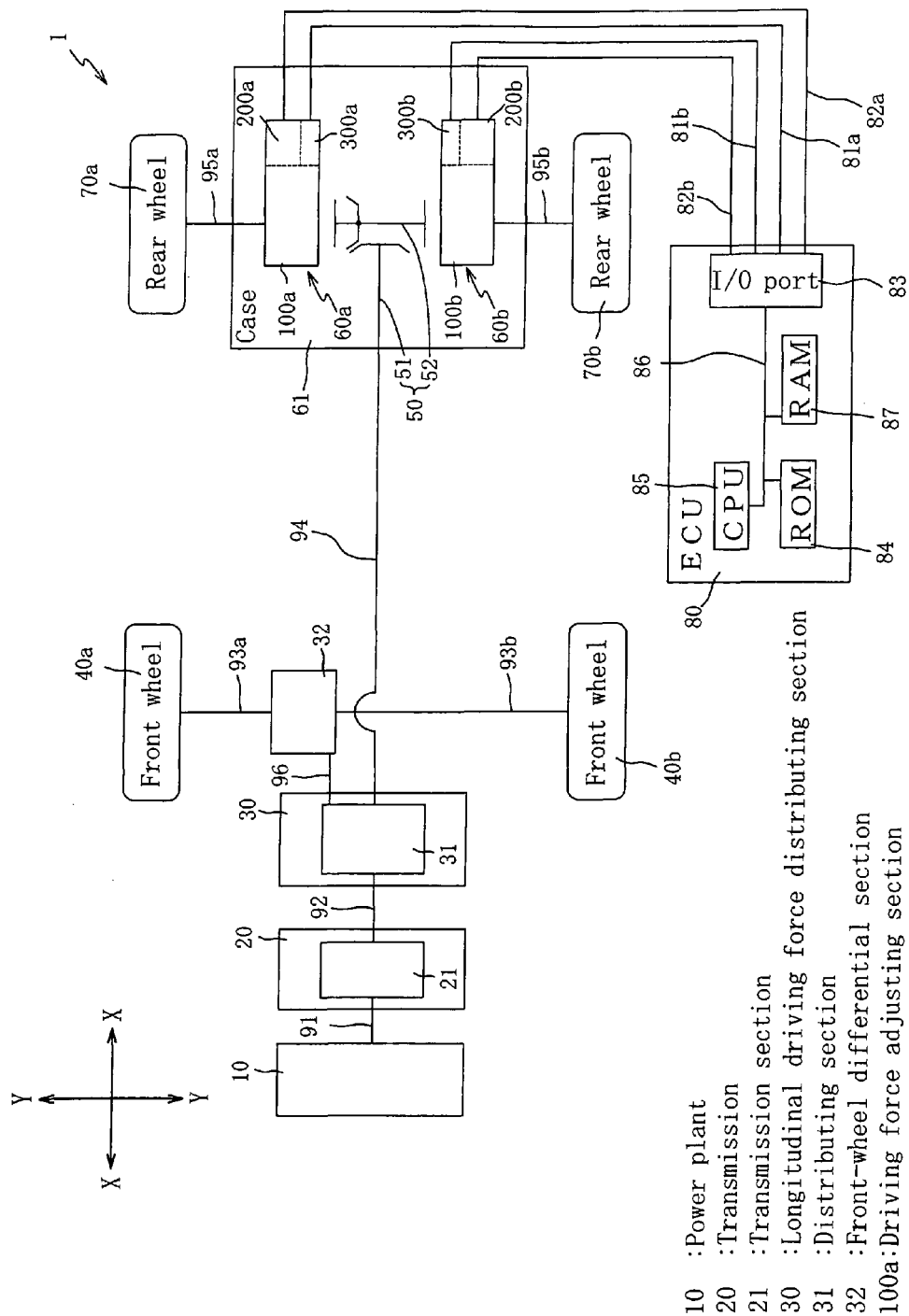
FIG. 1 is a schematic diagram of a four-wheel-drive vehicle according to one embodiment of the present invention.

1 Four-wheel-drive vehicle
10 Power Plant (Engine)
20 Transmission
21 Transmission section
30 Longitudinal driving force distributing device
31 Distributing section in longitudinal driving force distributing device
32 Front-wheel differential gear section
40a, 40b Front wheel
50 Driving force distributing mechanism (a part of an input shaft)
51 Input gear unit (a part of an input shaft)
52 Output gear unit (a part of an input shaft)
53 Hypoid gear (gear mechanism)
54 Hypoid gear (gear mechanism)
55 Output shaft spline section
60a, 60b Driving force adjusting mechanism (driving force transmitting device)
61 Case
64a, 64b Oil recovery chamber (a part of flow path, a part of circulation path)
70a, 70b Rear wheel
80 ECU (hydraulic supplying means, a part of driving force transmitting device)
81a, 81b Input line
82a, 82b Output line
83 I/O port
87 RAM
85 CPU (instruction detecting means)
86 Bus line
91 Connection shaft (a part of input shaft)
92 Connection shaft (a part of input shaft)
93a, 93b Front drive shaft
94 Center drive shaft (a part of input shaft)
95a, 95b Rear drive shaft (a part of output shaft)
96 Connection shaft (a part of input shaft)
100a, 100b Driving force adjusting section (clutch mechanism)
101a, 101b Connection mechanism (clutch mechanism)
102a, 102b Hub section (a part of clutch mechanism, a part of multiple disc clutch)
102a1, 102b1 Cylindrical section (a part of clutch mechanism, a part of multiple disc clutch)
102a2, 102b2 Disc-like section (a part of clutch mechanism, a part of multiple disc clutch)
103a, 103b Hub fitting section (a part of clutch mechanism, a part of multiple disc clutch)
104a, 104b Hub projecting section (a part of clutch mechanism, a part of multiple disc clutch)
105a, 105b Clutch drum section (a part of clutch mechanism, a part of multiple disc clutch)
106a, 106b Drive plate (a part of clutch mechanism, a part of multiple disc clutch, a part of second multiple disc clutch, a part of main clutch)
107a, 107b Driven plate (a part of clutch mechanism, a part of multiple disc clutch, a part of second multiple disc clutch, a part of main clutch)
108a, 108b Clutch retainer (a part of clutch mechanism, a part of multiple disc clutch, a part of second multiple disc clutch, a part of main clutch)
109a, 109b Drum groove section (a part of clutch mechanism, a part of multiple disc clutch, support plate)
110a, 110b Drive plate projecting section (a part of clutch mechanism, a part of multiple disc clutch, a part of second multiple disc clutch, a part of main clutch)
111a, 111b Driven plate projecting section (a part of clutch mechanism, a part of multiple disc clutch, a part of second multiple disc clutch, a part of main clutch)
112a, 112b Plate spline shaft section (a part of clutch mechanism, a part of multiple disc clutch, a part of second multiple disc clutch, a part of main clutch)
113a, 113b Shaft (output shaft, a part of output shaft)
114a, 114b Cam spline shaft section
131a, 131b Cam mechanism (amplifying mechanism)
132a, 132b Main cam (a part of amplifying mechanism, a part of cam mechanism, main cam)
133a, 133b Primary cam (a part of amplifying mechanism, a part of cam mechanism, primary cam)
134a, 134b Ball (a part of amplifying mechanism, a part of cam mechanism, cam follower)
135a, 135b Primary drive plate (a part of first multiple disc clutch, a part of primary clutch)
136a, 136b Primary driven plate (a part of first multiple disc clutch, a part of primary clutch)
137a, 137b Primary drive plate projecting section (a part of first multiple disc clutch, a part of primary clutch)
138a, 138b Primary driven plate projecting section (a part of first multiple disc clutch, a part of primary clutch)
139a, 139b Primary cam projecting section
140a, 140b Pressing member (a part of first pressing member)
141a, 141b Primary cam groove section (cam groove)
142a, 142b Main cam groove section (cam groove)
143a, 143b Cam spline shaft section
144a, 144b Main cam projecting section
151a, 151b Piston mechanism
152a, 152b Cylinder section
153a, 153b Piston main body (piston member, piston)
154a, 154b Piston chamber (supply chamber, a part of supply path, a part of flow path)
155a, 155b Stem bleeder (discharge port, a part of flow path)
151a1, 151b1 Through-hole (a part of communication opening)
151a2, 151b2 Cylindrical member (a part of communication opening)
171a, 171b Release mechanism (biasing member)
200a, 200b Oil supplying mechanism
201a, 201b Electric motor (hydraulic pressure supplying means, driving means)
202a, 202b Oil pump (hydraulic pressure supplying means, liquid feeding means, hydraulic pressure generating means)
203a, 203b Electric motor convex section
204a, 204b Oil storage chamber (liquid storage chamber)
205a, 205b Pump inlet port (side opening)
206a, 206b Pump outlet port
207a, 207b Motor shaft section (driving force transmitting means)
208a, 208b Oil recovery hole (upper opening, a part of flow path, a part of circulation path)
209a, 209b Pump inner wall (tilt surface)

210a, 210b Recovery path (a part of flow path, a part of circulation path)
211a, 211b First supply path (a part of supply path, communication path, a part of flow path)
212a, 212b Second supply path (a part of supply path, communication path, a part of flow path)
213a, 213b Concave insertion hole
214a, 214b Opening (opening)
215a, 215b Mounting opening (mounting opening)
216a, 216b Second opening (opening)
217a, 217b Second mounting opening (mounting opening)
218a, 218b Piston section outer seal member
219a, 219b Piston section inner seal member
220a, 220b Flow path (supply path)
300a, 300b Pressure detecting mechanism
301a, 301b Pressure detecting path (mounting path, a part of flow path)
302a, 302b Pressure sensor (detecting means, hydraulic pressure detecting means)
B1 Bearing
B2a, B2b Bearing (a part of second pressing member)
B3a, B3b Bearing (a part of first pressing member)
S1a, S1b Snap ring
S2a, S2b Snap ring
S3a, S3b Snap ring
L1 Width
L2 Width
P Rotation axis of driving force adjusting section
R Circumferential direction about the rotation axis P of driving force adjusting section
T Rotation axis of driving force distributing mechanism.

Best Mode for Carrying Out the Invention

Preferable embodiment of the present invention will be explained with reference to the appended drawings. Firstly, a four-wheel-drive vehicle 1 that is one embodiment of the present invention and has mounted thereon driving force adjusting mechanisms 60a and 60b will be explained with reference to FIG. 1. The driving force adjusting mechanisms 60a and 60b are for respectively distributing a driving force outputted from a power plant (an engine) 10 to rear wheels 70a and 70b.

FIG. 1 is a schematic diagram showing the four-wheel-drive vehicle 1 having mounted thereto the driving force adjusting mechanisms 60a and 60b. It is to be noted that an arrow X shown in FIG. 1 indicates the front-to-rear direction of the four-wheel-drive vehicle 1, while an arrow Y indicates a side-to-side direction of the four-wheel-drive vehicle 1.

As shown in FIG. 1, the four-wheel-drive vehicle 1 includes the power plant 10 that is an internal combustion engine (hereafter "engine 10") for generating a driving force, a transmission 20 that changes the speed of the driving force inputted from the engine 10 through a connection shaft 91 and outputs the resultant, a longitudinal driving force distributor 30 that distributes the driving force, inputted from the transmission 20 through a connection shaft 92, to a connection shaft 96 and a center drive shaft 94 by a distributing section 31 of the longitudinal driving force distributor, a front-wheel differential gear section 32 that distributes the driving force, which is distributed to the connection shaft 96 by the longitudinal driving force distributor 30, to front drive shafts 93a and 93b, a pair of front wheels 40a and 40b that rotates by the transmission of the driving force distributed to the front drive shafts 93a and 93b at the front-wheel differential gear section 32, a driving force distributing mechanism 50 that distributes the transmitted driving force, which is distributed to the center drive shaft 94 by the longitudinal driving force distributor 30, to rear drive shafts 95a and 95b, the driving force adjusting mechanisms 60a and 60b that adjust the ratio of the driving force distributed to the rear drive shafts 95a and 95b by the driving force distributing mechanism 50, a pair of rear wheels 70a and 70b that rotates by the transmission of the adjusted driving force to the respective rear drive shafts 95a and 95b by the driving force adjusting mechanisms 60a and 60b, and an ECU (electronic control unit) 80 that performs various controls of the driving force adjusting mechanisms 60a and 60b. The driving force distributing mechanism 50 and the driving force adjusting mechanisms 60a and 60b are rotatably fixed in a box-like case 61.

The front-wheel differential gear section 32 is a device that distributes the driving force transmitted from the connection shaft 96 to the front drive shafts 93a and 93b, and distributes the revolution of the connection shaft 96 to the drive shafts 93a and 93b.

The driving force distributing mechanism 50 is configured to include an input gear unit 51 that is coupled to the center drive shaft 94 and an output gear unit 52 that is arranged in the direction (Y direction in FIG. 1) orthogonal to the input gear unit 51. Therefore, the driving force distributing mechanism 50 distributes the driving force inputted to the input gear unit 51 by the output gear unit 52 so as to distribute the driving force to the driving force adjusting mechanisms 60a and 60b arranged to the right and left (both sides in the Y direction in FIG. 1) of the driving force distributing mechanism 50. The detail of the driving force distributing mechanism 50 will be explained later with reference to FIG. 3.

The driving force adjusting mechanisms 60a and 60b are arranged so as to be symmetric with respect to the driving force distributing mechanism 50 in the side-to-side direction (the Y direction in FIG. 1), and coupled respectively to both end portions of the output gear unit 52. The driving force adjusting mechanisms 60a and 60b are mounted such that the one at the right side of the driving force distributing mechanism 50 (the one at the upper side in the Y direction in FIG. 1) is the driving force adjusting mechanism 60a, while the one at the left side of the driving force distributing mechanism 50 (the one at the lower side in the Y direction in FIG. 1) is the driving force adjusting mechanism 60b.

The driving force adjusting mechanism 60a is configured to include a driving force adjusting section 100a that adjusts the transmission of the driving force, an oil supplying mechanism 200a that feeds oil to the driving force adjusting section 100a, and a pressure detecting mechanism 300a that detects the hydraulic pressure of the oil pressure-fed by the oil supplying mechanism 200a. The driving force adjusting section 100a adjusts the transmitted driving force by the hydraulic pressure generated by feeding the oil by the oil supplying mechanism 200a. The hydraulic pressure is detected by the pressure detecting mechanism 300a, and the result of the detection of the pressure detecting mechanism 300a is inputted to the ECU 80. The driving force adjusting mechanism 60b is configured in the same manner as the driving force adjusting mechanism 60a, and is configured to include a driving force adjusting section 100b, an oil supplying mechanism 200b, and a pressure detecting mechanism 300b. The detailed explanation of the driving force adjusting mechanisms 60a and 60b will be made later with reference to FIGS. 4 to 7.

The ECU 80 is configured to include a CPU 85 that is an arithmetic processing unit for controlling the oil supplying mechanisms 200a and 200b on the basis of the information about mainly the hydraulic pressure, a ROM 84 that stores a program, predetermined fixed value data, or the like for controlling the oil supplying mechanisms 200*a* and 200*b*, a RAM 87 to which various data pieces used for the execution of the program by the CPU 85 are temporarily stored, an I/O port 83 to which input lines 81*a* and 81*b* from the pressure detecting mechanisms 300*a* and 300*b* and output lines 82*a* and 82*b* to the oil supplying mechanisms 200*a* and 200*b* are connected, and a bus line 86 that is a connection circuit for electrically connecting the I/O port 83 with the ROM 84, CPU 85 and RAM 87. In the present embodiment, the ECU 80 individually feedback-controls the oil supplying mechanisms 200*a* and 200*b*, which supply oil necessary for operating the driving force adjusting sections 100*a* and 100*b*, on the basis of the result of the detection of the pressure detecting mechanisms 300*a* and 300*b*. The control performed by the ECU 80 will be explained later.

Figure 2:
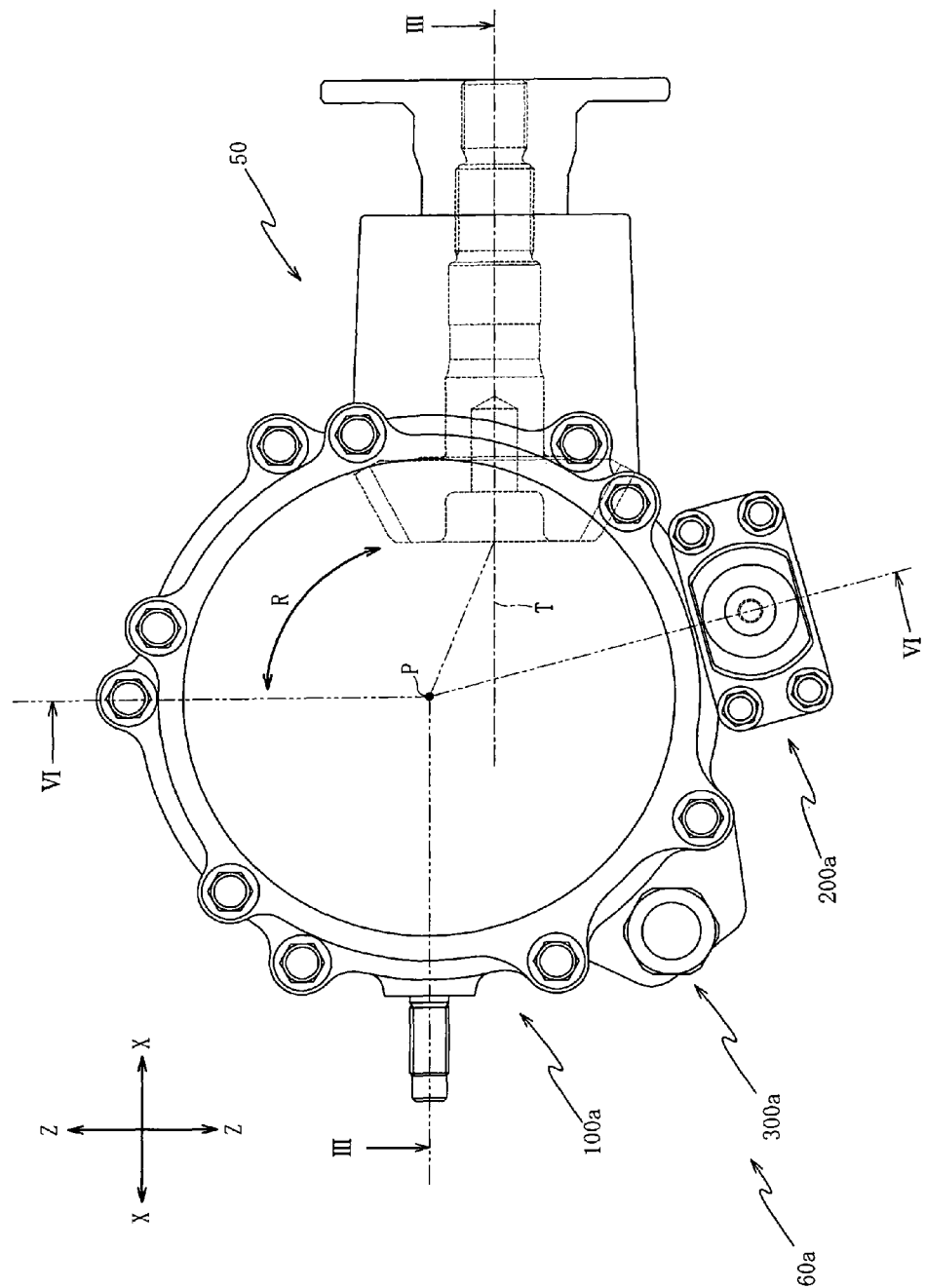
FIG. 2 is an external view of a driving force adjusting mechanism.

The appearance of the driving force adjusting mechanism 60*a* will be explained with reference to FIG. 2. FIG. 2 is a side view showing the driving force adjusting mechanism 60*a* and the driving force distributing mechanism 50 as enlarged. An arrow X in FIG. 2 indicates the front-to-rear direction of the four-wheel-drive vehicle 1, while an arrow Z indicates the vertical direction of the four-wheel-drive vehicle 1.

As described above, the driving force adjusting mechanism 60*a* is configured to include the driving force adjusting section 100*a* for adjusting the transmission of the driving force, the oil supplying mechanism 200*a* for feeding the oil to the driving force adjusting section 100*a*, and the pressure detecting mechanism 300*a* for detecting the hydraulic pressure of the oil pressure-fed by the oil supplying mechanism 200*a*.

The oil supplying mechanism 200*a* is arranged below the driving force adjusting section 100*a* (at the lower part in the Z direction in FIG. 2). The oil supplying mechanism 200*a* is configured such that the oil supplied to the driving force adjusting section 100*a* by the oil supplying mechanism 200*a* is exhausted by a natural drop and collected again in the oil supplying mechanism 200*a*. Although described later, an oil storage chamber 204*a* (see FIG. 6) is provided to the oil supplying mechanism 200*a* in the present embodiment, so that no labor for sucking and collecting oil is needed, compared to the case in which the oil storage chamber is arranged below the oil supplying mechanism 200*a* as in the conventional case of an automatic transmission or transfer case, whereby the efficiency for feeding oil can be enhanced.

Since the driving force distributing mechanism 50 distributes the driving force by using a hypoid gear, the extension line of the rotation axis P of the driving force adjusting section 100 and the extension line of the rotation axis T of the driving force distributing mechanism 50 do not cross.

Figure 3:
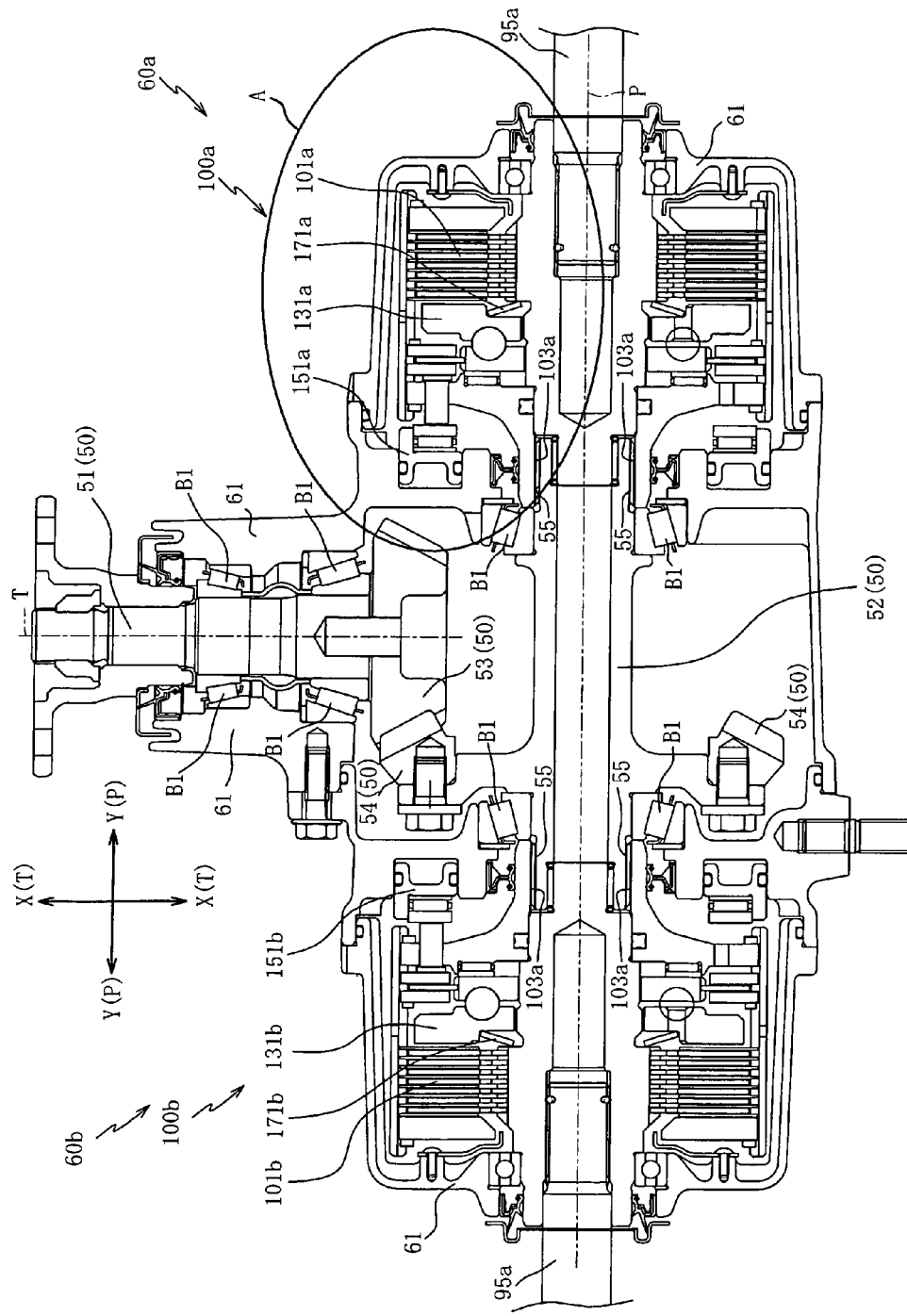
FIG. 3 is a sectional view of a driving force distributing mechanism and a driving force adjusting mechanism along a line III-III in FIG. 2.

Subsequently, the detailed configurations of the driving force distributing mechanism 50 and the driving force adjusting mechanism 60*a* will be explained with reference to FIGS. 3 to 6. FIG. 3 is a sectional view of the driving force distributing mechanism 50 and the driving force adjusting mechanisms 60*a* and 60*b* along a line III-III in FIG. 2. In FIG. 3, the sectional line is omitted for illustration. The arrow X in FIG. 3 indicates the front-to-rear direction of the four-wheel-drive vehicle 1 and the direction of T that is the rotation axial direction of the driving force distributing mechanism 50, while the arrow Y indicates the side-to-side direction of the four-wheel-drive vehicle 1 and the direction of P that is the rotation axial direction of the driving force adjusting sections 100*a* and 100*b*.

Firstly, the driving force distributing mechanism 50 will be explained. As described above, the driving force distributing mechanism 50 changes the direction and rotational speed of the driving force transmitted from the center drive shaft 94 (see FIG. 1) and distributes the driving force to the driving force adjusting mechanisms 60*a* and 60*b* arranged respectively at the right side and left side (in the Y direction in FIG. 1) of the four-wheel-drive vehicle 1.

As shown in FIG. 3, the driving force distributing mechanism 50 is configured to include the input gear unit 51 to which the driving force transmitted by the center drive shaft 94 (see FIG. 1) is inputted, and the output gear unit 52 arranged in the direction (in the Y direction in FIG. 3) orthogonal to the input gear unit 51 for outputting the driving force inputted to the input gear unit 51.

The hypoid gear 53 provided to the input gear unit 51 is fitted into the hypoid gear 54 provided to the output gear unit 52, whereby the input gear unit 51 is coupled to the output gear unit 52, and the input gear 51 transmits the driving force transmitted by the center drive shaft 94 (see FIG. 1) to the output gear unit 52.

The output gear unit 52 distributes the driving force transmitted from the input gear unit 51 to the driving force adjusting mechanisms 60*a* and 60*b* by the structure in which a hub fitting section 103*a* arranged at the right and left sides (in the Y direction in FIG. 3) of the output gear unit 52 is fitted into an output shaft spline section 55 formed at both ends of the output gear unit 52.

Therefore, since the input gear unit 51 and the output gear unit 52 are coupled by the hypoid gears 53 and 54, and the output gear unit 52 and the driving force adjusting mechanisms 60*a* and 60*b* are coupled by the output shaft spline section 55 and the hub fitting section 103*a*, the driving force distributing mechanism 50 can distribute the driving force, which is inputted to the input gear unit 51 by the center drive shaft 94 (see FIG. 1), to the driving force adjusting mechanisms 60*a* and 60*b* arranged at the right and left sides of the output gear unit 52.

A difference is produced in the revolution speed between the input gear unit 51 and the output gear unit 52 by the gear ratio of the hypoid gear 53 and the hypoid gear 54, wherein the gear ratio is set such that the average revolution speed of the front drive shaft 93*a* and the front drive shaft 93*b* (see FIG. 1) coupled to the front wheel 40*a* and the front wheel 40*b* (see FIG. 1) is slower than the revolution speed of the output gear unit 52 (in the present embodiment, by 3 to 7%). Specifically, it is set such that the output gear unit 52 is faster than the rear wheels 70*a* and 70*b*. Since the difference in the revolution speed is produced by the front-wheel differential section 32 on the front drive shaft 93*a* and the front drive shaft 93*b* due to the inner race difference during the turning of the four-wheel-drive vehicle 1, the average revolution speed of the front drive shaft 93*a* and the front drive shaft 93*b* is set to be the revolution speed that is a reference for comparison.

Therefore, when the driving force transmitted from the output gear unit 52 is effectively transmitted to the rear drive shafts 95*a* and 95*b* by the driving force adjusting mechanism 60*a*, the revolution speeds of the rear wheels 70*a* and 70*b* (see FIG. 1) become faster than the average revolution speed of the front wheel 40*a* (see FIG. 1) and the front wheel 40*b* (see FIG. 1) (by 3 to 7% in the present embodiment).

Since the driving force adjusting mechanisms 60*a* and 60*b* are connected to the rear wheels 70*a* and 70*b* (see FIG. 1) of the four-wheel-drive vehicle 1 (see FIG. 1) so as to be individually independent in the present embodiment, the revolution speeds of the rear wheels 70*a* and 70*b* can be individually increased by adjusting the transmission of the driving force transmitted from the output gear unit 52 by the driving force adjusting mechanisms 60*a* and 60*b*.

For example, when the four-wheel-drive vehicle 1 (see FIG. 1) turns to the left while advancing, the revolution speed of the rear wheel 70*a* (see FIG. 1), which is the outer wheel, is increased by adjusting the transmission of the driving force transmitted from the output gear unit 52 by the driving force adjusting mechanism 60a, whereby the turning performance can be enhanced. Further, when the four-wheel-drive vehicle 1 (see FIG. 1) turns to the right while advancing, the revolution speed of the rear wheel 70b (see FIG. 1), which is the outer wheel, is increased by adjusting the transmission of the driving force transmitted from the output gear unit 52 by the driving force adjusting mechanism 60b, whereby the turning performance can be enhanced.

The input gear unit 51 and the output gear unit 52 are rotatably fixed to a case 61 through a bearing Bl. Therefore, the driving force inputted to the input gear unit 51 is transmitted to the output gear unit 52 without suffering a substantial loss due to the sliding resistance between the input gear unit 51 and the case 61 and the sliding resistance between the output gear unit 52 and the case 61.

Subsequently, the schematic configuration of the driving force adjusting mechanism 60a will be explained. As described above, the driving force adjusting mechanism 60a is configured to include the driving force adjusting section 100a for adjusting the transmission of the driving force, the oil supplying mechanism 200a (see FIG. 1) that feeds oil to the driving force adjusting section 100a, and the pressure detecting mechanism 300a (see FIG. 1) for detecting the hydraulic pressure of the oil fed by the oil supplying mechanism 200a.

As shown in FIG. 3, the driving force adjusting section 100a is configured to include a connection mechanism 101a that adjusts the ratio in which the driving force inputted by the output gear unit 52 of the driving force distributing mechanism 50 is transmitted, a cam mechanism 131a that amplifies the press-contact force applied to the connection mechanism 101a, a piston mechanism 151a that applies the press-contact force to the cam mechanism 131a, and a release mechanism 171a that applies a biasing force in the direction reverse to the piston mechanism 151a to the cam mechanism 131a.

The driving force adjusting section 100b of the driving force adjusting mechanism 60b is configured in the same manner as the driving force adjusting section 100a of the driving force adjusting mechanism 60a, and is configured to include a connection mechanism 101b, a cam mechanism 131b, a piston mechanism 151b and a release mechanism 171b.

Next, the detailed configurations of the driving force adjusting mechanism 60a and the driving force adjusting section 100a will be explained with reference to FIGS. 4 and 5. The driving force adjusting mechanism 60a and the driving force adjusting section 100a are explained with reference to FIGS. 4 and 5, and the detailed explanation of the driving force adjusting mechanism 60b and the driving force adjusting section 100b are omitted, since they are configured in the same manner as the driving force adjusting mechanism 60a and the driving force adjusting section 100a.

Figure 4:
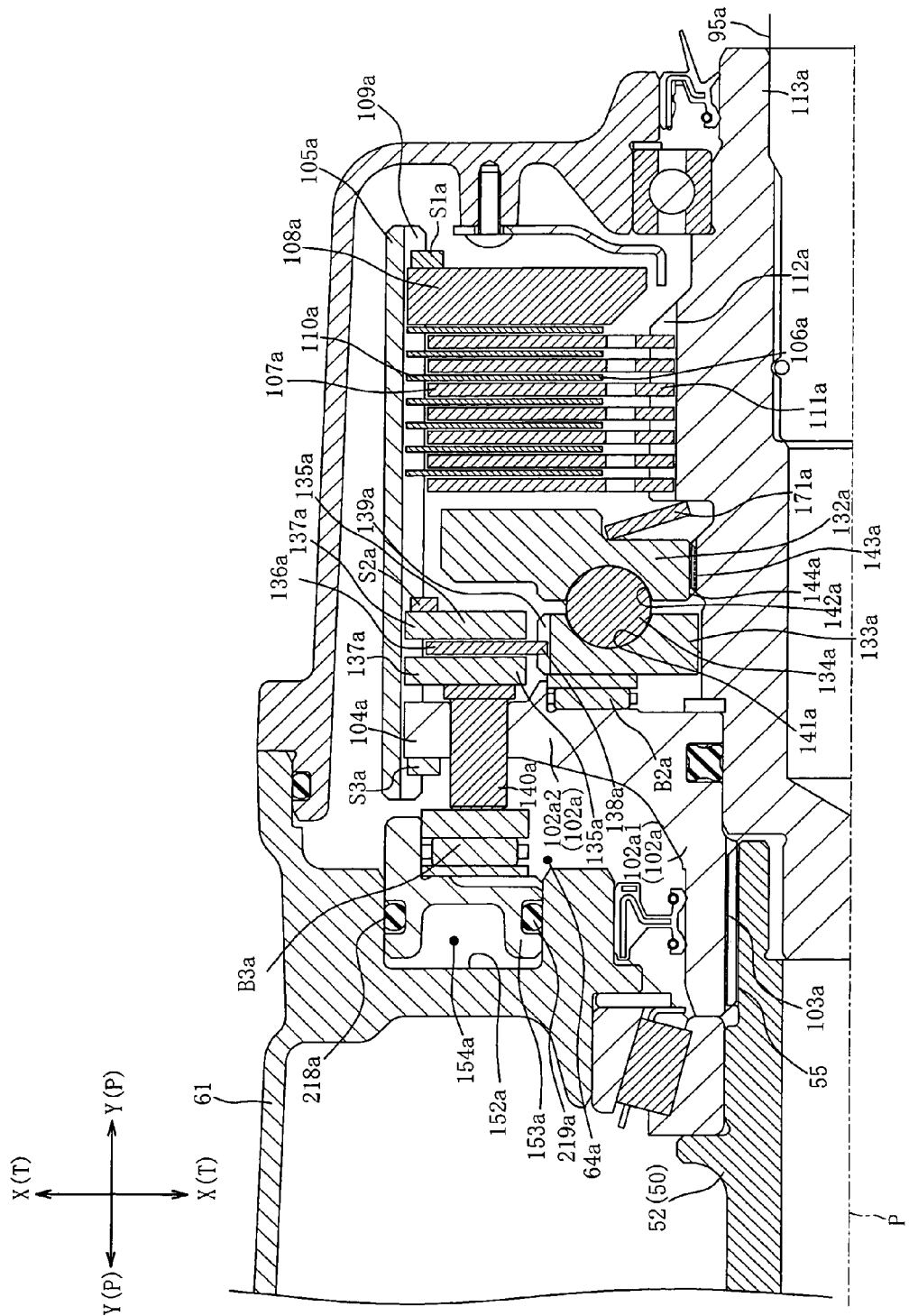
FIG. 4 is an enlarged sectional view of an A portion in FIG. 3.
Figure 5A:
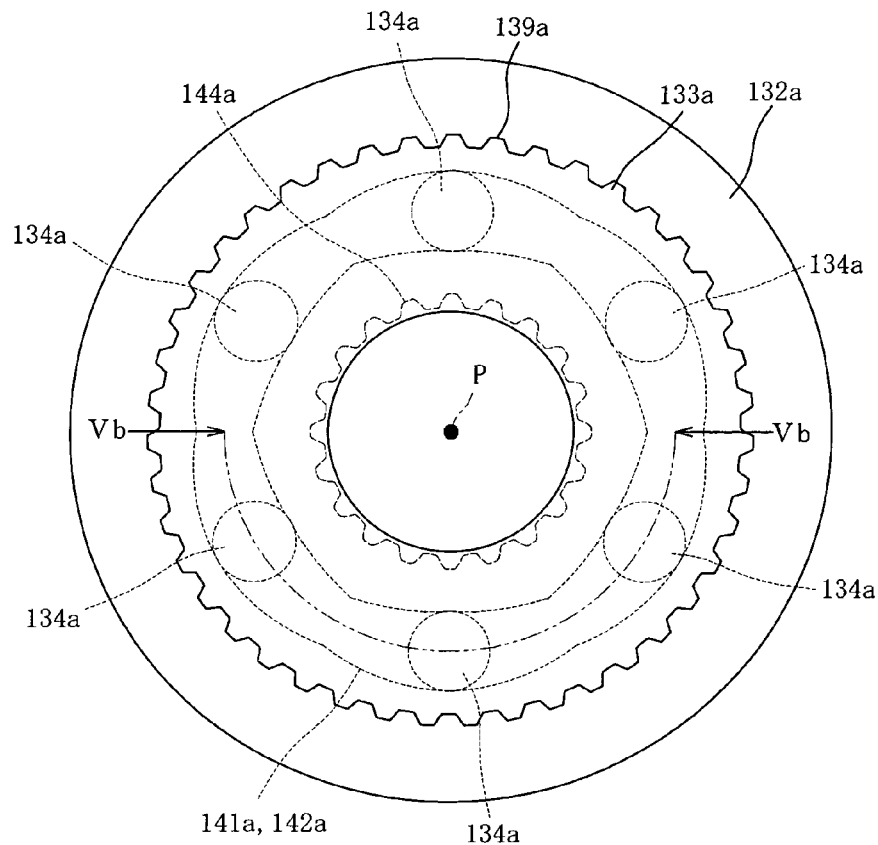
FIG. 5 is a diagram schematically showing a cam mechanism, wherein FIG. 5 (a) is a side view of the cam mechanism.
FIG. 5(b) is a sectional view of the cam mechanism along a line Vb-Vb in FIG. 5(a).
Figure 5B:
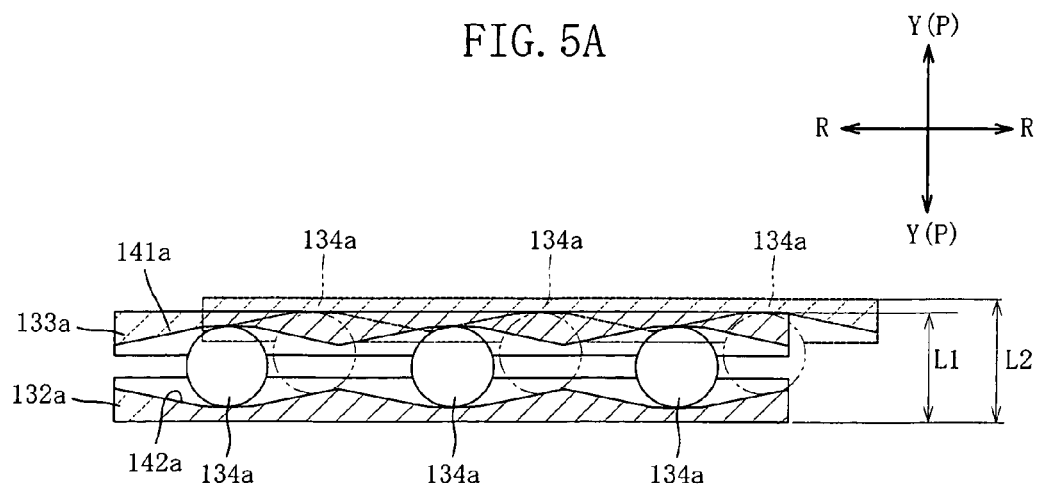

FIG. 4 is a sectional view showing an A portion in FIG. 3 as enlarged, and shows a part of the driving force adjusting section 100a and the case 61 that are a part of the driving force adjusting mechanism 60a. FIG. 5 is a view schematically showing the cam mechanism 131a, wherein FIG. 5(a) is a side view of the cam mechanism 131a, and FIG. 5(b) is a sectional view of the cam mechanism 131a along a line Vb-Vb in FIG. 5(a).

An arrow X in FIG. 4 indicates the front-to-rear direction of the four-wheel-drive vehicle 1 and the direction of T that is the rotation axial direction of the driving force distributing mechanism 50, while an arrow Y indicates the side-to-side direction of the four-wheel-drive vehicle 1 and the direction of P that is the rotation axial direction of the driving force adjusting sections 100a of the driving force adjusting mechanism 60. An arrow R in FIG. 5 indicates the circumferential direction (in the vertical direction in FIG. 2) about the rotation axis P of the driving force adjusting section 100a of the driving force adjusting mechanism 60a.

Firstly, the connection mechanism 101a (see FIG. 3) of the driving force adjusting section 100a will be explained in detail. As shown in FIG. 4, the connection mechanism 101a is configured to include a hub section 102a to which the driving force transmitted from the output gear unit 52 is inputted, a clutch drum section 105a coupled to the hub section 102a and having generally a cylindrical shape, plural drive plates 106a (seven in the present embodiment) coupled to the inside (in the direction toward the rotation axis P) of the clutch drum section 105a, plural driven plates 107a (seven in the present embodiment) arranged one by one between the plural drive plates 106a, and a clutch retainer 108a that is arranged so as to be adjacent to the driven plates 107a and the drive plates 106a and positioned at the outermost side (at the right side in the Y direction) of the plates 106a and 107a arranged side by side in the rotation axial direction P of the driving force adjusting section 100a.

The hub section 102a is a member formed into a substantially annular shape, and is configured to include a cylindrical section 102a1 that is fitted into the output gear unit 52 and formed into a generally cylindrical shape, and a plate-like section 102a2 that is coupled to the clutch drum section 105a and formed into a plate-like shape. A hub fitting section 103a is formed at a part of the inner side face of the cylindrical section 102a1, and the hub fitting section 103a and the output shaft spline section 55 of the output gear unit 52 form a spline joint.

A hub projecting section 104a is formed at the outer side face of the plate-like section 102a2, and plural drum groove sections 109a are formed at the inner side face of the clutch drum section 105a. The hub projecting section 104a and the plural drum groove sections 109a form a spline joint.

Accordingly, the hub section 102a can transmit the driving force transmitted from the output shaft spline section 55 to the clutch drum section 105a.

The movement of the hub section 102a to the left side in the rotation axial direction P of the driving force adjusting section 100 (at the left side in the Y direction in FIG. 4) with respect to the clutch drum section 105a is restricted by a snap ring S3a that is fitted to the inside of the clutch drum section 105a.

The clutch retainer 108a is a plate having generally a circular disk, and is fitted to the inside of the clutch drum section 105a like the hub section 102a. Further, the movement of the clutch retainer 108a to the right side in the rotation axial direction P of the driving force adjusting section 100a (at the right side in the Y direction in FIG. 4) with respect to the clutch drum section 105a is restricted by a snap ring S1a that is fitted to the inside of the clutch drum section 105a.

From the above, the force exerted to the hub section 102a from the right side in the rotation axial direction P (right side in the Y direction in FIG. 4) of the driving force adjusting section 100a is exerted to the clutch drum section 105a through the snap ring S3a, as well as the force exerted to the clutch retainer 108a from the left side in the rotation axial direction P (left side in the Y direction in FIG. 4) of the driving force adjusting section 100a is exerted to the clutch drum section 105a through the snap ring S1a. Therefore, the clutch drum section 105a can receive two forces exerted to the hub section 102a and the clutch retainer 108a. Although described later, two forces exerted to the hub section 102a and the clutch retainer 108a mean press-contact force produced by the cam mechanism 131 (see FIG. 3) and its reaction force in the present embodiment.

The drive plate 106a is a plate having generally a disk-like shape, the spline joint is formed by a drive plate projecting section 110a formed at the outer edge of the drive plate 106a and plural drum groove sections 109a formed at the inner side face of the clutch drum section 105a, and the drive plate 106a is fitted to the inside of the clutch drum section 105a.

The driven plate 107a is a plate having generally a disk-like shape, the spline joint is formed by a driven plate projecting section 111a formed at the inner side face of the driven plate 107a and a plate spine shaft portion 112a formed to a part of the shaft 113a, and the driven plate 107a is fitted to the outside of the shaft 113a.

The drive plate 106a and the driven plate 107a are configured to be operable to the right in the rotation axial direction P (to the right in the Y direction in FIG. 4) of the driving force adjusting section 100a by receiving the press-contact force from a later-described main cam 132a of the cam mechanism 131a, while reducing the small gap between the drive plate 106a and the driven plate 107a, until the movement thereof is restricted by the clutch retainer 108a.

Accordingly, when the drive plate 106a and the driven plate 107a receive the press-contact force from the later-described main cam 132a of the cam mechanism 131a, and hence, the gap between the drive plate 106a and the driven plate 107a is reduced, friction force is generated between the drive plate 106a and the driven plate 107a. The friction force generated between the drive plate 106a and the driven plate 107a increases according to the press-contact force from the main cam 132a of the cam mechanism 131a, and the driving force according to the press-contact force is transmitted to the driven plate 107a from the drive plate 106a. As a result, the ratio of the driving force transmitted from the clutch drum section 105a to the shaft 113a is adjusted.

Here, a drag generated between the drive plate 106a and the driven plate 107a will be explained. The drag generated between the drive plate 106a and the driven plate 107a means a phenomenon in which the driven plate 107a is dragged in the direction of operating the drive plate 106a by the adhesion force of the oil intervened between the drive plate 106a and the driven plate 107a.

The rotational force transmitted by the drag is referred to as a drag torque, and as the viscosity of the oil increases (as the temperature of the oil is low), or as the gap between the drive plate 106a and the driven plate 107a is narrow, a large drag torque is generated.

The generation of the drag torque not only deteriorates the transmission precision of the driving force of the driving force adjusting section 100a but also involves many adverse effects such as the generation of friction heat between the drive plate 106a and the driven plate 107a, deterioration of the oil property, the deterioration in fuel consumption due to the increase in the rolling resistance as the four-wheel-drive vehicle 1, or the like.

An endplay that is one factor of generating the drag will be explained here. The gap between the drive plate 106a and the driven plate 107a is not set to the value set for every gap between the drive plate 106a and the driven plate 107a but to the value obtained by subtracting the total size of the thickness of all drive plates 106a and the thickness of all driven plates 107a accommodated between the main cam 132a and the clutch retainer 108a from the size of the distance between the main cam 132a and the clutch retainer 108a. This value is the endplay.

For example, when the four-wheel-drive vehicle 1 (see FIG. 1) goes straight, the driving force adjusting section 100a (see FIG. 1) is controlled not to transmit the driving force, and the front wheels 40a and 40b (see FIG. 1) and the rear wheels 70a and 70b (see FIG. 1) rotate with the same revolution speed. Further, as described above, the revolution speed of the output gear unit 52 rotates faster than the average revolution speed of the front drive shafts 93a and 93b (see FIG. 1) coupled to the front wheels 40a and 40b (by 3 to 7% in the present embodiment).

Specifically, a difference in the revolution speed is produced between the drive plate 106a to which the revolution is transmitted from the output gear unit 52 and the driven plate 107a to which the revolution is transmitted from the rear wheel 70a, which rotates with the revolution speed same as that of the front wheel 40a, through the rear drive shaft 95a. When the difference in the revolution speed is caused between the drive plate 106a and the driven plate 107a as described above, a drag occurs.

On the other hand, the endplay is set, for example to about 0.5 mm to about 1.0 mm in the present embodiment, so that the drag torque can be suppressed to a truly small value. Therefore, when a vehicle goes straight with a high speed for a long time on a speedway, for example, the present embodiment can prevent the generation of the friction heat at the drive plate 106a and the driven plate 107a caused by the occurrence of the drag, deterioration of the oil property, degradation of fuel consumption caused by the increase in the internal resistance due to the drag torque, or the like.

Figure 8:
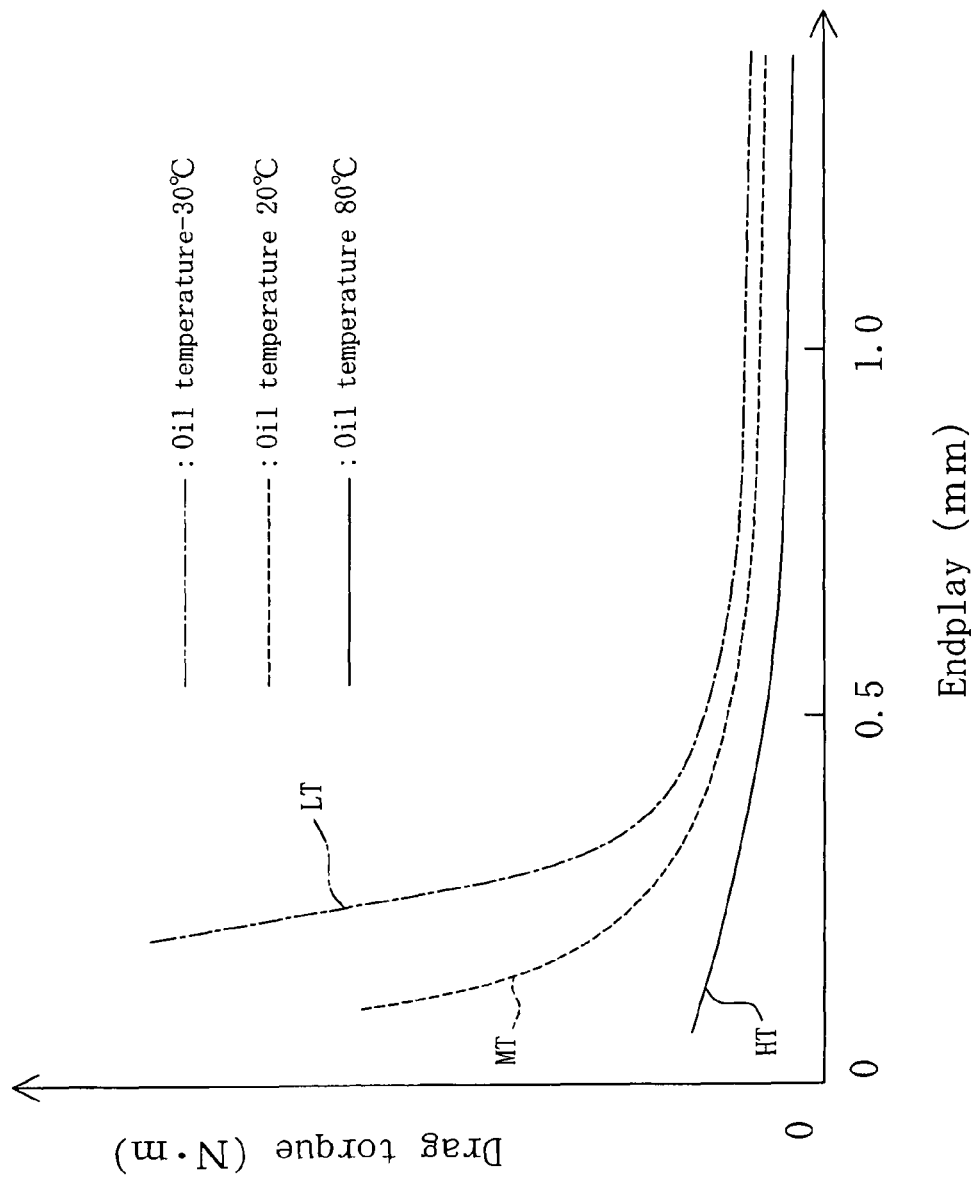
FIG. 8 is a graph showing a relationship between an end-play and a drag torque.

The basis of the setting of the endplay will be explained with reference to FIG. 8. FIG. 8 is a graph indicating the relationship between the endplay and the drag torque. A curve HT indicated by a solid line in FIG. 8 shows the relationship between the endplay and the drag torque at which the oil temperature is 80 ° C., a curve MT indicated by a dotted line shows the relationship between the endplay and the drag torque at which the oil temperature is 20 ° C., and a curve LT indicated by a one-dot-chain line shows the relationship between the endplay and the drag torque at which the oil temperature is -30 ° C.

As shown in FIG. 8, the drag torque assumes a larger value as the oil temperature is lower, while the drag torque greatly changes depending upon the oil temperature as the value of the endplay is smaller. Considering this characteristic, the lower limit of the endplay is set to about 0.5 mm in order to prepare the endplay that is less susceptible to the temperature change of the oil. Since the driving force adjusting section 100a (see FIG. 1) is mass-produced, the upper limit of the endplay is set to about 1.0mm considering the variation in the size of the components caused by the mass-production.

However, when the endplay is set to be large, it takes time to reduce the gap, because it is configured such that the friction force is generated by reducing the gap between the drive plate 106a and the driven plate 107a as described above, whereby the responsiveness of the driving force adjusting mechanism (see FIG. 1) is deteriorated.

On the other hand, the cam mechanism 131a (see FIG. 3) that amplifies the force by utilizing the rotational force is provided to the driving force adjusting section 100a in the present embodiment so as to enhance the responsiveness.

Firstly, the cam mechanism 131a (see FIG. 3) of the driving force adjusting section 100a will be explained in detail. The cam mechanism 131a is an amplifying mechanism that utilizes the driving force (rotational force) transmitted from the clutch drum section 105a, and is arranged at the position opposite to the clutch retainer 108a in the rotation axial direction P (in the Y direction in FIG. 4) of the driving force adjusting section 100a.

The cam mechanism 131a (see FIG. 3) is configured to include a pressing member 140a that is pressed by a later-described piston mechanism 151a (see FIG. 3), plural primary drive plates 135a (two in the present embodiment) that are pressed by the pressing member 140a, a primary driven plate 136a that is arranged between the primary drive plates 135a, a primary cam 133a that is coupled to the primary driven plate 136a, a main cam 132a coupled to the shaft 113a, plural (six in the present embodiment) balls 134a held between the primary cam 133a and the main cam 132a, and a bearing B2a that is adjacent to the primary cam 133a.

The primary drive plate 135a is a plate having generally a circular disk-like shape, wherein a primary drive plate projecting section 137a formed at the outer edge of the primary drive plate 135a and plural drum groove sections 109a formed at the inner side face of the clutch drum section 105a form a spline joint, and the primary drive plate 135a is fitted at the inside of the clutch drum section 105a.

The primary driven plate 136a is a plate having generally a circular disk-like shape, wherein a primary driven plate projecting section 136a formed at the inner side face of the primary driven plate 136a and a primary cam projecting section 139a form a spline joint, and the primary driven plate 136a is fitted at the outside of the primary cam 133a.

The primary drive plate 135a and the primary driven plate 136a are configured to be operable to the right in the rotation axial direction P (to the right in the Y direction in FIG. 4) of the driving force adjusting section 100a by receiving the press-contact force from a later-described piston mechanism 151a, while reducing the small gap between the primary drive plate 135a and the primary driven plate 136a. Further, the movement of the primary drive plate 135a to the right in the axial direction of the rotation axis P (to the right in the Y direction in FIG. 4) of the driving force adjusting section 100a with respect to the clutch drum section 105a is restricted by the snap ring S2a fitted at the inside of the clutch drum section 105.

When the gap between the primary drive plate 135a and the primary driven plate 136a is reduced through the receipt of the press-contact force from the later-described piston mechanism 151a (see FIG. 3) by the primary drive plate 135a and the primary driven plate 136a, friction force is caused between the primary drive plate 135a and the primary driven plate 136a.

The friction force caused between the primary drive plate 135a and the primary driven plate 136a increases according to the press-contact force from the piston mechanism 151a, and the driving force according to the press-contact force is transmitted to the primary driven plate 136a from the primary drive plate 135a. As a result, the ratio of the driving force transmitted to the primary cam 133a is adjusted.

A primary cam groove section 141a is formed at the face opposite to the main cam 132a of the primary cam 133a, while a main cam groove section 142a is formed at the face opposite to the primary cam 133a of the main cam 132a. The ball 134a is held between the primary cam groove section 141a and the main cam groove 142a.

The detailed structures and operations of the primary cam 133a, the main cam 132a and the balls 134a will be explained with reference to FIG. 5. FIG. 5(a) shows the state viewed from the left side (left side in the Y direction in FIG. 4) to the right side (right side in the Y direction in FIG. 4).

As shown in FIG. 5(a), the primary cam 133a is generally an annular member, wherein an annular primary cam groove section 141a is formed at the face (the face of the primary cam 133a in FIG. 5(a) at the far side in the perpendicular direction of the sheet) opposite to the main cam 132a. The primary cam projecting section 139a is formed at the outer peripheral surface of the primary cam 133a, and the primary driven plate projecting section 138a of the primary cam projecting section 139a and the primary driven plate 136a (see FIG. 4) form a spline joint.

The main cam 132a is generally an annular member, wherein an annular main cam groove section 142a is formed at the face (the face of the main cam 132a in FIG. 5(a) at the near side viewed in the perpendicular direction of the sheet) opposite to the primary cam 133a. The main cam projecting section 144a is formed at the inner peripheral surface of the main cam 132a, and the main cam projecting section 144a and the cam spline axis section 143a (see FIG. 4) formed at the shaft 113a (see FIG. 3) form a spline joint.

As shown in FIG. 5(a), the primary cam groove section 141a and the main cam groove section 142a are configured to the same shape, and plural (six in the present embodiment) balls 134a are accommodated between the primary cam groove section 141a and the main cam groove section 142a.

Next, the operations of the main cam 132a, the primary cam 133a, and the balls 134a when the driving force is transmitted to the primary cam 133a will be explained with reference to FIG. 5(b). As shown in FIG. 5(b), the depth of the groove sections of the main cam groove section 142a and the primary cam groove section 141a gently change in the circumferential direction (in the R direction in FIG. 5(b)).

As shown in FIG. 5(b), the state of the primary cam 133a indicated by the solid line is the position when the driving force is not transmitted from the clutch drum section 105a to the primary cam 133a, and the ball 134a is accommodated at the deep portion between the primary cam groove section 141a and the main cam groove section 142a.

It is to be noted that, for the explanation of a later-described release mechanism 171a, this position is defined as a reference position. The distance between the primary cam 133a and the main cam 132a in case where the primary cam 133a is located at the reference position becomes a width L1 in the rotation axial direction P (in the Y direction in FIG. 5(b)) of the driving force adjusting section 100a.

In FIG. 5(b), the state of the primary cam 133a indicated by a broken line is the position when the driving force is transmitted to the primary cam 133a from the clutch drum section 105a, wherein the primary cam 133a moved in the circumferential direction (to the right in the R direction in FIG. 5(b)) with respect to the main cam 132a. With this state, the ball 134a is accommodated in the portion shallower than the portion (the state indicated by the solid line, reference position) in the state when the driving force is not transmitted to the primary cam 133a.

It is to be noted that, for the explanation of the later-described release mechanism 171a, this position is defined as an operating position. The distance between the primary cam 133a and the main cam 132a in case where the primary cam 133a is located at the operating position becomes a width L2 in the rotation axial direction P (in the Y direction in FIG. 5(b)) of the driving force adjusting section 100a.

As shown in FIG. 5(b), the width L2 is larger than the width L1 between the primary cam 133a and the main cam 132a. This is because, when the primary cam 133a rotates about the rotation axis P of the driving force adjusting section 100a with respect to the main cam 132a by the driving force transmitted to the primary cam 133a, the ball 134a rolls over to the shallow portion of the groove sections 141a and 142a, so that the width between the primary cam 133a and the main cam 132a increases. As a result, a press-contact force and its reaction force are generated between the primary cam 133a and the main cam 132a. Further, the press-contact force is amplified several ten times (about 20 times in the present embodiment) of the press-contact force caused by the piston mechanism 151a.

As described above, the cam mechanism 131a (see FIG. 3) can amplify the press-contact force generated by the piston mechanism 151a (see FIG. 3) with a simple structure. Therefore, the drive plate 106a and the driven plate 107a can be pressed against each other with a large press-contact force only by a small press-contact force produced from the piston mechanism 151a (see FIG. 3).

Since the press-contact force from the piston mechanism 151a (see FIG. 3) is amplified by the cam mechanism 131a (see FIG. 3), the force about one-twentieth of the force pressing the drive plate 106a and the drive plate 107a may suffice. Specifically, compared to the case in which the cam mechanism 131a is omitted and the drive plate 106a and the driven plate 107a are directly pressed by the piston mechanism 151a, the pressure value that should be generated by the oil pump 202a can be set to be small.

Accordingly, the electric motor 201a for driving the oil pump 202a can be downsized, whereby the weight of the driving force adjusting mechanism 60a (see FIG. 1) can be reduced. Further, the power consumption of the electric motor 201a can be reduced, whereby a generator (not shown) mounted on a vehicle can be downsized, and hence, the weight of the four-wheel-vehicle 1 can be reduced. Moreover, since the power consumption of the electric motor 201a is reduced, a motor having power consumption larger than the power consumption thus reduced can be used for the electric motor 201a, whereby the choices of the motor are increased. As a result, it is possible to select a motor whose distribution amount is large and whose cost is low, with the result that the cost can be reduced.

Further, the cam mechanism 131a (see FIG. 3) spreads in the direction of pressing the connection mechanism 101a (see FIG. 3) by the difference in the revolution speed between the clutch drum section 105a (see FIG. 4) and the shaft 113a (see FIG. 4). Specifically, as the difference in the revolution speed between the clutch drum section 105a (see FIG. 4) and the shaft 113a (see FIG. 4) increases, the speed of the cam mechanism 131a (see FIG. 3) spreading toward the connection mechanism 101a (see FIG. 3) increases.

Therefore, if the difference in the revolution speed between the clutch drum section 105a (see FIG. 4) and the shaft 113a (see FIG. 4) is set to be large, the responsiveness of the driving force adjusting mechanism 60a(see FIG. 1) is not deteriorated, even if the gap between the drive plate 106a and the driven plate 107a is set to be large. Accordingly, the responsiveness of the driving force adjusting mechanism 60a (see FIG. 1) can be secured, while setting the gap between the drive plate 106a and the driven plate 107a to be large in order to reduce the drag.

In the present embodiment, the difference in the revolution speed between the clutch drum section 105a (see FIG. 4) and the shaft 113a (see FIG. 4) is set by the gear ratio of the hypoid gear 53 (see FIG. 3) and the hypoid gear 54 (see FIG. 3) in order that the average revolution speed of the rear wheel 70a (see FIG. 1) and the rear wheel 70b (see FIG. 1) becomes faster than the average revolution speed of the front wheel 40a (see FIG. 1) and the front wheel 40b (see FIG. 1) by 3 to 7%. Therefore, even if the upper limit value of the endplay is about 1.0 mm, the responsiveness of the driving force adjusting mechanism 60a (see FIG. 1) is secured.

Since the gap between the drive plate 106a (see FIG. 4) and the driven plate 107a (see FIG. 4) is reduced through the cam mechanism 131a (see FIG. 3), the piston mechanism 151a (see FIG. 3) may only reduce the gap between the primary drive plate 135a and the primary driven plate 136a. Therefore, even if the oil amount fed from the oil supplying mechanism 200a (see FIG. 6) to the piston mechanism 151a (see FIG. 3) is small, the driving force from the clutch drum section 105a (see FIG. 4) can be transmitted to the shaft 113a (see FIG. 4). Accordingly, the oil pump 202a (see FIG. 6) provided to the oil supplying mechanism 200a can be downsized, whereby the weight of the driving force adjusting mechanism 60a (see FIG. 1) can be reduced.

The manner of transmitting the press-contact force produced from the cam mechanism 131a and its reaction force will be explained with reference to FIG. 4. In the present embodiment, the press-contact force generated by the primary cam 133a, the main cam 132a and the balls 134a is transmitted to the clutch drum section 105a through the plural drive plates 106a, the plural driven plates 107a, the clutch retainer 108, and the snap ring S1a. Further, the reaction force of the press-contact force generated by the primary cam 133a, the main cam 132a and the ball 134a is transmitted to the clutch drum section 105a through the bearing B2a, the hub section 102a, and the snap ring S3a. Specifically, the press-contact force generated by the cam mechanism 131a and its reaction force are transmitted by the components of the connection mechanism 101a and exerted on the clutch drum section 105a.

Therefore, the press-contact force generated by the cam mechanism 131a and its reaction force are transmitted to the clutch drum section 105a, but not transmitted to the case 61 or the piston mechanism 151a. Accordingly, when the strength of the driving force adjusting mechanism 60a (see FIG. 1) is secured on the basis of the press-contact force generated by the cam mechanism 131a and its reaction force, it suffices that the strength of the connection mechanism 101a and the cam mechanism 131a is secured, and it is unnecessary to secure the strength of the case 61, piston mechanism 151a or bearing B3a with respect to a thrust force (the force in the Y direction in FIG. 4). As a result, the number of the components whose strength should be secured is reduced, so that the piston mechanism 151a or the bearing B3a can be downsized or the size of the case 61 can be reduced, with the result that the weight and cost of the driving force adjusting mechanism 60a (see FIG. 1) can be reduced.

The drag caused between the drive plate 106a and the driven plate 107a described above will be explained here. The drag is a phenomenon caused when the main cam 132a does not produce the press-contact force and the main cam 132a does not fully return to the reference position from the operating position. Specifically, the drag is a phenomenon in which the driven plate 107a is adhered onto the driven plate 106a due to the oil interposed between the drive plate 106a and the driven plate 107a, by which the driven plate 107a is dragged and rotated in the direction of the rotation of the drive plate 106a.

The release mechanism 171a is a disc spring, and biases the main cam 132a toward the direction (to the left in the Y direction in FIG. 4) in which the main cam 132a is apart from the drive plate 106a, driven plate 107a and clutch retainer 108a in order to move the main cam 132a toward the reference position, wherein the release mechanism 171a is for reducing the drag between the plural drive plates 106a and the plural driven plates 107a. Moreover, the release mechanism 171a is an elastic member having generally an annular shape, and as shown in FIG. 4, it is held and fixed between the main cam 132a and a plate spline shaft section 112a. Therefore, when the main cam 132a moves toward the drive plate 106a, driven plate 107a, and clutch retainer 108a (to the right in the Y direction in FIG. 4), the biasing force in the direction in which the main cam 132 is apart from the drive plate 106a, driven plate 107a and clutch retainer 108a is produced.

The release mechanism 171a is configured to produce a biasing force that exceeds the total force obtained by summing the adhesive force of the oil exerted on the main cam 132a and the drive plate 106a, the friction force between the main cam projecting section 144a formed at the inner peripheral surface of the main cam 132a and the cam spline shaft section 143a formed to the shaft 113a, the rolling resistance force of the ball 134a, and the reaction force of the main cam 132a caused by the drag between the primary drive plate 135a and the primary driven plate 136a.

Namely, a spring constant or initial load for producing the biasing force larger than the above-described plural forces is set to the release mechanism 171a. As a result, when the press-contact force is not supplied from the cam mechanism 131, the main cam 132 is moved to the reference position from the operating position by the biasing force of the release mechanism 171a, so that the drag between the drive plate 106a and the main cam 132a can be reduced. Accordingly, the transmission of an extra driving force to the shaft 113a from the clutch drum section 105a due to the drag can be reduced.

As described above, the friction force is generated between the primary drive plate 135a and the primary driven plate 136a due to the press-contact force caused by the later-described piston mechanism 151a (see FIG. 3) in the present embodiment. The driving force transmitted from the clutch drum section 105a is amplified by the cam mechanism 131a (see FIG. 3) by means of the friction force generated between the primary drive plate 135a and the primary driven plate 136a, whereby the friction force is generated between the drive plate 106a and the driven plate 107a. Specifically, the friction force can be produced among each of the plates 135a, 136a, 106a and 107a by the press-contact force from the piston mechanism 151a.

The piston mechanism 151a (see FIG. 3) moves a piston main body 153a in the direction of the primary drive plate 135a and the primary driven plate 136a (in the Y direction in FIG. 4) by the rise in the pressure caused in a piston chamber 154a for producing the press-contact force, whereby the drag can be reduced by setting the gap between the primary drive plate 135a and the primary driven plate 136a.

On the other hand, there is a method in which a press-contact force is generated by means of an electromagnetic force so as to produce a friction force among each of the plates 135a, 136a, 106a and 107a. In this method, a coil is energized to produce the electromagnetic force, a magnetic flux is generated at the inside of a member called armature, and the armature attracts the coil, whereby the press-contact force can be produced. Specifically, this method employs a configuration in which plural plates (in the present embodiment, the primary drive plate 135a and the primary driven plate 136a) are arranged between the armature and the coil, the force by which the coil attracts the armature is defined as the press-contact force of the plural plates, and the friction force is generated between the plates by the pres-contact force.

Since the hydraulic pressure of the oil is not used in the method of generating the press-contact force by the electromagnetic force, it has a characteristic of less susceptible to the viscosity of the oil, but instead, it is necessary that the magnetic flux passes between the armature and the coil. Therefore, in the method of generating the press-contact force by using the electromagnetic force, plural plates should be configured by using only the member (mainly iron) for passing the magnetic flux.

In order to strongly stabilize the magnetic flux, the above-described plural plates (in the present embodiment, primary drive plate 135a and the primary driven plate 136a) and the armature should always be in contact with each other. As a result, the drag of the plates occurs, and by this drag, the cam mechanism 132a produces a thrust force (the force in the Y direction in FIG. 4). With this, the gap between the drive plate 106a and the driven plate 107a is reduced, which further causes the drag. Therefore, the release mechanism 171a should have a spring constant or initial load that exceeds the press-contact force by the thrust force in order to prevent the gap between the drive plate 106a and the driven plate 107a from being reduced, which entails the increase in size of the release mechanism 171a.

However, the present embodiment has a configuration in which the friction force is generated by the press-contact force of the piston mechanism 151a, so that it is unnecessary to form the plates from a member that passes a magnetic flux. Therefore, a material having no magnetic permeability (material other than a metal) can be used. In view of this, in the present embodiment, the primary drive plate 135a, the primary driven plate 136a, the drive plate 106a and the driven plate 107a are made of a paper material having no magnetic permeability.

Since the paper material is excellent in judder resistance compared to the member using a metallic material, it becomes unnecessary to perform a special processing for optimizing the surface shape of the plate in order to enhance the judder resistance or for stabilizing the friction characteristic due to the surface treatment of the plate, or to use a special oil for improving the friction characteristic, compared to the case in which a metallic material is used for the friction surface of each of the plates 135a, 136a, 106a and 107a. Consequently, it is unnecessary to add a production process for performing the special processing such as optimization of the surface shape of the plate or the stabilization of the friction characteristic according to the surface treatment of the plate and to add additives to the oil, with the result that the cost in the production process can be reduced, as well as a running cost can be reduced.

Since the press-contact force is not generated by a magnetic flux, it is unnecessary to strongly stabilize the magnetic flux, so that a gap can be formed between plural plates (in the present embodiment, primary drive plate 135a and the primary driven plate 136a). Therefore, there is no chance that the cam mechanism 132a produces a thrust force to reduce the gap between the drive plate 106a and the driven plate 107a by the drag between the primary drive plate 135a and the primary driven plate 136a, with the result that it is unnecessary to set the spring constant or initial load, which exceeds the press-contact force by the thrust force, and hence, the release mechanism 171a can be prevented from being increased in size.

Since the press-contact force generated by means of the electromagnetic force, the press-contact force generated by means of the hydraulic pressure of the oil, and the press-contact force amplified by the driving force are not mixedly present, the same material can be used for the plates, a single oil chamber can be used, and the oil of the same type can be used, whereby the cost can be reduced, the man hour for managing parts can be reduced, and man hour for assembly can be reduced.

Since the press-contact force generated by the hydraulic pressure of the oil, and the press-contact force amplified by the driving force are used in the present embodiment as described above, the range of the choice for the material of the plate is increased, compared to the case in which the press-contact force generated by using the electromagnetic force is employed, and the paper material having excellent judder resistance is selected, so that the necessity of the special processing for optimizing the surface shape of the plate and the use of the special oil for improving the friction characteristic is eliminated. Further, the drag is difficult to occur, so that the control precision of the driving force in case where a small driving force is transmitted can be enhanced.

Next, the piston mechanism 151a (see FIG. 3) will be explained. As shown in FIG. 4, the piston mechanism 151a is a mechanism for generating a press-contact force by the hydraulic pressure of the oil supplied from the oil supplying mechanism 200a (see FIG. 2) and transmitting the press-contact force to the cam mechanism 131a (see FIG. 3), and is configured to include a piston chamber 154a that is filled with the oil supplied from the oil supplying mechanism 200a, a piston main body 153a that generates the press-contact force by the hydraulic pressure of the oil supplied from the oil supplying mechanism 200a, a cylinder section 152a that is fitted at the outside of the piston main body 153a, a stem bleed screw 155a (see FIG. 6) that discharges the gas (air) entered in the oil filled in the piston chamber 154a, and a bearing B3a that smoothly transmits the press-contact force from the piston main body 153a to the pressing member 140a of the cam mechanism 131a rotating about the rotation axis P of the driving force adjusting section 100a with respect to the piston main body 153a.

The piston chamber 154a is a space formed by the structure in which the piston main body 153a having generally an annular shape is fitted at the inside of the cylinder section 152a having generally an annular shape, and is filled with the oil supplied from the oil supplying mechanism 200a (see FIG. 2). The stem bleeder 155a, which is a through-hole formed above the piston main body 153a, is arranged at the upper portion of the piston chamber 154a (at the upper portion in the Z direction in FIG. 6), and the piston chamber 154a communicates with an oil recovery chamber 64 through the stem bleeder 155a. Therefore, the oil supplied from the oil supplying mechanism 200a to the piston chamber 154a is discharged to the oil recovery chamber 64a with the gas (air) mixed in the oil.

The stem bleeder 155a is for discharging the gas (air) entered in the oil to the oil recovery chamber 64a, and it may be formed into an annular gap for allowing the gas (air) mixed in the oil to easily pass therethrough and preventing the oil to pass therethrough. The annular gap shape may be formed by inserting a cylindrical member, which is formed to have an outer diameter smaller than the inner diameter, into the stem bleeder 155a that is a through-hole.

The bearing B3a is arranged between the piston main body 153a (see FIG. 3) and the pressing member 140a of the cam mechanism 131a (see FIG. 3) so as to be adjacent to them, and the pressing member 140a of the cam mechanism 131a rotates with respect to the piston main body 153a since it rotates with the rotation of the hub section 102a. Specifically, the bearing B3a is operated so as not to generate the resistance caused by the difference in the revolution, and the press-contact force transmitted from the piston main body 153a is smoothly transmitted to the pressing member 140a of the cam mechanism 131a.

Since the press-contact force transmitted from the piston main body 153a (see FIG. 3) is amplified by the cam mechanism 131a (see FIG. 3), the press-contact force transmitted from the piston main body 153a can be made sufficiently small compared to the case in which the cam mechanism 131a is not provided. Therefore, the bearing B3a can be made to have a low load, compared to the case in which the cam mechanism 131a is not provided, whereby the choices of the bearing B3a are increased to reduce the cost.

Figure 6:
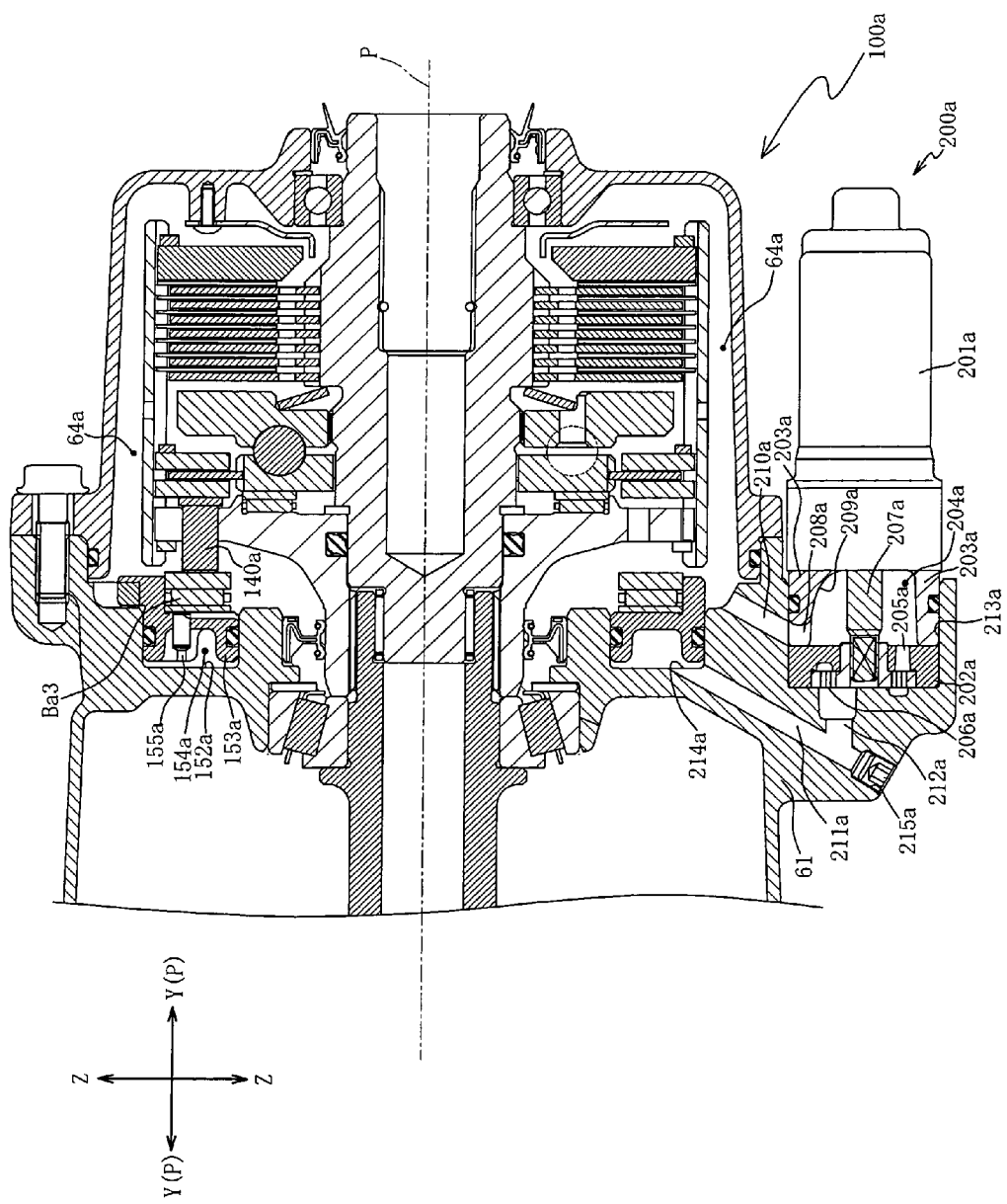
FIG. 6 is a sectional view of the driving force adjusting mechanism along a line VI-VI in FIG. 2.

Next, the detailed structure of the oil supplying mechanism 200a will be explained with reference to FIG. 6. FIG. 6 is a sectional view showing the driving force adjusting mechanism 60a along a line VI-VI in FIG. 2. In FIG. 6, the numerals relating to the connection mechanism 101a, cam mechanism 131a and release mechanism 171a are omitted in the illustration. An arrow Y in FIG. 6 indicates a side-to-side direction of the four-wheel-drive vehicle 1 that is the rotation axial direction P of the driving force adjusting section 100a, while an arrow Z indicates the vertical direction of the four-wheel-drive vehicle 1.

As shown in FIG. 6, the oil supplying mechanism 200a is for supplying the oil to the driving force adjusting section 100a, and is configured to include an electric motor 201a, an oil pump 202a that is driven by the electric motor 201a, an oil storage chamber 204a into which the oil fed by the oil pump 202a is stored, and an electric motor convex portion 203a that forms a wall section of the oil storage chamber 204a between the electric motor 201a and the oil pump 202a.

As shown in FIG. 6, the electric motor 201a, the electric motor convex portion 203a, and the oil pump 202a are arranged so as to be adjacent to one another in the rotation axial direction P (in the Y direction in FIG. 6) of the driving force adjusting section 100a. The oil storage chamber 204a is a space formed as enclosed by the electric motor 201a, the oil pump 202a that is in intimate contact with the leading edge surface (the face at the left side in the Y direction in FIG. 6) of the electric motor convex portion 203a, and the electric motor convex portion 203a. Specifically, the electric motor 201a and the oil pump 202a serve as a wall portion of the oil storage chamber 204a.

The electric motor 201a has a motor shaft section 207a that is a cylindrical shaft for outputting a rotational force. The motor shaft section 207a penetrates the oil storage chamber 204a to be coupled to the oil pump 202a. Specifically, the motor shaft section 207a is arranged in a part of the space of the oil storage chamber 204a, and the electric motor 201a and the oil pump 202a are connected with the shortest distance (on a straight line). Therefore, the space for arranging the motor shaft section 207a is saved at the outside of the oil storage chamber 204a, whereby the device composed of the electric motor 201a, the electric motor convex portion 203a and the oil pump 202a can be downsized.

Since the oil storage chamber 204a is arranged so as to be adjacent to the oil pump 202a at the horizontal position, the labor for sucking the oil and the duct resistance in the path can be reduced, compared to the case in which the oil storage chamber is arranged below so as to be apart from the oil pump 202a and the oil is sucked from the oil storage chamber arranged below through a sucking path.

The oil pump 202a has a pump inlet port 205a at the right side (the surface at the right side in the Y direction in FIG. 6) and a pump outlet port 206a at the left side (the surface at the left side in the Y direction in FIG. 6). Specifically, the oil supplying mechanism 200a is less susceptible to the duct resistance, since the direction of feeding the oil is linear upon feeding the oil from the oil storage chamber 204a, whereby the oil can efficiently be fed.

The electric motor convex portion 203a is a member having generally a cylindrical shape having the diameter same as that of the oil pump 202a, and has an oil recovery hole 208a and a pump inner wall 209a. The oil recovery hole 208a is a through-hole formed at the upper part (at the upper part in the Z direction in FIG. 6) of the electric motor convex section 203a, and is coupled to the oil recovery chamber 64a through a recovery path 210a. The pump inner wall 209a is an inner wall of the electric motor convex portion 203a continuously formed with the oil recovery hole 208a, and formed so as to be tilted in the upward direction toward the oil recovery hole 208a.

Accordingly, when the oil into which the gas (air) is mixed is flown in the oil storage chamber 204a from the oil recovery chamber 64a, the oil is conveyed to the oil recovery hole 208a without allowing the gas (air) to stay in the oil storage chamber 204a, whereby only the gas (air) can be returned to the oil recovery chamber 64a through the recovery path 210a.

Further, the pump inlet port 205a is arranged at the deep portion (at the lower part in the Z direction in FIG. 6) in the oil storage chamber 204a. Therefore, the ratio of the gas (air) arriving at the deep portion of the oil storage chamber 204a is very small, so that, even during when the gas (air) stays in the oil storage chamber 204a, the flow-in of this gas (air) into the oil pump 202a from the pump inlet port 205a can be extremely reduced.

As described above, the mixed gas (air) is easy to be discharged to the oil recovery chamber 64a and is difficult to flow in the oil pump 202a, so that the abnormal sound generated when the oil and the gas (air) are mixed in the oil pump 202a can be prevented, the gas (air) is difficult to be mixed in the oil fed by the oil pump 202a so as to reduce a damper effect, and the hydraulic pressure of the oil generated by the oil pump 202a can quickly be raised to the desired hydraulic pressure (the hydraulic pressure necessary for pressing the piston mechanism 151a).

The oil pump 202a and the electric motor convex portion 203a are members of generally a cylindrical shape having the same diameter, and are integrally fitted at the inside of a concave insertion hole 213a formed at the outer edge of the case 61, wherein the oil pump 202a is fixed as pressed against the case 61 by the electric motor convex portion 203a by fixing the electric motor 201a to the case 61.

As described above, the electric motor 201a, the electric motor convex portion 203a and the oil pump 202a are arranged so as to be adjacent to one another in the horizontal direction (in the Y direction in FIG. 6), and since the diameter of the electric motor 201a and the diameter of the electric motor convex portion 203a are the same, the electric motor 201a and the electric motor convex portion 203a can be inserted into the concave insertion hole 213a as superimposed, as well as can easily be assembled.

Since the electric motor 201a, the electric motor convex portion 203a and the oil pump 202a are integrally formed so as to be adjacent to one another in the rotation axial direction P, not only the oil pump supplying mechanism 200a can be downsized, but also the electric motor 201a, the electric motor convex portion 203a and the oil pump 202a can be combined to be easily attached to another device for use. Therefore, the general-purpose property of the device in which the electric motor 201a, the electric motor convex portion 203a and the oil pump 202a are integrally formed can be enhanced.

The oil supplying mechanism 200a recovers the oil after the circulation into which the gas (air) is mixed, separates the gas (air), and then, feeds the oil to the piston mechanism 151a. However, it is very difficult to completely remove the gas (air) mixed in the oil. In view of this, the piston mechanism 151a has the stem bleeder 155a arranged at the upper portion (at the upper portion in the Z direction in FIG. 6) of the piston chamber 154a in order to remove the gas (air) mixed into the oil.

Accordingly, even when the oil having the gas (air) mixed therein is fed to the piston mechanism 151a, the gas (air) is naturally conveyed to the upper part of the piston chamber 154a, and the gas (air) accumulated in the piston chamber 154a is discharged to the oil recovery chamber 64a together with the oil from the stem bleeder 155a.

As described above, even when the oil having the gas (air) mixed therein is fed to the piston chamber 154a, this gas (air) is discharged without being stayed, whereby the hydraulic pressure of the oil supplied from the oil supplying mechanism 200a can stably be changed to the press-contact force of the piston main body 153a.

When the state in which the oil pump 202a stops is continued for a long time, the oil in the piston chamber 154a gradually flows back to the oil recovery chamber 64a through the gap of the oil pump 202a, so that the gas (air), instead of the oil, is flown in the piston chamber 154a through the stem bleeder 155a.

When the pressure in the piston chamber 154a rises to the predetermined pressure from the state in which the gas (air) flows in the piston chamber 154a, the piston chamber 154a should be filled with the oil. Since the gas (air) is mixedly present until the oil is filled, the rise of the pressure in the piston chamber 154a is gentle. Therefore, it takes much time to increase the pressure to the predetermined pressure, whereby the control precision is deteriorated.

The present embodiment is configured to always supply the oil into the piston chamber 154a by operating the electric motor 201a at all times. With this structure, the piston chamber 154a is always filled with the oil, whereby the time for filling the oil into the piston chamber 154a is saved. Accordingly, the delay in the rise in the pressure in the piston chamber 154a is eliminated, so that the control precision can be improved.

The value of the pressure in the piston chamber 154a may be larger than the sliding resistance of piston seal members 218a and 219a. In this case, the piston main body 153a generates the press-contact force to reduce the gap between the primary plate 135a and the primary driven plate 136a, thereby eliminating the endplay. Therefore, the driving force is transmitted from the primary plate 135a to the primary driven plate 136a without causing a delay from the pressure rise in the piston chamber 154a.

Accordingly, the response delay of the transmission of the driving force with respect to the pressure rise in the piston chamber 154a is eliminated, whereby the responsiveness can be increased while improving the control precision. Since the number of the primary plates 135a and the primary driven plates 136a (see FIG. 4) is smaller than the number of the drive plates 106a and the driven plates 107a (see FIG. 4), the calorific value due to the drag is small by the reduced number. Further, the piston main body 153a is moved by the pressure in the piston chamber 154a, so that the endplay of the primary plate 135a and the primary driven plate 136a becomes 0 mm through the bearing B3a and the pressing member 140a. Even when the press-contact force is exerted on the primary plate 135a and the primary driven plate 136a, this press-contact force is about one-twentieth of the press-contact force exerted on the drive plate 106a and the driven plate 107a (see FIG. 4), so that the considerable calorific value is not generated.

Further, the value of the pressure in the piston chamber 154a may be set such that the press-contact force generated by the cam mechanism 131a (see FIG. 4) by this pressure becomes smaller than the biasing force of the release mechanism 171a (see FIG. 4). In this case, the movement of the main cam 132a (see FIG. 4) is restricted by the release mechanism 171a, so that the endplay of the drive plate 106a (see FIG. 4) and the driven plate 107a (see FIG. 4) is secured.

Accordingly, the press-contact force from the cam mechanism 131a (see FIG. 4) is not exerted on the drive plate 106a (see FIG. 4) and the driven plate 107a (see FIG. 4), whereby the drag torque generated between the drive plate 106a and the driven plate 107a can be reduced. As a result, the transmission of the surplus driving force to the shaft 113a (see FIG. 4) from the clutch drum section 105a (see FIG. 4) can be reduced.

Further, the biasing force of the release mechanism 171a may be set to the lower limit biasing force when it is mass-produced. In this case, the press-contact force from the cam mechanism 131a is not exerted on the drive plate 106a and the driven plate 107a even in the mass-produced product, whereby the drag torque generated between the drive plate 106a and the driven plate 107a can be reduced. Accordingly, even in the mass-produced product, the transmission of the surplus driving force to the shaft 113a (see FIG. 4) from the clutch drum section 105a (see FIG. 4) can be reduced.

As described above, the present embodiment reduces the drag torque generated between the drive plate 106a and the driven plate 107a by producing a predetermined pressure in the piston chamber 154a at all times by the oil pump 202a, thereby capable of enhancing the responsiveness without transmitting the surplus driving force.

The driving force adjusting mechanism 60a described above aims to enhance the turning performance of the four-wheel-drive vehicle 1 upon the turning, prevent the heat generation of the driving force adjusting section 100a upon the straight run with high speed, and enhance the responsiveness in the transmission of the driving force, by the driving force adjusting section 100a.

Specifically, when the four-wheel-drive vehicle 1 turns to the left, the output gear unit 52 rotates with the revolution speed faster than the average revolution speed of the front wheels 40a and 40b. Therefore, when the driving force transmitted from the output gear unit 52 is transmitted to the rear wheel 70a, the turning performance of the four-wheel-drive vehicle 1 is enhanced. Similarly, upon the rightward turn, the driving force transmitted from the output gear unit 52 is transmitted to the rear wheel 70b, thereby enhancing the turning performance. Specifically, the rear wheel (rear wheel 70a or rear wheel 70b) at the outside in the turning direction is driven, whereby the turning performance of the four-wheel-drive vehicle 1 is enhanced.

When the four-wheel-drive vehicle 1 goes straight, the driving force is not transmitted to the rear wheel 70a, and the difference in the revolution speed is produced between the output gear unit 52, to which the difference in the revolution speed is given with respect to the average revolution speed of the front wheels 40a and 40b for enhancing the turning performance and the rear wheel 70a having the revolution speed same as the average revolution speed of the front wheels 40a and 40b. However, a sufficient endplay can be secured, so that the occurrence of the drag torque can be prevented.

Compared to the primary plate 135a and the primary driven plate 136a, the number of the drive plate 106a and the driven plate 107a is larger, and the degree of the press-contact force applied thereto is larger, so that the generated drag torque is high. Therefore, in the present embodiment, the endplay between the drive plate 106a and the driven plate 107a is set within the range of about 0.5 mm to 1.0 mm, in order to prevent the heat generation of the driving force adjusting section 100a upon the straight run with high speed.

When the driving force adjusting section 100a transmits the driving force, the driving force is transmitted such that the gap between the primary plate 135a and the primary driven plate 136a and the gap between the drive plate 106a and the driven plate 107a are reduced to generate the friction force. Accordingly, the time taken for reducing the gap is defined as the responsiveness of the transmission of the driving force.

In view of this, in the present embodiment, the press-contact force is amplified by the cam mechanism 131a that is a mechanism for amplifying the rotational force to the press-contact force. Therefore, the endplay between the primary plate 135a and the primary driven plate 136a to which a weak force before the amplification is applied is set to about 0 mm, and the time taken for reducing the gap is set to about 0 second.

Moreover, the gap between the drive plate 106a and the driven plate 107a to which the endplay of about 0.5 mm to about 1.0 mm is set is reduced by utilizing the difference in the revolution speed. Therefore, even if there is the endplay of about 0.5 mm to about 1.0 mm, the endplay of about 0.5 mm to about 1.0 mm can be reduced with a speed, which is not considerable, by the difference in the revolution speed. As described above, the responsiveness of the transmission of the driving force can be enhanced.

Next, the structure of the oil path of the driving force adjusting mechanism 60a will be explained in detail with reference to FIG. 7. FIG. 7 is a view for showing the structure of the oil path in the driving force adjusting mechanism 60a, wherein FIG. 7(a) is a schematic view showing the schematic structure of the oil path in the driving force adjusting mechanism 60a viewed in the rotation axial direction P, FIG. 7(b) is a sectional view along a line VIIb-VIIb in FIG. 7(a), and FIG. 7(c) is a sectional view along a line VIIC-VIIc in FIG. 7(a).

In FIG. 7, the hatched portion is the oil path. In FIG. 7, the sectional line except for the oil path is omitted in the illustration. An arrow X in FIG. 7 indicates the front-to-rear direction of the four-wheel-drive vehicle 1 (see FIG. 1) and the rotation axial direction T of the driving force distributing mechanism 50 (see FIG. 1), while an arrow Z indicates the vertical direction of the four-wheel-drive vehicle 1.

The oil path of the driving force adjusting mechanism 60a is a path for supplying the oil that operates the piston main body 153a of the piston mechanism 151a. The oil path of the driving force adjusting mechanism 60a is a mechanism for circulating the oil and discharging the gas (air) mixed in the oil without being stayed, in order to reduce the damper effect due to the mixed gas (air) and quickly stabilize the hydraulic pressure of the oil.

Figure 7A:
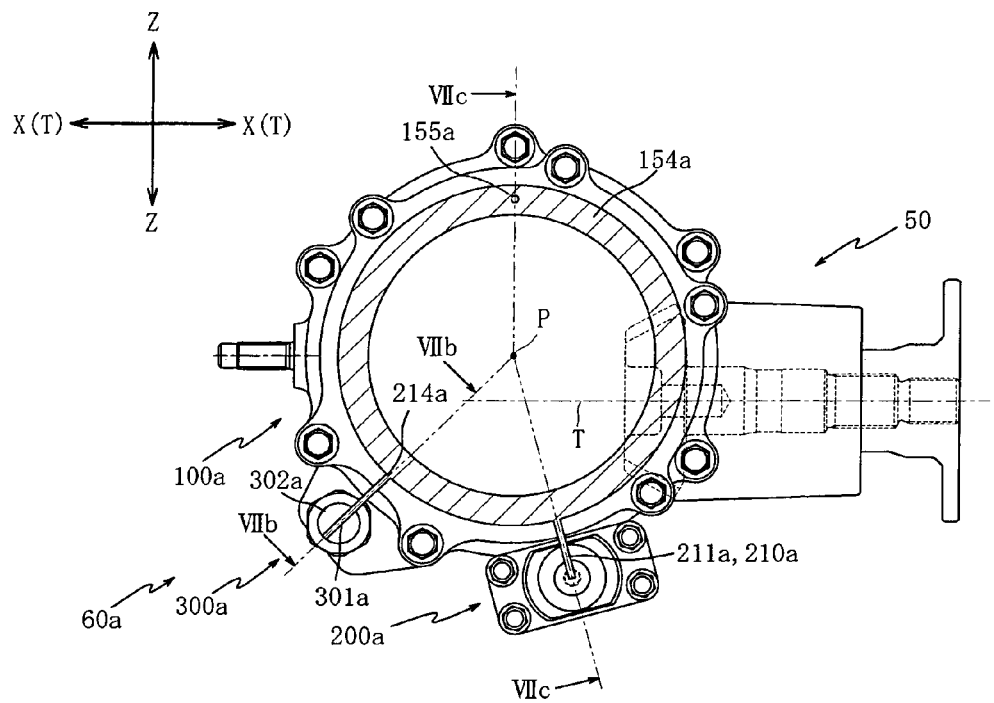
FIG. 7 is a diagram showing a configuration of an oil path of the driving force adjusting mechanism, wherein FIG. 7 (a) is a schematic diagram schematically showing the path of an oil viewed in the rotation axial direction P of the driving force adjusting mechanism, FIG. 7 (b) is a sectional view along a line VIIb-VIIb in FIG. 7(a), and FIG. 7 (c) is a sectional view along a line VIIc-VIIc in FIG. 7(a).
Figure 7B:
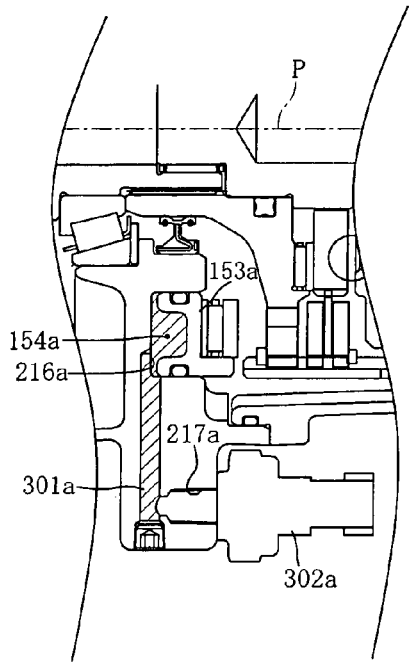
Figure 7C:
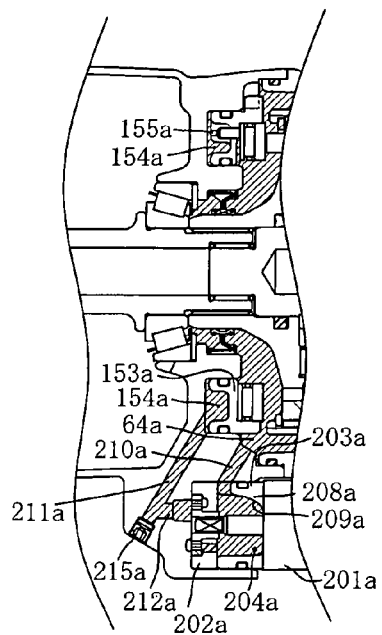

As shown in FIG. 7(a), in the oil path of the driving force adjusting mechanism 60a, a flow path through which the oil flows is formed by the piston chamber 154a having generally an annular shape, the pressure detecting path 301a formed as communicating with the piston chamber 154a, a pressure sensor 302a mounted to the pressure detecting path 301a, and a first supply path 211a formed as communicating with the piston chamber 154a.

As shown in FIG. 7(c), in the oil path of the driving force adjusting mechanism 60a, a flow path through which the oil flows is formed by a second supply path 212a formed as communicating with the first supply path 211a, the oil pump 202a that feeds the oil to the second supply path 212a, the oil storage chamber 204a for storing the oil fed to the oil pump 202a, the recovery path 210a formed as communicating with the oil storage chamber 204a and the oil recovery chamber 64a, the stem bleeder 155a formed as communicating with the upper part of the piston chamber 154a, and the oil recovery chamber 64a communicating with the piston chamber 154a by the stem bleeder 155a.

As shown in FIG. 7(a), the piston chamber 154a is an annular path, and has the stem bleeder 155a at its upper part (at the upper part in the Z direction in FIG. 7(a)). Specifically, the gas (air) mixed in the oil flown in the piston chamber 154a is conveyed along the wall face (curved face) of the piston chamber 154a, and discharged from the stem bleeder 155a formed at the upper part of the piston chamber 154a together with the oil fed from the oil pump 202a.

Accordingly, the gas mixed in the oil is conveyed to the upper part by the curved surface of the piston chamber 154a, so that the gas can be prevented from being stayed in the piston chamber 154a. As a result, the damper effect due to the mixed gas (air) can be reduced, and the hydraulic pressure of the oil can quickly be stabilized.

As shown in FIG. 7(a), the pressure detecting path 301a is a linear hole with a tilt with respect to the horizontal surface, and the upper end of the pressure detecting path (the upper end in the Z direction in FIG. 7(a)) is formed below the stem bleeder 155a of the piston chamber 154a as communicating through an opening 214a.

Accordingly, the pressure detecting path 301a is formed so as to be upwardly tilted toward the piston chamber 154a, whereby the gas (air) entering the pressure detecting path 301a can be conveyed to the piston chamber 154a along the wall face of the pressure detecting path 301a. Therefore, the gas (air) entering the pressure detecting path 301a is smoothly discharged from the stem bleeder 155a, with the result that the oil having the volume same as the amount of change of the volume of the gas (air) by the hydraulic pressure of the oil does not need to be press-fed, and hence, the damper effect can be reduced, compared to the case in which the gas (air) stays in the piston chamber 154a and the pressure detecting path 301a. Consequently, the hydraulic pressure of the oil fed by the oil pump 202a can quickly be stabilized.

A screw groove for screwing up the pressure sensor 302a is formed to the second mounting opening 217a formed continuously with the lower end portion (lower end portion in the Z direction in FIG. 7(b)) of the pressure detecting path 301a, and the pressure sensor 302a is mounted by being screwed up to the second mounting opening 217a of the pressure detecting path 301a.

Since the pressure sensor 302a is mounted below the stem bleeder 155a (downward in the Z direction in FIG. 7(a)) as described above, the pressure sensor 302a is not affected by the gas (air) even when the gas (air) remains above the stem bleeder 155a (upward in the Z direction in FIG. 7(a)). As a result, the measurement precision of the hydraulic pressure of the oil measured by the pressure sensor 302a can be enhanced.

As shown in FIG. 7(c), the first supply path 211a is a linear hole tilted with respect to the horizontal surface, like the pressure detecting path 301a. The upper end of the first supply path 211a is formed as communicating with the piston chamber 154a, and a mounting opening 215a is continuously formed with the lower end portion of the first supply path 211a so as to upwardly tilt toward the piston chamber 154a.

Therefore, the gas (air) entering the first supply path 211a is conveyed along the wall face of the first supply path 211a, and is discharged to the piston chamber 154a. Therefore, like the pressure detecting path 301a, the oil having the volume same as the amount of change of the volume of the gas (air) by the hydraulic pressure of the oil does not need to be press-fed from the oil pump 202a, and hence, the damper effect can be reduced. Consequently, the hydraulic pressure of the oil fed by the oil pump 202a can quickly be stabilized.

The hydraulic pressure value of the oil detected by the pressure sensor 302a (see FIG. 7(b)) is converted into an electric signal by the pressure sensor 302a, and sent to the ECU 80 (see FIG. 1) through the input line 81a (see FIG. 1). The electric motor 201a constituting the oil supplying mechanism 200a is controlled by the ECU 80 on the basis of the electric signal sent from the pressure sensor 302a through the output line 82a (see FIG. 1). Specifically, the feedback control of the electric motor 201a is performed by the ECU 80 on the basis of the hydraulic value of the detected oil. Therefore, enhancing the detection precision of the hydraulic pressure of the oil leads to the enhancement of the precision in the feedback control.

Specifically, the feedback control is for setting an output signal corresponding to the electric signal sent from the pressure sensor 302a (see FIG. 7(b)) by using a pressure control program 87 (see FIG. 1) stored in the ROM 84 (see FIG. 1). As described above, the pressure control program 87 is a program for setting a power value supplied to the electric motor 201a in order to supply the pressure necessary for transmitting the target driving force to the piston chamber 154a.

Commercially available products are used for the electric motor 201a and the oil pump 202a for reducing the cost. However, the electric motor 201a that is a commercially available product has an output variation, and the oil pump 202a that is a commercially available product has a variation in the sliding resistance. Specifically, even if the power value supplied to the electric motor 201a is constant, the variation is produced in the pressure in the piston chamber 154a caused by the electric motor 201a.

However, in the present embodiment, the electric motor 201a is controlled such that the pressure necessary for transmitting the target driving force is supplied to the piston chamber 154a on the basis of the electric signal of the pressure sensor 302a by the feedback control. Therefore, even if the electric motor 201a and the oil pump 202a that are commercially available products are used, the pressure value in the piston chamber 154a can be adjusted to a desired value.

There may be the case in which the temperature of the oil supplying mechanism 200a itself changes, by which the viscosity of the oil, each of the clearances, and the output characteristic of the electric motor 201a change so as to change the pressure value in the piston chamber 154a with respect to the power value supplied to the electric motor 201a. However, in the present embodiment, the electric motor 201a is controlled such that the pressure necessary for transmitting the target driving force is supplied to the piston chamber 154a on the basis of the electric signal of the pressure sensor 302a by the feedback control. Therefore, even if the viscosity of the oil, each of the clearances, and the output characteristic of the electric motor 201a change, the pressure value in the piston chamber 154a can be adjusted to a desired value.

Since the pressure in the piston chamber 154a can precisely be set by the feedback control, regardless of the variation or the temperature change of the oil supplying mechanism 200a, a desired driving force can be transmitted from the rear wheel 70a (see FIG. 1) from the output gear unit 52, even if the driving condition of the four-wheel-drive vehicle 1 (see FIG. 1) having mounted thereto the driving force adjusting section 100a that adjusts the transmission of the driving force changes according to the oil supplying mechanism 200a.

As shown in FIG. 7(b), in the present embodiment, the pressure sensor 302a is mounted to the pressure detecting path 301a, not to the piston chamber 154a. As stated above, the pressure detecting path 301a is formed such that the upper end thereof communicates with the piston chamber 154a, whereby it is configured such that the oil flow is difficult to be produced in the pressure detecting path 301a. Further, the gas in the pressure detecting path 301a is conveyed to the piston chamber 154a, so that the pressure sensor 302a is positioned in the oil.

Therefore, the pressure loss caused by the oil flow is not produced. Accordingly, the hydraulic pressure of the oil in the piston chamber 154a can be measured without being affected by the oil flow. Thus, the detection precision of the hydraulic pressure of the oil can be enhanced, since the pressure sensor 302a is positioned in the oil without being in contact with the gas.

Figure 9:
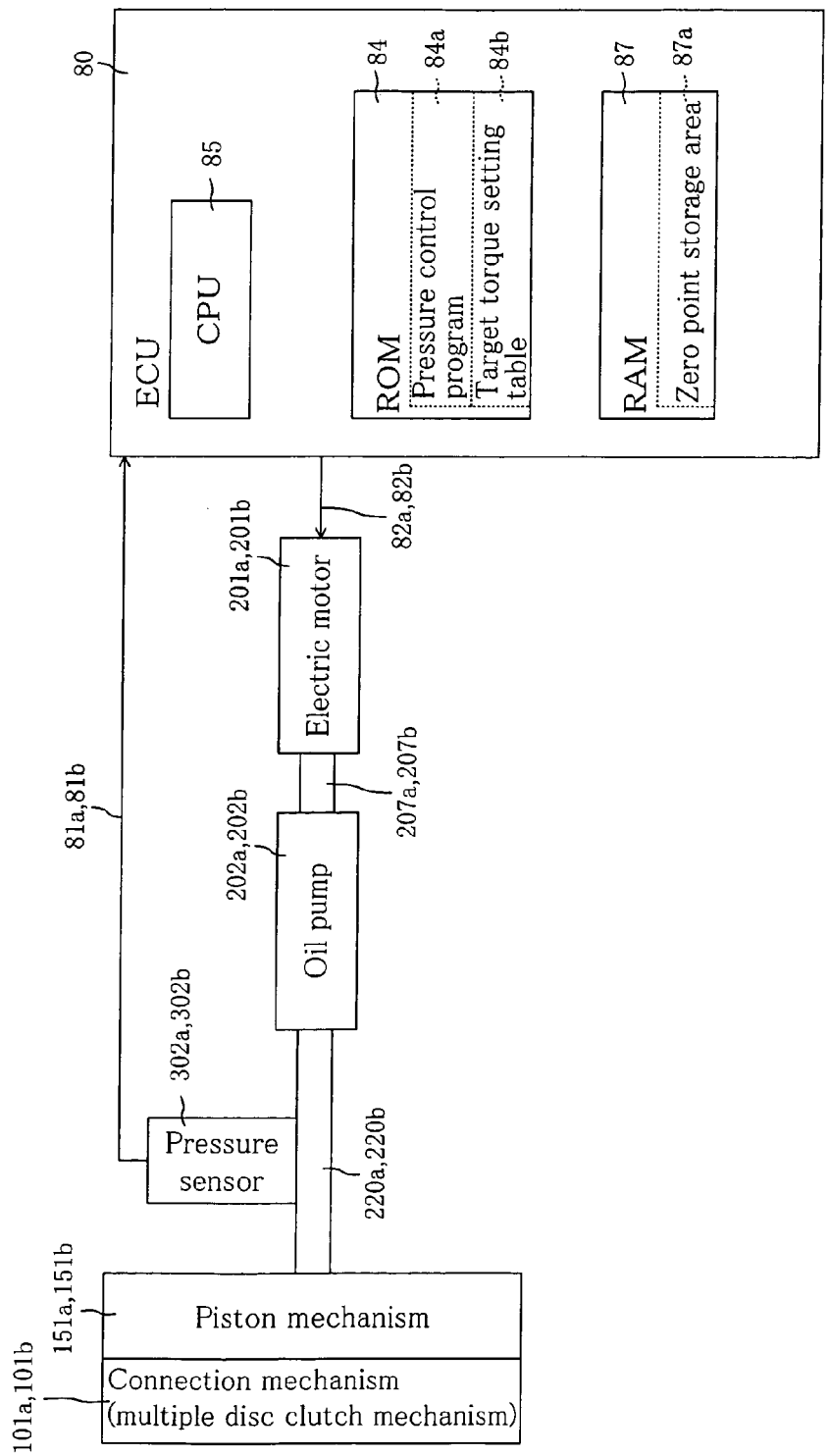
FIG. 9 is a diagram schematically showing a configuration necessary for performing a feedback control.
Figure 10:
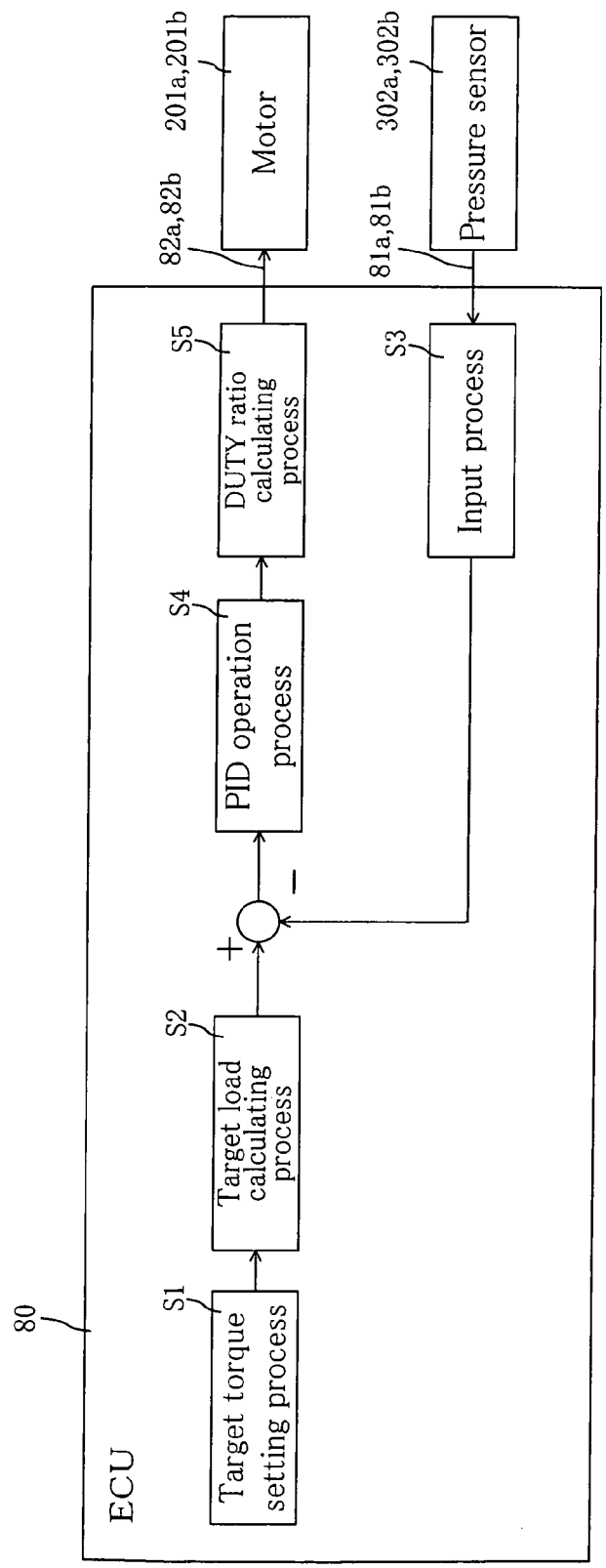
FIG. 10 is a diagram schematically showing the feedback control executed by an ECU.
Figure 11:
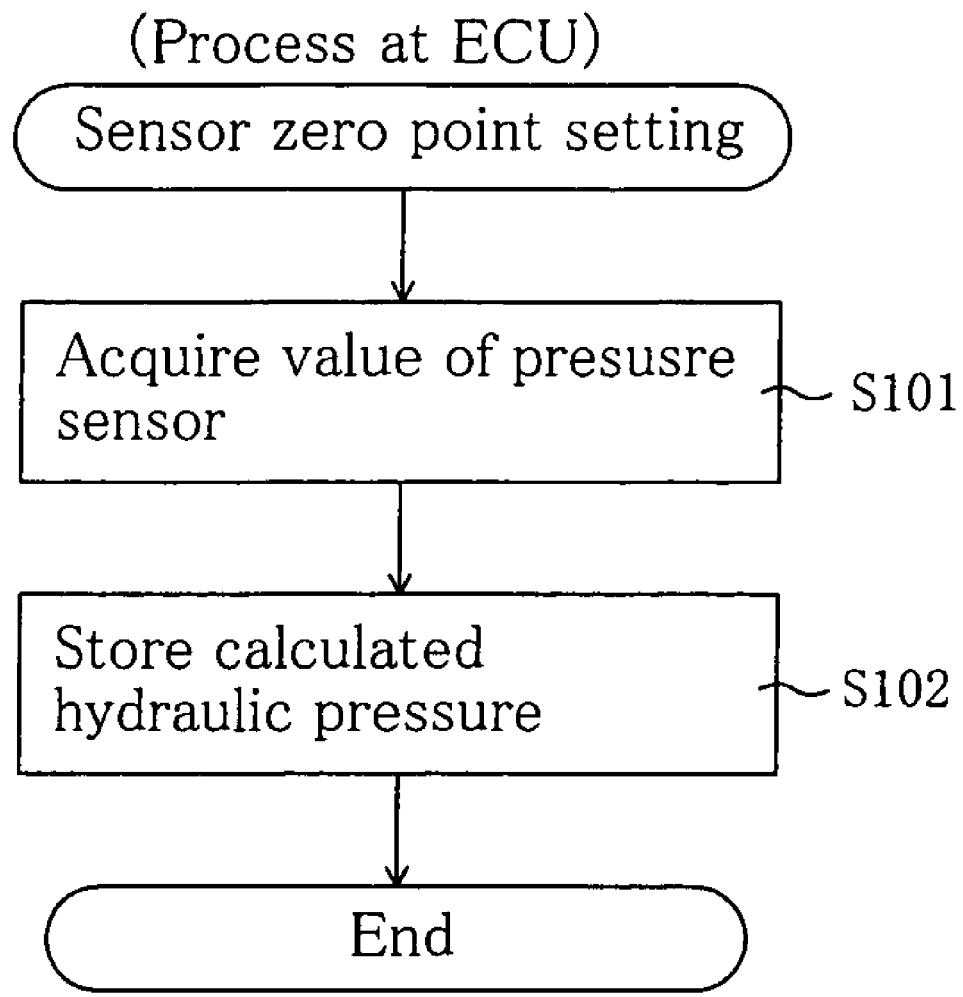
FIG. 11 is a flowchart showing a pressure sensor zero point setting process executed by a CPU.
Figure 12:
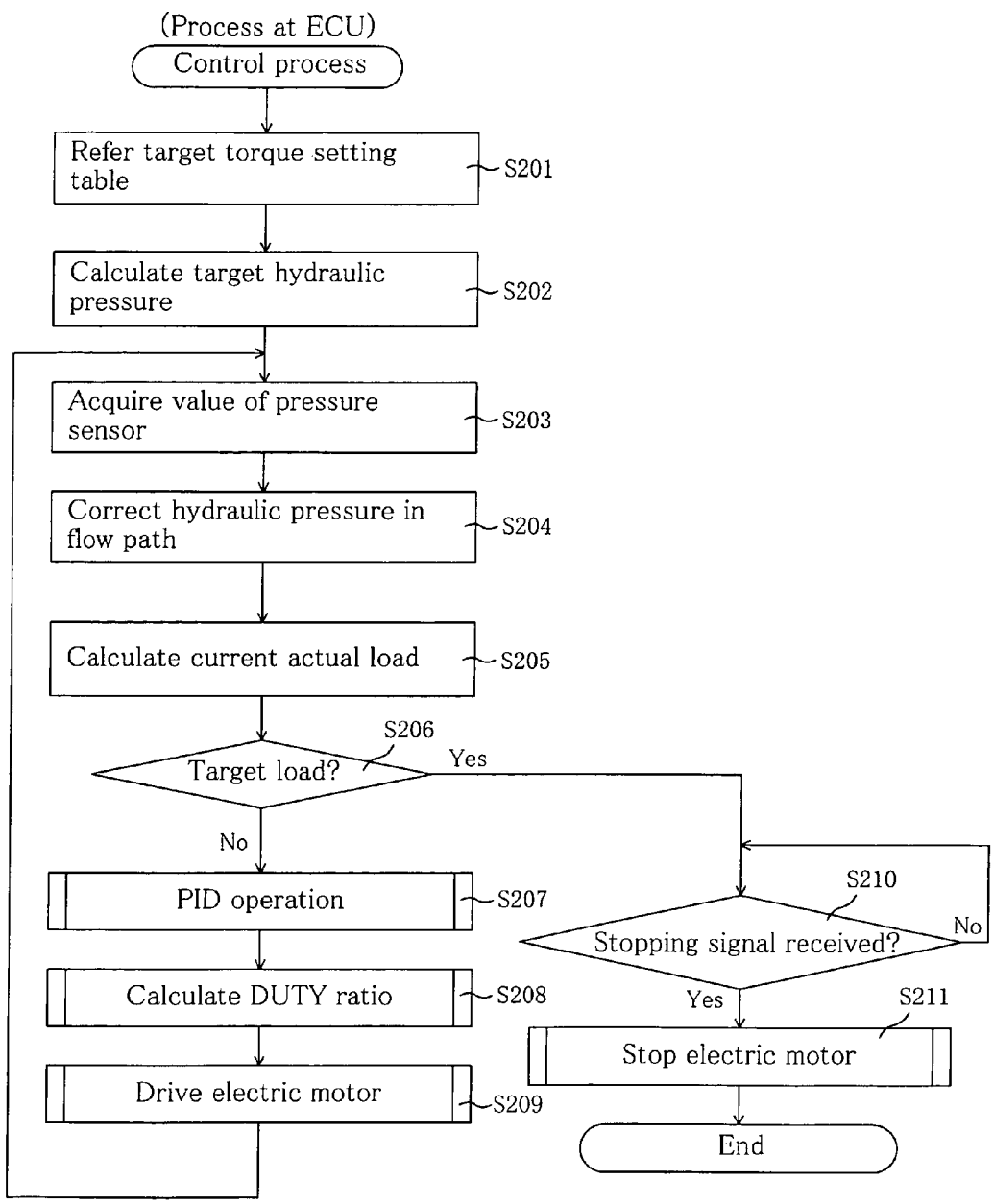
FIG. 12 is a flowchart showing a pressure control process executed by the CPU.

The feedback control performed by the above-described ECU 80 will be explained below with reference to FIGS. 9 to 12. FIG. 9 is a diagram schematically showing the configuration necessary for executing the feedback control. FIG. 10 is a diagram schematically showing the feedback control executed by the ECU 80. FIG. 11 is a flowchart showing a pressure sensor zero point setting process executed by the CPU 85 in the present embodiment. FIG. 12 is a flowchart showing a pressure control process executed by the CPU 84 in the present embodiment.

Firstly, the configuration necessary for executing the feedback control will be explained with reference to FIG. 9. Each configuration shown in FIG. 9 is the one schematically showing the above-described configuration, so that the detailed explanation thereof is omitted.

As shown in FIG. 9, the ECU 80 is configured to include the CPU 85, ROM 84, and RAM 87. Provided to the ROM 84 are a pressure control program 84a for controlling the electric motors 201a and 201b by the feedback control, and a target torque setting table 84b used for setting a torque for transmitting the torque inputted from the center drive shaft 94 (see FIG. 1) to the rear drive shafts 95a and 95b (see FIG. 1). Provided to the RAM 87 is a zero point storage area 87a that stores the zero point of the pressure sensors 302a and 302b set by the later-described pressure sensor zero point setting process (see FIG. 11).

Instead of the RAM 87, a flash ROM, which is a rewritable non-volatile storage device, may be used, and the zero point of the pressure sensors 302a and 302b may always be stored in this flash ROM.

The ECU 80 and the electric motors 201a and 201b are connected by the output lines 82a and 82b, wherein current (or voltage) for driving the electric motors 201a and 201b are supplied through the output lines 82a and 82b.

The electric motors 201a and 201b and the oil pumps 202a and 202b are coupled by the motor shaft sections 207a and 207b, wherein the rotational force (driving force) of the electric motors 201a and 201b is transmitted to the oil pumps 202a and 202b through the motor shaft sections 207a and 207b.

The oil pumps 202a and 202b and the piston mechanisms 151a and 151b are communicated with each other by flow paths 220a and 220b (the flow path including the first supply path 211a and 211b, the second supply path 212a and 212b, and the piston chambers 154a and 154b), wherein the oil is fed to the flow paths 220a and 220b from the oil pumps 202a and 202b, while the hydraulic pressure is supplied to the piston mechanisms 151a and 151b.

The piston mechanisms 151a and 151b are configured to be capable of pressing the connection mechanisms 101a and 101b in such a manner that the center drive shaft 94 (see FIG. 1) and the rear drive shafts 95a and 95b (see FIG. 1) are coupled to each other with a multiple disc clutch mechanism of the connection mechanisms 101a and 101b.

Specifically, when the hydraulic pressure is supplied to the oil pumps 202a and 202b, the piston mechanisms 151a and 151b make an extension movement to press the connection mechanisms 101a and 101b, thereby coupling the center drive shaft 94 and the rear drive shafts 95a and 95b. Further, when the oil pumps 202a and 202b are stopped, the piston mechanisms 151a and 151b make a contraction movement to release the pressing to the connection mechanisms 101a and 101b, thereby disconnecting the center drive shaft 94 and the rear drive shafts 95a and 95b.

The pressure sensors 302a and 302b are mounted to the flow paths 220a and 220b, so that the hydraulic pressure in the flow paths 220a and 220b can be detected. The pressure sensors 302a and 302b are connected to the ECU 80 through the input lines 81a and 81b, wherein the value detected by the pressure sensors 302a and 302b are inputted to the ECU 80 from the input lines 81a and 81b.

Next, the feedback control executed by the ECU 80 will be explained. In the feedback control executed by the ECU 80, a drive signal for instructing the drive of the rear drive shafts 95a and 95b (see FIG. 1) transmitted from the control section (not shown) of the four-wheel-drive vehicle 1 is firstly received, and the target torque is set from the information (the information for instructing the driving force that should be transmitted to the rear drive shafts 95a and 95b) contained in the drive signal, in the target torque value setting process (S1 in FIG. 10).

Then, in the target load calculating process, a target load, which is a load for pressing the connection mechanisms 101a and 101b by the piston mechanisms 151a and 151b, is calculated from the target torque value set in the target torque value setting process (S2 in FIG. 10).

Next, in the input process, the hydraulic pressure is calculated from the information inputted from the pressure sensors 302a and 302b (S3 in FIG. 10), and a PID operation process is executed on the basis of the hydraulic pressure calculated in the input process and the target load calculated in the target load calculating process (S4 in FIG. 10). In the PID operation process, an integration or differentiation are performed from the deviation between the hydraulic pressure in the flow paths 220a and 220b when it becomes the target load and the hydraulic pressure inputted in the input process. The PID operation process is a known process, so that the detailed explanation thereof is omitted.

The value of the current (or the value of the voltage) supplied to the electric motors 201a and 201b and the interval of the supply (applied interval) are calculated in a DUTY ratio calculating process on the basis of the result of the calculation in the PID operation process (S5 in FIG. 10). The DUTY ratio calculating process is a process for setting the value of the current supplied to the electric motors 201a and 201b and its applied interval in order to intermittently drive the electric motors 201a and 201b, and this process is a known process, so that the detailed explanation thereof is omitted.

As described above, in the feedback control executed by the ECU 80, the PID operation process and the DUTY ratio calculating process are executed on the basis of the deviation between the hydraulic pressure in the flow paths 220a and 220b detected by the pressure sensors 302a and 302b and the hydraulic pressure in the flow paths 220a and 220b that is set according to the target torque value and is to become the target load, thereby controlling the drive of the electric motors 201a and 201b.

The manner of setting the zero point (initial value) of the hydraulic pressure detected by the pressure sensors 302a and 302b will be explained here with reference to FIG. 11. The pressure sensor zero point setting process is a process executed when a user gives an instruction to start the drive of the four-wheel-drive vehicle 1 or the user gives an instruction to stop the drive. Specifically, it is a process executed when the operation for starting the driving of the four-wheel-drive vehicle 1 by a driver (an operation for inserting a key and turning the key (operation of ignition-ON)) or the operation for stopping the driving (the operation for inversely turning the key (ignition-OFF)) is detected.

The pressure sensor zero point setting process may be executed when the electric power supply to the electric motors 201a and 201b through the operation of the key or the stop of the electric power supply is detected.

When the pressure sensor zero point setting process is executed, the value of the hydraulic pressure detected by the pressure sensors 302a and 302b is firstly acquired so as to calculate the hydraulic pressure in the flow paths 220a and 220b (S101), the calculated value of the hydraulic pressure is stored in the zero point storage area 87a (S102), and then, the process is ended.

In the pressure sensor zero point setting process, the value detected by the pressure sensors 302a and 302b is acquired at the timing when the driving is started from the state in which the four-wheel-drive vehicle 1 stops or at the timing when the four-wheel-drive vehicle 1 stops from the state in which it is driven, and the hydraulic pressure corresponding to this value is defined as the zero point. Therefore, the hydraulic pressure in the flow paths 220a and 220b in the state in which the electric motors 201a and 201b are not driven can be set as the zero point, whereby the zero point according to the service environment and the duration of service of the pressure sensors 302a and 302b can correctly be set.

Subsequently, the pressure control process executed when the piston mechanisms 151a and 151b are driven will be explained with reference to FIG. 12. The pressure control process is a process that is executed by reading the pressure control program 84a, and executed when the drive signal that is transmitted from the control section (not shown) of the four-wheel-drive vehicle 1 for instructing the drive of the rear drive shafts 95a and 95b is received.

When the pressure control process is executed, the target torque according to the drive signal is set by referring to the target torque setting table 84b in order to set the target torque from the information received from the four-wheel-drive vehicle 1 and contained in the drive signal (the information for instructing the driving force that should be transmitted to the rear drive shafts 95a and 95b) (S201, S1 in FIG. 11). The process at S201 is for acquiring the torque value corresponding to the driving force, which should be transmitted to the rear drive shafts 95a and 95b instructed by the drive signal, from the target torque setting table 84b, and setting the acquired value as the target torque value.

When the target torque is set in the process at S201, the target load for pressing the connection mechanisms 101a and 101b by the piston mechanisms 151a and 151b is calculated from the set target torque value (S202, S2 in FIG. 11). In the process at S202, the target load is calculated from various conditions such as the length, diameter, shape and duct resistance of the flow paths 220a and 220b, the structure of the piston mechanisms 151a and 151b, the structure of the connection mechanisms 101a and 101b, or the like. For example, a coefficient that is multiplied to the target torque value is set beforehand, and the target load is calculated by multiplying the coefficient. The method of setting the coefficient beforehand to calculate the target load is only one example, and any methods may be employed as the calculation method.

When the target load is set in the process at S202, the value of the pressure sensors 302a and 302b is subsequently acquired, whereby the hydraulic pressure in the flow paths 220a and 220b is calculated from the acquired value of the pressure sensors 302a and 302b (S203, a part of S3 in FIG. 11).

Then, the hydraulic pressure stored in the zero point storage area 87a is read, and the hydraulic pressure in the flow paths 220a and 220b calculated at the process at S203 is corrected on the basis of the difference (S204, a part of S3 in FIG. 11). Then, the current actual load is calculated from the corrected hydraulic pressure in the flow paths 220a and 220b (S205). The method of calculating the actual load is the same as the method of calculating the target load in the process at S202.

When the actual load is calculated in the process at S205, it is determined whether or not the calculated actual load reaches the target load calculated in the process at S202 (S206). When it does not reach the target load (S206: No), the PID operation process is executed on the basis of the deviation between the actual load calculated in the process at S205 and the target load calculated in the process at S202 (S207, S4 in FIG. 10), in order to continue the drive of the electric motors 201a and 201b (see FIG. 9).

When the PID operation process is executed in the process at S207, the value of the current supplied to the electric motors 201a and 201b and its interval are calculated according to the DUTY ratio calculating process on the basis of the result of the operation (S208, S5 in FIG. 10), whereby the electric motors 201a and 201b are driven by the electric motor driving process on the basis of the result of the calculation (S209).

When the electric motor driving process is completed in the process at S209, the program returns to the process at S203 where the value of the pressure sensors 302a and 302b is again acquired and the process after S203 is executed (the feedback control is executed).

On the other hand, when the actual load calculated in the process at S205 reaches the target load calculated in the process at S202 in the process at S206 (S206: Yes), there is no need to further feed the oil to the flow paths 220a and 220b from the oil pumps 202a and 202b, so that the program waits until receiving the drive stop signal transmitted from the control section (not shown) of the four-wheel-drive vehicle 1 while maintaining the hydraulic pressure in the flow paths 220a and 220b (S210: No).

When the drive stop signal is received from the control section of the four-wheel-drive vehicle 1 (S210: Yes), the hydraulic pressure in the flow paths 220a and 220b is returned, the electric motors 201a and 201b are stopped by the electric motor stopping process in order to release the press-contact of the connection mechanisms 101a and 101b by the piston mechanisms 151a and 151b (S211), and then, this process is ended.

As explained above, according to the present embodiment, the hydraulic pressure in the flow paths 220a and 220b when a driver starts to drive the four-wheel-drive vehicle 1 is detected by the pressure sensors 302a and 302b, and its value is stored in the zero point storage area 87a. Then, the actual value of the pressure sensors 302a and 302b in the state in which the piston mechanisms 151a and 151b are operated is corrected on the basis of the value stored in the zero point storage area 87a, whereby the electric motors 201a and 201b are driven according to the corrected value.

In general, the value of the hydraulic pressure detected by the pressure sensors 302a and 302b is different from the actual hydraulic value depending upon the manufacturing variation caused by the dimensional error upon the manufacture, ambient temperature, duration of service of the pressure sensors 302a and 302b, etc. Therefore, when the hydraulic pressure in the flow paths 220a and 220b is adjusted by referring to a table that stores beforehand the hydraulic value and the value of the current supplied to the electric motors 201a and 201b as associated with each other, it is difficult to adjust the hydraulic pressure in the flow paths 220a and 220b to a desired hydraulic pressure.

However, the value detected by the pressure sensors 302a and 302b in the state in which the driving of the four-wheel-drive vehicle 1 is started or stopped, i.e., when the flow paths 220a and 220b are in their initial state (when the hydraulic pressure is not applied) is defined as the zero point, the actual value of the pressure sensors 302a and 302b is corrected from this zero point, and the electric motors 201a and 201b are driven according to the corrected value. Therefore, the variation in the detected value caused by the manufacturing variation, ambient temperature, duration of service, etc. can be prevented, whereby the flow paths 220a and 220b can be adjusted to have the desired hydraulic pressure.

Next, a second embodiment will be explained with reference to FIG. 13. The first embodiment is configured such that the pressure sensor 302a is mounted to the pressure detecting path 301a. Instead of this, the second embodiment is configured such that the pressure sensor 302a is mounted to the first supply path 211a. The second embodiment is the same as the first embodiment except for the mounting position of the pressure sensor 302a. Therefore, like parts in the first embodiment are given like numerals, and the explanation thereof is omitted.

Figure 13:
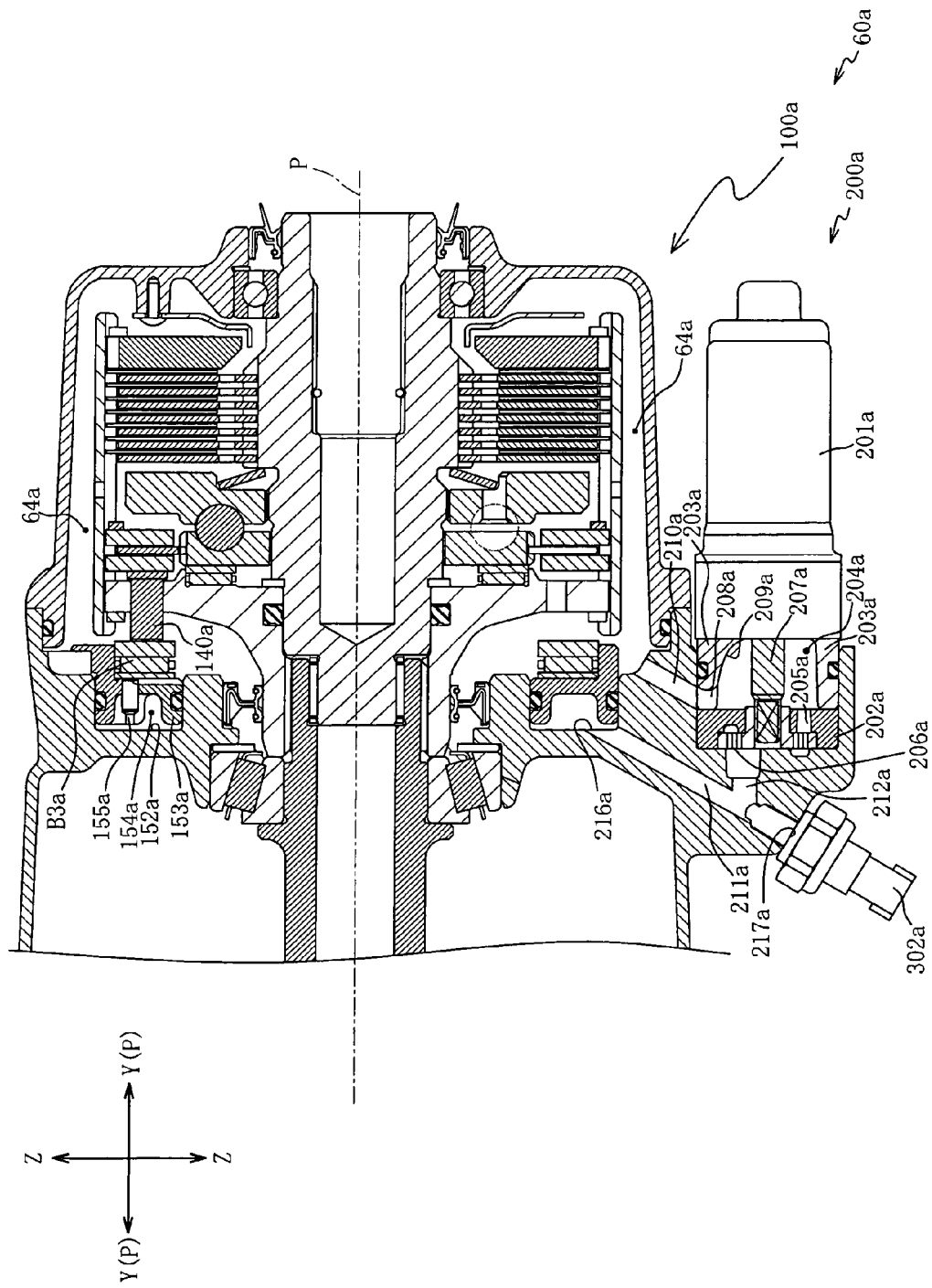
FIG. 13 is a sectional view showing a driving force adjusting mechanism according to a second embodiment.

FIG. 13 is a sectional view showing the driving force adjusting mechanism 60a according to the second embodiment. The numerals of the driving force adjusting mechanism 60a are omitted in the illustration in FIG. 13. An arrow Y in FIG. 13 indicates the side-to-side direction of the four-wheel-drive vehicle 1 and the rotation axial direction P of the driving force adjusting mechanisms 60a and 60b, while an arrow Z indicates the vertical direction of the four-wheel-drive vehicle 1.

As shown in FIG. 13, the pressure sensor 302a is mounted to a second mounting opening 217a that is formed at the lower end (lower end in the Z direction in FIG. 13) of the first supply path 211a, which is the position symmetric with the second opening 216a continuously formed with the upper end (upper end in the Z direction in FIG. 13) of the first supply path 211a. In this case, a buried cap screw for shielding the lower end of the first supply path 211a is unnecessary, whereby the number of components can be reduced, and the cost can be reduced. Further, the first supply path 211a can be shielded to the outside only by mounting the pressure sensor 302a, so that the production process can be reduced, and the cost can be reduced. Since the second embodiment does not need the pressure detecting path 301a, labor for processing is eliminated, and the cost can be reduced.

Next, a third embodiment will be explained with reference to FIGS. 14 to 16. In the first embodiment, the hydraulic pressure detected by the pressure sensors 302a and 302b in the state in which the four-wheel-drive vehicle 1 starts to be driven and the hydraulic pressure is not applied to the flow paths 220a and 220b (the electric motors 201a and 201b are not driven) is stored in the zero point storage area 87a. Alternatively, in the third embodiment, the flow paths 220a and 220b are temporarily have provided with a negative pressure, and the hydraulic pressure detected by the pressure sensors 302a and 302b after a predetermined time (0.5 second in the present embodiment) is stored in the zero point storage area 87a. The components in the third embodiment same as those in the first embodiment are identified by the same numerals, and the explanation thereof is omitted.

In the explanation of the third embodiment, the pressure sensor zero point setting process executed by the CPU 85 will be firstly explained with reference to FIG. 14, and then, the change in the hydraulic pressure in the flow paths 220a and 220b when the pressure sensor zero point setting process is executed will be explained with reference to FIG. 15. Then, finally, a manner of setting the revolution speed and revolution angle (time) in the case in which the electric motors 201a and 201b are inversely rotated and a manner of setting the opening amount of the stem bleeders 155a and 155b will be explained with reference to FIG. 16.

Figure 14:
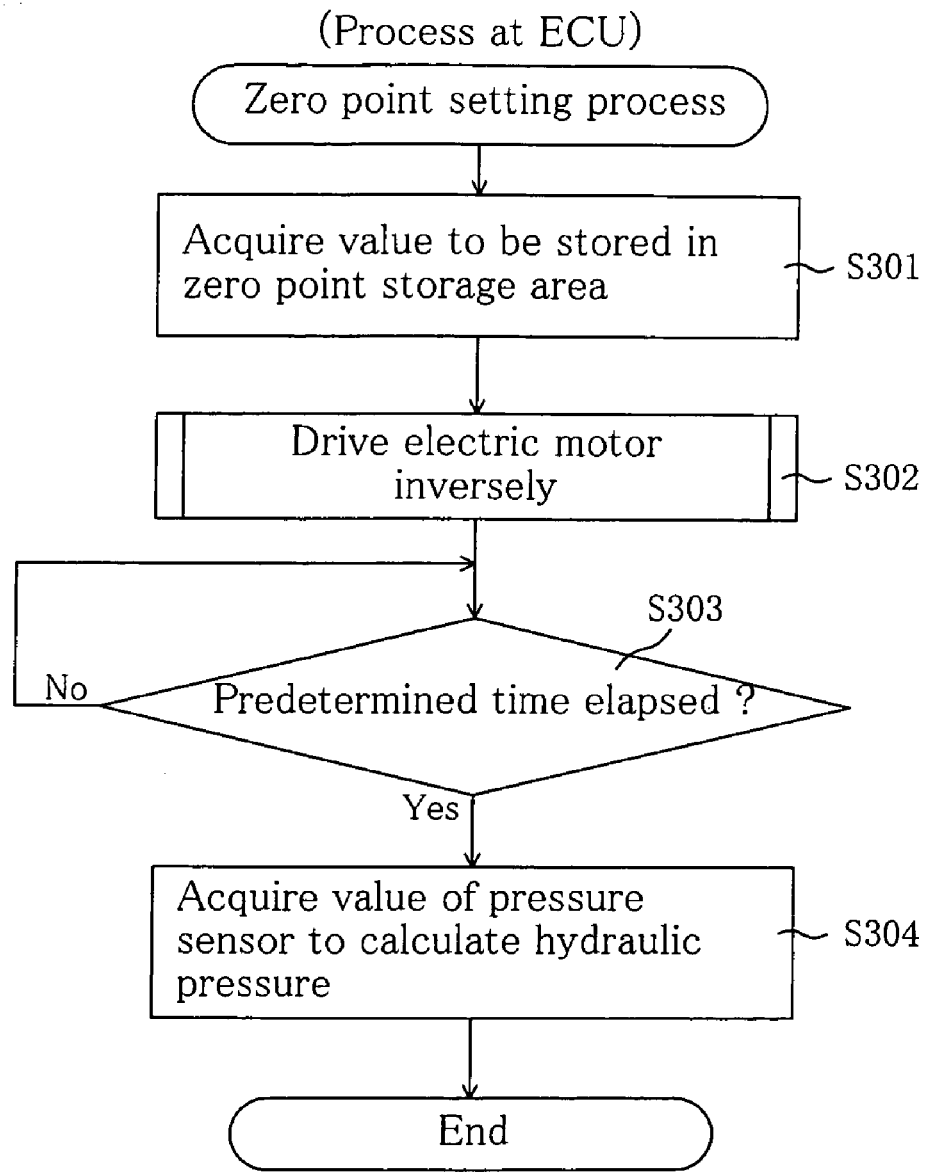
FIG. 14 is a flowchart showing a pressure sensor zero point setting process executed by a CPU according to a third embodiment.

FIG. 14 is a flowchart showing the pressure sensor zero point setting process executed by the CPU 85 according to the third embodiment. Like the pressure sensor zero point setting process in the first embodiment, the pressure sensor zero point setting process in the third embodiment is executed when the operation for starting the driving of the four-wheel-drive vehicle 1 (an operation for turning the key) or the operation for stopping the driving (the operation for inversely turning the key) from the state in which the four-wheel-drive vehicle 1 is driven is performed.

When the pressure sensor zero point setting process according to the third embodiment is executed, an initial pressure control is executed for driving the electric motors 201a and 201b in such a manner that the value stored last time in the zero point storage area 87a is firstly acquired, and the hydraulic pressure in the flow paths 220a and 220b (see FIG. 8) becomes an initial pressure with the value acquired from the zero point storage area 87a defined as a reference (S301).

In the process at S301, the hydraulic pressure in the flow paths 220a and 220b is adjusted to the initial pressure based upon the value set in the previous pressure sensor zero point setting process. However, the value for providing the hydraulic pressure (e.g., "0" or positive pressure slightly higher than "0") by which the inside of the flow paths 220a and 220b is stabilized is stored beforehand from the shape or the length of the flow paths 220a and 220b or the performance of the electric motors 201a and 201b, and the hydraulic pressure may be adjusted to the initial pressure based upon the stored value.

When the hydraulic pressure in the flow paths 220a and 220b assumes the value corresponding to the initial pressure in the process at S301, the electric motors 201a and 201b are inversely rotated, and after a predetermined time has elapsed, the electric motors 201a and 201b are stopped in the electric motor inverse rotation driving process (S302). In the third embodiment, the predetermined time for inversely rotating the electric motors 201a and 201b is 0.5 second, and during the 0.5 second, the electric motors 201a and 201b rotates twice.

When the electric motors 201a and 201b are stopped by the electric motor inverse rotation driving process in the process at S302, it is determined whether or not a predetermined time (in the present embodiment, 0.5 second) has elapsed after the electric motors 201a and 201b are stopped (S303), and the program waits until the predetermined time has elapsed (S303: No).

When it is determined in the process at S303 that the predetermined time has elapsed after the electric motors 201a and 201b are stopped (S303: Yes), the value of the pressure sensors 302a and 302b is acquired so as to calculate the hydraulic pressure in the flow paths 220a and 220b, the calculated value of the hydraulic pressure is stored in the zero point storage area 87a (S304), and then, this process is ended.

Figure 15:
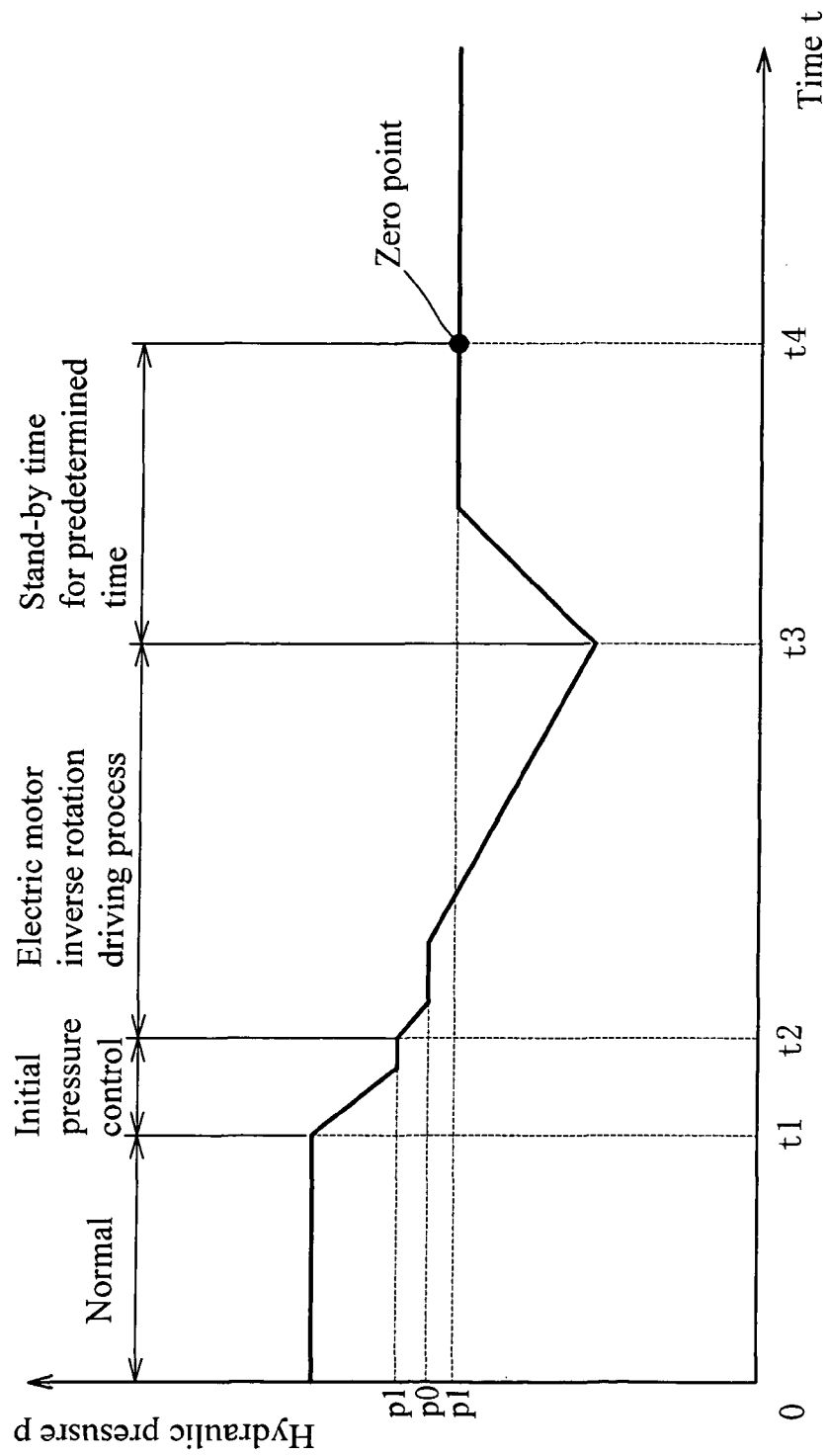
FIG. 15 is a diagram showing a relationship between a hydraulic pressure in a flow path and a time when the pressure sensor zero point setting process is executed.

FIG. 15 is a diagram showing the relationship between the hydraulic pressure p in the flow paths 220a and 220b and the time t when the pressure sensor zero point setting process is executed. The axis of abscissa in FIG. 15 indicates the time t, while the axis of ordinate indicates the change in the hydraulic pressure p in the flow paths 220a and 220b. The hydraulic pressure p0 indicates the hydraulic pressure stored in the flow paths 220a and 220b, the hydraulic pressure pI indicates the initial pressure, and hydraulic pressure p1 indicates the hydraulic pressure that newly becomes a zero point.

Firstly, the period between 0 to the time t1 will be explained. The period between 0 to the time t1 is the period before the pressure sensor zero point setting process is executed, and this is indicated as "normal" in FIG. 15.

The period between the time t1 to the time t2 is the period where the initial pressure control is executed in which the hydraulic pressure in the flow paths 220a and 220b is set to the initial pressure with the hydraulic pressure stored in the zero point storage area 87a defined as the reference, and this period is indicated as "initial pressure control" in FIG. 15. The state of the "initial pressure control" means the state in which the process at S301 in the pressure sensor zero point setting process (see FIG. 14) is executed.

The period between the time t2 to the time t3 is the period where the hydraulic pressure in the flow paths 220a and 220b is set to be negative, and after that, the electric motors 201a and 201b are stopped, and this period is indicated as "electric motor inverse rotation driving process" in FIG. 15. The period from the time t2 to the time t3 is 0.5 second in the present embodiment. The electric motors 201a and 201b are stopped at the time t3. The state of the "electric motor inverse rotation driving process" means the state in which the process at S302 in the pressure sensor zero point setting process (see FIG. 14) is executed.

The period between the time t3 to the time t4 is the stand-by period until a predetermined time has elapsed after the electric motors 201a and 201b are stopped, and this period is indicated as "stand-by for predetermined time" in FIG. 15. The period from the time t3 to the time t4 is 0.5 second in the present embodiment. The state of the "stand-by for predetermined time" means the state in which the process at S303 in the pressure sensor zero point setting process (see FIG. 14) is executed, wherein the process at S303 is determined to be No after the time t3 and before the time t4, and the process at S303 is determined to be Yes at the time t4.

The hydraulic pressure in the flow paths 220a and 220b at the time t4 is stored in the zero point storage area 87a as the zero point. As shown in the figure, it is understood that the hydraulic pressure in the flow paths 220a and 220b is stable to have a fixed value during the period of "stand-by for predetermined time".

As described above, according to the third embodiment, the period of the "electric motor inverse rotation driving process" and the period of the "stand-by for predetermined time" are set to 0.5 second respectively. This is because the pressure sensor zero point setting process is completed during the stand-by period (1.5 seconds in the present embodiment) given for the control section of the four-wheel-drive vehicle 1 to move to the starting state for the next driving, when a driver continuously performs the operation for starting the driving of the four-wheel-drive vehicle 1 (the operation for turning the key) and the operation for stopping the driving (the operation for inversely turning the key), for example. In the present embodiment, the stand-by period of the other mechanisms, e.g., the piston mechanisms 151a and 151b is also set to 1.5 seconds. Since the pressure sensor zero point setting process can surely set the zero point during the stand-by period, the zero point according to the environment of service or duration of service of the pressure sensors 302a and 302b can surely be set.

There may be the case in which the hydraulic pressure in the flow paths 220a and 220b that is not negative means that the zero point detected by the pressure sensors 302a and 302b are not passed even if the electric motors 201a and 201b are inversely rotated, and therefore, the residual pressure remains in the flow paths 220a and 220b. In this case, the hydraulic pressure in the flow paths 220a and 220b does not become constant during the period when the predetermined time has elapsed, so that the correct zero point might not be able to be set.

However, when the zero point of the pressure sensors 302a and 302b is set, the zero point previously set is read from the zero point storage area 87a, and the initial pressure control is executed with the read value defined as the reference, whereby the hydraulic pressure in the flow paths 220a and 220b can surely be set to be negative. Therefore, a new zero point of the pressure sensors 302a and 302b can correctly be set.

Normal pressure sensors 302a and 302b have a characteristic such that their precision is indicated by an error with respect to a full-scale value. Therefore, when the hydraulic pressure in the flow paths 220a and 220b is lower compared to the case in which the detected hydraulic pressure in the flow paths 220a and 220b is high, the variation in the detected hydraulic pressure increases. A highly precise control with a low torque, in particular, (i.e., when the hydraulic pressure in the flow paths 220a and 220b is low) is required to the driving force adjusting sections 60a and 60b in the four-wheel-drive vehicle 1 as in the present embodiment.

In view of this, the variation caused when the hydraulic pressure in the flow paths 220a and 220b is low can be prevented by correctly setting the zero point of the pressure sensors 302a and 302b. As a result, a control with a low torque can be performed with high precision in the driving force adjusting sections 60a and 60b of the four-wheel-drive vehicle 1.

Figure 16:
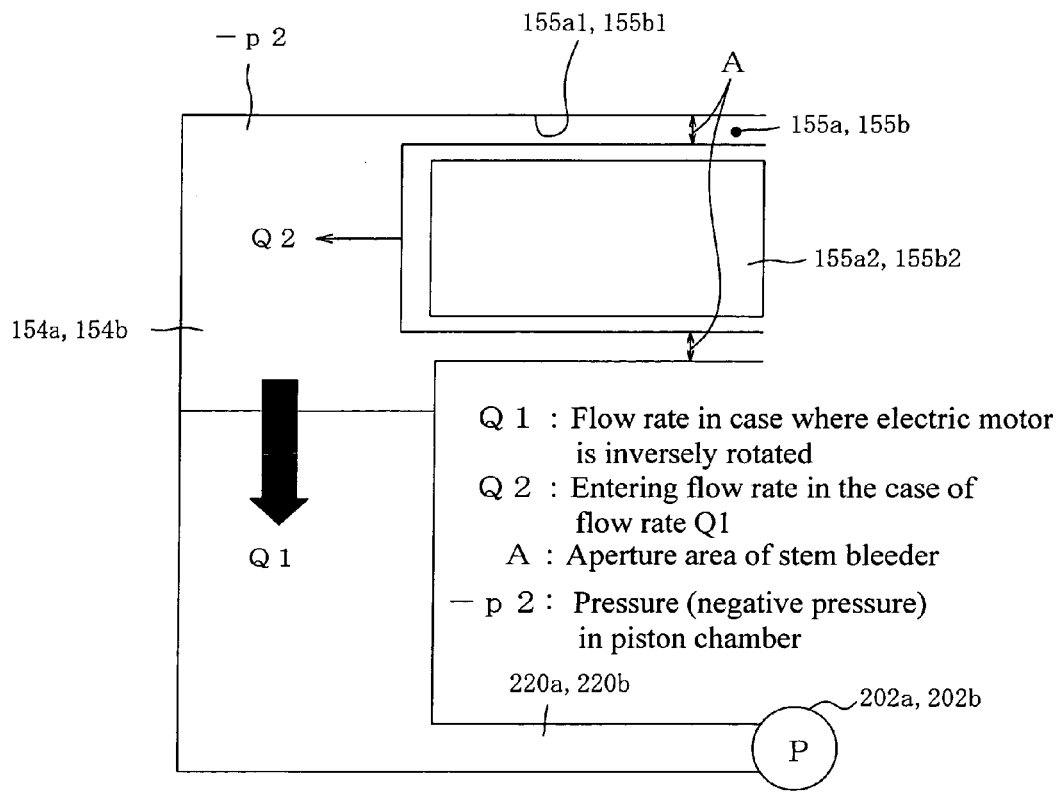
FIG. 16 is a diagram schematically showing a flow path through which oil flows according to the third embodiment.

FIG. 16 is a diagram schematically showing the flow path through which the oil flows according to the third embodiment. Specifically, FIG. 16 is a diagram schematically showing the oil pumps 202a and 202b, the flow paths 220a and 220b, the piston chambers 154a and 154b and the stem bleeders 155a and 155b. In FIG. 16, a flow rate Q1 indicates a flow rate sucked by the oil pumps 202a and 202b when the electric motors 201a and 201b are inversely rotated, while a flow rate Q2 indicates a flow rate of a gas intruded from the stem bleeders 155a and 155b when the oil with the flow rate Q1 is sucked by the oil pumps 202a and 202b. The negative pressure −p2 indicates the hydraulic pressure in the flow paths 220a and 220b, while the aperture area A indicates the total area of the opening of the stem bleeders 155a and 155b.

The flow rate Q1 can be calculated by multiplying the motor revolution (rev/sec) of the electric motors 201a and 201b by the theoretical discharge amount (cubic centimeter/rev) of the oil pumps 202a and 202b.

The stem bleeders 155a and 155b in the third embodiment have cylindrical members 155a2 and 155b2 with a column shape arranged at the inside of through-holes 151a1 and 151b1, wherein a path from which air is discharged or air enters is formed by a gap formed between the through-holes 151a1 and 151b1 and the cylindrical members 155a2 and 155b2.

When the electric motors 201a and 201b are inversely rotated in the process at S302 in the above-described pressure sensor zero point setting process (see FIG. 15), the oil pumps 202a and 202b suck the oil in a flow rate of Q1 in the flow paths 220a and 220b. In this case, air in the flow rate of Q2 enters the piston chambers 154a and 154b from the stem bleeders 155a and 155b. Therefore, the hydraulic pressure in the flow paths 220a and 220b is determined from the relationship between the Δflow rate Q1 sucked per a predetermined time (0.5 second in the present embodiment) and the Δflow rate Q2 entering per the predetermined time. Specifically, the negative pressure in the piston chambers 154a and 154b can be adjusted by setting the aperture amount of the stem bleeders 155a and 155b or the revolution of the electric motors 201a and 201b.

From the above, the revolution of the electric motors 201a and 201b and the aperture area A of the stem bleeders 155a and 155b are set so as to establish the relationship of $-p2 \propto ((Q1-Q2)/A)2$, when the hydraulic pressure in the flow paths 220a and 220b is adjusted to the negative pressure $-p2$.

The pressure sensors 302a and 302b used in the present embodiment have excellent counter-pressure performance with respect to a positive pressure, but poor counter-pressure performance with respect to a negative pressure. This is because commercially available pressure sensors 302a and 302b are used for reducing a cost.

Therefore, when the hydraulic pressure in the flow paths 220a and 220b is set to be extremely low negative pressure, the pressure sensors 302a and 302b might be broken, or a correct hydraulic pressure might not be able to be detected. Accordingly, even when the flow paths 220a and 220b are set to temporarily have a negative pressure, the hydraulic pressure in the flow paths 220a and 220b cannot be set to the hydraulic pressure lower than the negative pressure detectable by the pressure sensors 302a and 302b.

In the present embodiment, the electric motors 201a and 201b are set to have the revolution by which they rotate twice in 0.5 second, and the stem bleeders 155a and 155b are composed of the through-holes 151a1 and 151b1 having the diameter of 10 mm and the cylindrical members 151a2 and 151b2 having the diameter of 9 mm. Specifically, the electric motors 201a and 201b are driven with the revolution of 4 rev/sec, and the aperture opening A of the stem bleeders 155a and 155b is formed to be $2\pi \times ((10/2)2-(9/2)2)$.

The relationship between the revolution of the electric motors 201a and 201b and the aperture area of the stem bleeders 155a and 155b may take any combinations so long as the revolution is within the range of 2 to 200 rev/sec and the aperture area is within $0.2\pi$ to $20\pi$. The above-described range is only one example, and any revolution and any aperture area may be employed so long as the hydraulic pressure in the flow paths 220a and 220b can be adjusted to a predetermined negative pressure in a predetermined period, even if the revolution and the aperture area are outside the above-described range.

The period from the time t3 to the time t4 that is the stand-by period after the motors are stopped is set to be more than the time taken for the air to be flown from the stem bleeders 155a and 155b in order to make the internal pressure to "0" with the hydraulic pressure in the piston chambers 154a and 154b adjusted to the negative pressure $-p2$.

Next, a fourth embodiment will be explained with reference to FIG. 17. In the first embodiment, the hydraulic pressure detected by the pressure sensors 302a and 302b in the state in which the four-wheel-drive vehicle 1 starts to be driven and the hydraulic pressure is not applied to the flow paths 220a and 220b (the electric motors 201a and 201b are not driven) is stored in the zero point storage area 87a, and in the third embodiment, the electric motors 201a and 201b are inversely rotated for the predetermined time (in the present embodiment, 0.5 second), and the hydraulic pressure detected by the pressure sensors 302a and 302b after the predetermined time (in the present embodiment, 0.5 second) has elapsed is stored in the zero point storage area 87a. Instead of this, in the fourth embodiment, a total revolution is set as a driving condition of the electric motors 201a and 201b for inversely rotating the electric motors 201a and 201b. The components in the fourth embodiment same as those in the first and third embodiments are identified by the same numerals, and the explanation thereof is omitted.

Figure 17:
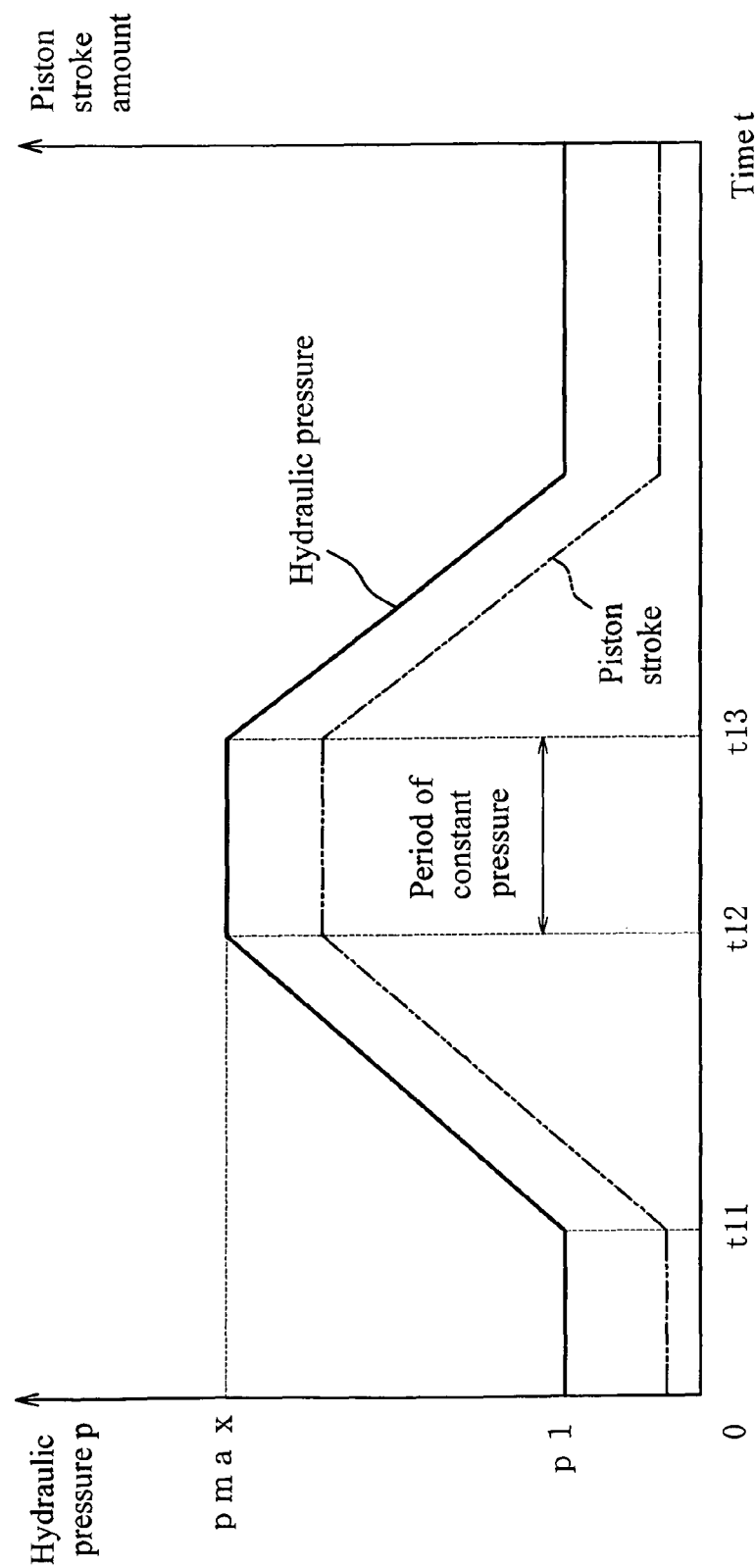
FIG. 17 is a diagram showing a relationship between the hydraulic pressure in the flow path as well as a stroke amount of a piston and a time, when an electric motor is normally rotated.

FIG. 17 is a diagram showing a relationship between the hydraulic pressure p in the flow paths 220a and 220b as well as a stroke amount of the pistons 153a and 153b and the time t.

The solid line in FIG. 17 indicates the hydraulic pressure p in the flow paths 220a and 220b, while two-dot-chain line indicates the stroke amount of the piston 153a and 153b. The hydraulic pressure p1 is the hydraulic pressure in the flow paths 220a and 220b in the normal state, while the hydraulic pressure pmax is the hydraulic pressure in the flow paths 220a and 220b when the piston mechanisms 151a and 151b are operated with the maximum stroke.

Firstly, the electric motors 201a and 201b are driven at the time t11 so as to feed the oil into the flow paths 220a and 220b by the oil pumps 202a and 202b. Therefore, during the period from the time t11 to the time t12, the hydraulic pressure in the flow paths 220a and 220b gradually rises and the clutch mechanisms 100a and 100b are deflected by the pressing force due to the pressure, so that the stroke amount of the pistons 153a and 153b gradually increases.

During the period from the time t12 to the time t13, the hydraulic pressure p in the flow paths 220a and 220b becomes the maximum hydraulic pressure pmax, wherein this hydraulic pressure is kept constant, and the stroke amount of the pistons 153a and 153b is fixed to be unchanged.

After the time t13, the hydraulic pressure p in the flow paths 220a and 220b gradually decreases as shown in the figure, and finally assumes the hydraulic pressure p1.

In order to decrease the pressure in the flow paths 220a and 220b to "0" in the fourth embodiment, the oil in the amount corresponding to the stroke of the pistons 153a and 153b due to the deflection of the clutch mechanisms 100a and 100b should be sucked from the flow paths 220a and 220b. Therefore, when the flow paths 220a and 220b are set to have the negative pressure in the pressure sensor zero point setting process, the electric motors are inversely rotated by the revolution more than the amount of the sucked oil. The revolution speed of the electric motors 201a and 201b is set to the same as the revolution speed in the normal rotation.

Consequently, according to the fourth embodiment, even if the hydraulic pressure in the flow paths 220a and 220b is the maximum hydraulic pressure pmax, the oil in the amount more than the flow rate fed from the oil pump 202a and 202b can be sucked in order to achieve the hydraulic pressure pmax. Therefore, when the electric motor inverse rotation driving process is executed, the flow paths 220a and 220b can surely be set to have a negative pressure, whereby a new zero point of the pressure sensors 302a and 302b can correctly be set.

Subsequently, a fifth embodiment will be explained with reference to FIG. 18. In the first embodiment, the pressure sensor 302a is mounted to the pressure detecting path 301a. Instead of this, in the third embodiment, the pressure sensor 302a is mounted to the first supply path 211a. Therefore, the fifth embodiment has the configuration same as that of the first embodiment except for the mounting position of the pressure sensor 302a, so that the components same as those in the first embodiment are identified by the same numerals, and the explanation thereof is omitted.

Figure 18:
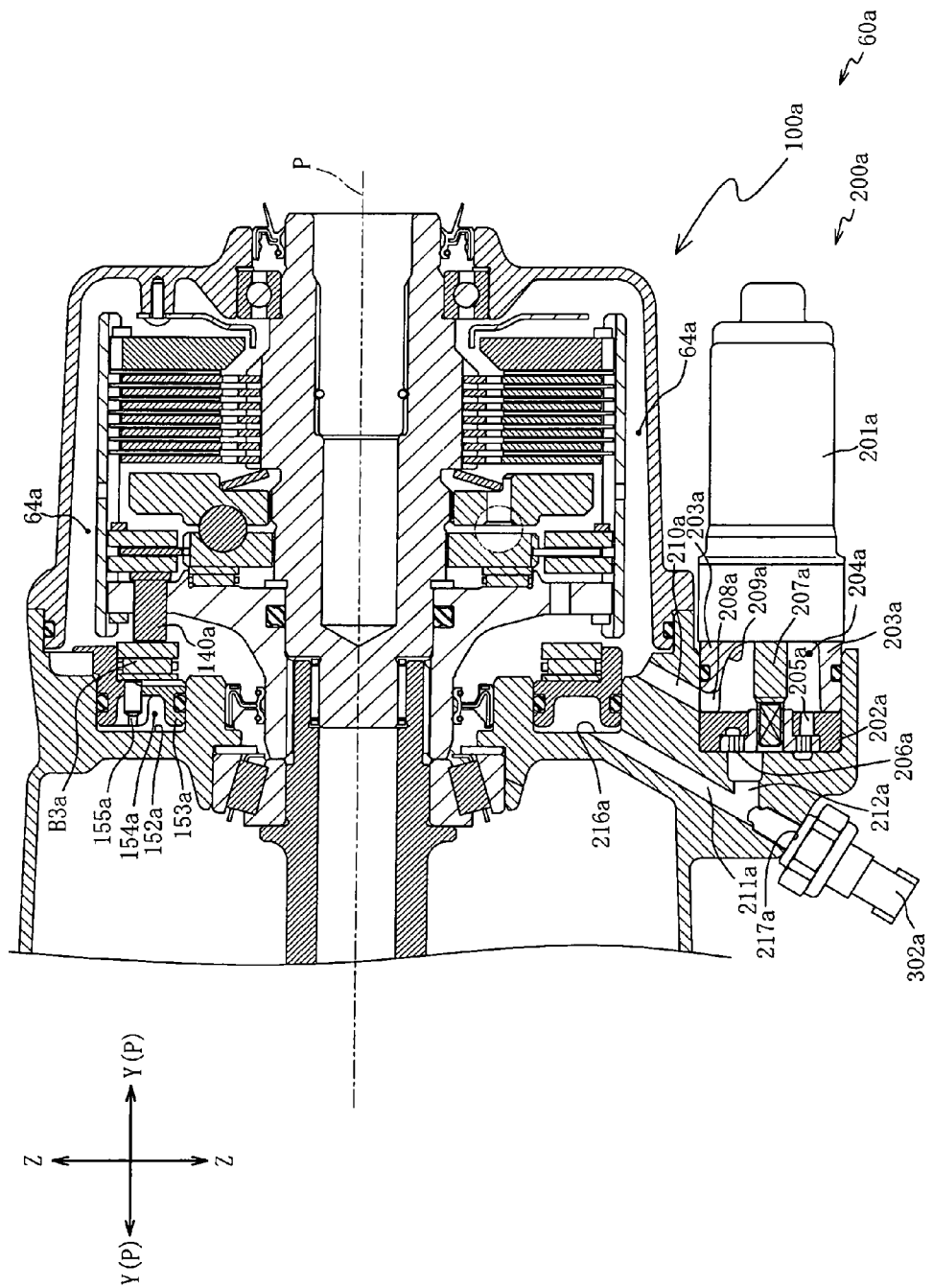
FIG. 18 is a sectional view showing a driving force adjusting mechanism according to a fifth embodiment.

FIG. 18 is a sectional view showing the driving force adjusting mechanism 60a in the fifth embodiment. The numerals in the driving force adjusting mechanism 60a are omitted in the illustration in FIG. 18. An arrow Y in FIG. 18 indicates the side-to-side direction of the four-wheel-drive vehicle 1 and the rotation axial direction P of the driving force adjusting mechanisms 60a and 60b, while an arrow Z indicates the vertical direction of the four-wheel-drive vehicle 1.

As shown in FIG. 18, the pressure sensor 302a is mounted to a second mounting opening 217a that is formed at the lower end (lower end in the Z direction in FIG. 18) of the first supply path 211a, which is the position symmetric with the second opening 216a continuously formed with the upper end (upper end in the Z direction in FIG. 18) of the first supply path 211a. In this case, a buried cap screw for shielding the lower end of the first supply path 211a is unnecessary, whereby the number of components can be reduced, and the cost can be reduced. Further, the first supply path 211a can be shielded to the outside only by mounting the pressure sensor 302a, so that the production process can be reduced, and the cost can be reduced. Since the third embodiment does not need the pressure detecting path 301a, labor for processing is eliminated, and the cost can be reduced.

Although the present invention is explained on the basis of the embodiments, it can easily be predicted that the present invention is not limited to the above-mentioned embodiments, and various modifications are possible without departing from the spirit of the present invention.

For example, the numerical values (e.g., the number, size, angle, etc. of each component) illustrated in each embodiment are only illustrative, and other numerical values can naturally be employed.

In the above-described embodiments, the stem bleeders 155a and 155b are formed to the upper part of the piston main body 153a adjacent to the piston chamber 154a. However, it is not necessarily formed to the upper part of the piston main body 153a, but may be mounted to the uppermost part of the piston main body 153a, for example. In this case, the gas (air) is smoothly discharged without being stayed, the oil having the volume same as the amount of change of the volume of the gas (air) by the hydraulic pressure of the oil does not need to be press-fed, and hence, the damper effect can be reduced. Consequently, the hydraulic pressure of the oil fed by the oil pump 202a can quickly be stabilized. If the stem bleeder 155a may be provided above the pressure sensor 302a, the pressure sensor 302a is always present in the oil. Therefore, the stem bleeder 155a may be formed to any positions at least above the pressure sensor 302a.

In the above-described embodiments, a disc spring is used for the release mechanism 171a. However, a disc spring is not necessarily used for the release mechanism 171a, but an annular rubber elastic member may be employed, for example.

In the second and fourth embodiments, the flow paths 220a and 220b are set to have a negative pressure, and then, the hydraulic pressure detected by the pressure sensors 302a and 302b after a predetermined time has elapsed is set as a zero point according to the electric motor inverse rotation driving process. Therefore, the pressure sensor zero point setting process may be executed not only at the timing when the four-wheel-drive vehicle 1 is started to be driven or stopped, but also at any optional timings during the driving of the four-wheel-drive vehicle 1. With this configuration, the zero point according to environment of service or duration of service of the pressure sensors 302a and 302b can be set during a short period, whereby the hydraulic pressure in the flow paths 220a and 220b can correctly be adjusted.

In the above-described embodiments, a temperature sensor (temperature detecting means) for detecting the temperature in the vicinity of the pressure sensors 302a and 302b may be provided. With this configuration, the value detected by the pressure sensors 302a and 302b can be corrected according to the temperature (hydraulic pressure temperature correcting means), whereby the hydraulic pressure in the flow paths 220a and 220b can be set to the desired hydraulic pressure, and the zero point can correctly be set.

A modification of the driving force transmitting device and liquid feeding device according to the present invention will be described below.

A driving force transmitting device A1 including an engine that generates a driving force, an input shaft to which the driving force generated by the engine is inputted, an output shaft to which the driving force inputted to the input shaft is outputted, and a clutch mechanism that couples the output shaft and the input shaft, the driving force transmitting device including a multiple disc clutch that is provided to the clutch mechanism and can couple the input shaft side and the output shaft side, a piston member that couples the input shaft side and the output shaft side by pressing the multiple disc clutch, a supply path to which a hydraulic pressure for driving the piston member is supplied, detecting means for detecting the hydraulic pressure in the supply path, hydraulic pressure supplying means that supplies the hydraulic pressure supplied to the supply path or stops the supply on the basis of the result of the detection by the detecting means, and a discharge port from which at least a gas, among the liquid and gas in the supply path, is discharged, wherein the detecting means is provided below the discharge port in the perpendicular direction and at the position lower than the lowermost fluid level when the fluid level in the supply path changes with ON and Off of the supply of the hydraulic pressure by the hydraulic pressure supplying means.

A driving force transmitting device A2 characterized in that, in the driving force transmitting device A1, the supply path includes a supply chamber formed so as to be adjacent to the piston member and to which the hydraulic pressure for driving the piston member is supplied, and a communication path that is formed at the downstream side from the supply chamber for communicating the supply chamber and the hydraulic pressure supplying means, wherein the detecting means detects the hydraulic pressure supplied to the supply chamber through the communication path.

A driving force transmitting device A3 characterized, in the driving force transmitting device A1 or A2, by including a mounting path that communicates with the supply path and to which the detecting means is mounted, wherein the mounting path is formed so as to be upwardly tilted toward the opening communicating with the supply path from the detecting means with respect to the horizontal direction.

A driving force transmitting device A4 characterized in that, in the driving force transmitting device A3, the mounting path has formed thereto an opening that communicates with the supply path and a mounting opening that is symmetrically formed with respect to the opening and to which the detecting means is mounted, wherein the mounting opening is formed to have a shape that is sealed when the detecting means is mounted.

A driving force transmitting device A5 characterized in that, in any one of the driving force transmitting devices A1 to A4, the supply path includes a supply chamber formed so as to be adjacent to the piston member and to which the hydraulic pressure for driving the piston member is supplied, and a communication path that is formed at the downstream side from the supply chamber for communicating the supply chamber and the hydraulic pressure supplying means, wherein the discharge port is formed above the supply chamber or at the upper part of the supply chamber.

A driving force transmitting device A6 characterized in that, in any one of the driving force transmitting devices A1 to A5, the clutch mechanism includes a primary clutch (first multiple disc clutch) that is pressed by the piston member, an amplifying mechanism that amplifies the press-contact force of the piston member by the cam mechanism when the primary clutch (first multiple disc clutch) is engaged, and a main clutch (second multiple disc clutch) that is pressed by the press-contact force amplified by the amplifying mechanism for transmitting the driving force through the engagement between the input shaft and the output shaft, wherein the piston member, the primary clutch (first multiple disc clutch), the amplifying mechanism, and the main clutch (second multiple disc clutch) are arranged in this order from the input shaft side to the output shaft side, and the direction in which the piston member, the primary clutch (first multiple disc clutch), the amplifying mechanism, and the main clutch (second multiple disc clutch) are arranged is set to be the same as the direction in which the piston member is driven.

A liquid feeding device B1 including a flow path through which a liquid flows, a liquid storage chamber that stores the liquid flowing through the flow path, liquid feeding means that feeds the liquid stored in the liquid storage chamber to the flow path, and driving means that applies to the liquid feeding means a driving force for feeding the liquid stored in the liquid storage chamber to the flow path, wherein the liquid storage chamber is arranged between the liquid feeding means and the driving means and arranged so as to be adjacent to the liquid feeding means and the driving means respectively.

A liquid feeding device B2 characterized, in the liquid feeding device B1, by including driving force transmitting means that couples the liquid feeding means and the driving means for transmitting the driving force applied by the driving means to the liquid feeding means, wherein the driving force transmitting means is arranged in the liquid storage chamber.

A liquid feeding device B3 characterized, in the liquid feeding device B1 or B2, by including a discharge port from which the liquid fed to the flow path is discharged, and a circulation path that is circulated to the liquid storage chamber, wherein the liquid feeding means, the liquid storage chamber, and the driving means are arranged side by side in the horizontal direction, the circulation path communicates with an upper opening formed at the upper part of the liquid storage chamber, and the flow path communicates with a side opening formed at the side of the liquid storage chamber.

A liquid feeding device B4 characterized in that, in the liquid feeding device B3, the side opening is formed at the lower part of the liquid storage chamber in the perpendicular direction.

A liquid feeding device B5 characterized, in the liquid feeding device B3 or B4, by including a tilt surface that is formed in the liquid storage chamber so as to be upwardly tilted from the side portion of at least the driving means or the liquid feeding means toward the upper opening communicating with the circulation path.

A liquid feeding device B6 characterized, in any one of the liquid feeding devices B1 to B5, by including a driving force transmitting device including an engine that generates a driving force, an input shaft to which the driving force generated by the engine is inputted, an output shaft to which the driving force inputted to the input shaft is outputted, a clutch mechanism that couples the output shaft and the input shaft, and a piston member that presses the clutch mechanism so as to couple the input shaft and the output shaft, wherein the flow path communicates with a supply chamber to which the hydraulic pressure for driving the piston member is supplied.

A driving force transmitting device C1 including an engine that generates a driving force, an input shaft to which the driving force generated by the engine is inputted, an output shaft to which the driving force inputted to the input shaft is outputted, and a clutch mechanism that couples the output shaft and the input shaft, the driving force transmitting device including a primary clutch that intermittently transmits the driving force transmitted from the input shaft where the primary clutch is located between the input shaft and the main clutch, a hydraulic pump that generates a hydraulic pressure, a piston that presses the primary clutch with the hydraulic pressure generated by the hydraulic pump, and a cam mechanism that is fitted to the primary clutch, and that presses the main clutch with the press-contact force, which is amplified to be larger than the press-contact force of the piston, by utilizing the driving force inputted from the input shaft through the primary clutch with the primary clutch engaged by the piston, so as to engage the main clutch.

A driving force transmitting device C2 characterized, in the driving force transmitting device C1, by including an electric motor for driving the hydraulic pump, hydraulic pressure detecting means for detecting the hydraulic pressure in the supply path communicating with the piston from the hydraulic pump, and control means for controlling the electric motor on the basis of the result of the detection by the hydraulic pressure detecting means.

A driving force transmitting device C3 characterized in that, in the driving force transmitting device C2, the cam mechanism includes a primary cam that is fitted to the primary clutch, a main cam that is arranged so as to be opposite to the primary cam, and is fitted so as to be movable with respect to the output shaft for pressing the main clutch, a cam follower that is movably arranged between the main cam and the primary cam, and a cam groove that is a moving path of the cam follower and is formed on at least one of the surface of the main cam opposite to the primary cam and the surface of the primary cam opposite to the main cam in such a manner that the depth thereof continuously changes.

A driving force transmitting device C4 characterized, in the driving force transmitting device C3, by including a biasing member that is arranged between the main clutch and the main cam for biasing the main cam in the direction reverse to the direction in which the main cam presses the main clutch.

A driving force transmitting device C5 characterized in that, in the driving force transmitting device C4, wherein the control means controls the electric motor such that an initial pressure necessary for filling the supply path with the liquid or the initial pressure greater than the sliding resistance of the piston in order to prevent the backlash of the primary clutch is always applied to the liquid in the supply path.

A driving force transmitting device C6 characterized in that, in the driving force transmitting device C5, wherein the initial pressure is set to be smaller than the biasing force of the biasing member for biasing the main cam.

A driving force transmitting device C7 characterized in that, in the driving force transmitting device C6, wherein the main clutch, the primary clutch, the piston, the cam mechanism, the output shaft, and the biasing member are arranged at both sides across the input shaft, wherein each of the output shafts is a rear wheel axle to which a rear wheel is mounted, and the device includes a gear mechanism that is coupled to the input shaft, and has having set thereto a transmission gear ratio for rotating the input shaft with the speed higher than the speed of at least one of a pair of front wheel axles to which each of a pair of front wheels is mounted.

A driving force transmitting device C8 characterized in that, in any one of the driving force transmitting devices C4 to C7, wherein the biasing member is composed of a disc spring that penetrates the output shaft.

A driving force transmitting device C9 characterized in that, in any one of the driving force transmitting devices C1 to C8, wherein a friction member of the primary clutch is made of a sheet material.

A driving force transmitting device D1 including an engine that generates a driving force, an input shaft to which the driving force generated by the engine is inputted, an output shaft to which the driving force inputted to the input shaft is outputted, and a clutch mechanism that couples the output shaft and the input shaft, the driving force transmitting device including a primary clutch that intermittently transmits the driving force transmitted from the input shaft where the primary clutch is located between the input shaft and the main clutch, a hub through which the input shaft is inserted where the hub is located between the input shaft and the primary clutch, a hydraulic pump that generates a hydraulic pressure, a piston that is arranged at the position where the hub is sandwiched between the piston and the primary clutch and is operated with the hydraulic pressure generated by the hydraulic pump, a first pressing member that rotatably connects the piston and the primary clutch through the hub for pressing the primary clutch by the press-contact force of the piston, a cam mechanism that is arranged so as to be opposite to the hub at the position where the hub is sandwiched between the cam mechanism and the piston, is fitted to the primary clutch, and that presses the main clutch with the press-contact force, which is amplified to be larger than the press-contact force of the piston, by utilizing the driving force inputted from the input shaft through the primary clutch with the primary clutch engaged by the first pressing member, so as to engage the main clutch, and a second pressing member that rotatably connects the cam mechanism and the hub, and presses the hub with a reaction force generated on the cam mechanism by the press-contact of the main clutch by the cam mechanism.

A driving force transmitting device D2 characterized, in the driving force transmitting devices D1, by including a cylindrical clutch drum that encloses the hub, the primary clutch, the cam mechanism, and the main clutch, and is respectively fitted to the hub, the primary clutch, and the main clutch, and a support plate that is fitted to the clutch drum at the side reverse to the side fitted to the hub, and hangs down at the position opposite to the main clutch.

A driving force transmitting device D3 characterized in that, in the driving force transmitting devices D1 or D2, the cam mechanism includes a primary cam that is fitted to the primary clutch, a main cam that is arranged so as to be opposite to the primary cam, and is fitted so as to be movable with respect to the output shaft for pressing the main clutch, a cam follower that is movably arranged between the main cam and the primary cam, and a cam groove that is a moving path of the cam follower and is formed on at least one of the surface of the main cam opposite to the primary cam and the surface of the primary cam opposite to the main cam in such a manner that the depth thereof continuously changes.

Here, in the present embodiment, the process at S102 in FIG. 11 and the process at S304 in FIG. 16 correspond to the initial value setting means in claim 19, the process at S204 in FIG. 12 corresponds to the correcting means in claim 10, the process at S209 in FIG. 12 corresponds to the hydraulic pressure adjusting means in claim 10, the process at S302 in FIG. 16 corresponds to the negative pressure generating means in claim 11, the process at S303 in FIG. 16 corresponds to the time determining means in claim 11, and the process at S301 in FIG. 16 corresponds to the hydraulic pressure initial value adjusting means in claim 12.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A driving force transmitting device mounted on a vehicle including a power plant that is an engine to generate a driving force, an input shaft to which the driving force generated by the engine is inputted, an output shaft to which the driving force inputted to the input shaft is outputted, and a main clutch that intermittently transmits the driving force from the output shaft, comprising:
a primary clutch that intermittently transmits the driving force from the input shaft where the primary clutch is located between the input shaft and the main clutch;
a hydraulic pump that generates a hydraulic pressure;
a piston that presses the primary clutch with the hydraulic pressure generated by the hydraulic pump;
a cam mechanism that is fitted to the primary clutch to press the main clutch with a press-contact force amplified larger than a press-contact force of the piston by utilizing the driving force inputted from the input shaft through the primary clutch with the primary clutch engaged by the piston, so as to engage the main clutch;
an electric motor for driving the hydraulic pump;
hydraulic pressure detecting means for detecting the hydraulic pressure in a supply path communicating with the piston from the hydraulic pump; and
control means for controlling the electric motor on the basis of the hydraulic pressure detected by the hydraulic pressure detecting means.

2. The driving force transmitting device according to claim 1, wherein the cam mechanism includes:
a primary cam that is fitted to the primary clutch;
a main cam that is arranged opposite to the primary cam and fitted to the output shaft to be movable for pressing the main clutch;
a cam follower arranged between the main cam and the primary cam to be movable; and
a cam groove that is a moving path of the cam follower and is formed on at least one of a surface of the main cam opposite to the primary cam and a surface of the primary cam opposite to the main cam in such a manner that a depth thereof continuously changes.

3. The driving force transmitting device according to claim 2, further comprising:
a biasing member that is arranged between the main clutch and the main cam for biasing the main cam in a direction reverse to a direction in which the main cam presses the main clutch.

4. The driving force transmitting device according to claim 3, wherein the control means controls the electric motor such that an initial pressure necessary for filling the supply path with liquid or an initial pressure greater than sliding resistance of the piston in order to prevent backlash of the primary clutch is always applied to the liquid in the supply path.

5. The driving force transmitting device according to claim 4, wherein the initial pressure is set to be smaller than a biasing force of the biasing member for biasing the main cam.

6. The driving force transmitting device according to claim 5, wherein:
two sets of components each set including the main clutch, the primary clutch, the piston, the cam mechanism, the output shaft, and the biasing member are arranged at both sides across the input shaft;
each output shaft is a rear wheel axle to which a rear wheel is mounted; and
the driving force transmitting device further includes a gear mechanism that is coupled to the input shaft, the gear mechanism being set with a transmission gear ratio for rotating the input shaft with a speed higher than a speed of at least one of a pair of front wheel axles to which each of a pair of front wheels is mounted.

7. The driving force transmitting device according to claim 3, wherein the biasing member is composed of a disc spring into which the output shaft is inserted.

8. The driving force transmitting device according to claim 1, wherein a friction member of the primary clutch is made of a sheet material.

9. The driving force transmitting device according to claim 1, wherein the control means includes:
initial value setting means for setting the hydraulic pressure detected by the hydraulic pressure detecting means with the electric motor stopped as an initial value detected by the hydraulic pressure detecting means;
correcting means for correcting the hydraulic pressure detected by the hydraulic pressure detecting means on the basis of the initial value set by the initial value setting means; and
hydraulic pressure adjusting means that adjusts the hydraulic pressure of liquid fed to the supply path from the hydraulic pump by driving or stopping the electric motor on the basis of the hydraulic pressure corrected by the correcting means, so as to adjust the hydraulic pressure in the supply path.

10. The driving force transmitting device according to claim 9, wherein the initial value setting means includes:
negative pressure generating means that sucks the liquid in the supply path by the hydraulic pump by inversely rotating the electric motor so as to adjust the hydraulic pressure in the supply path to a negative pressure; and
time determining means that determines whether or not a predetermined time has elapsed after the hydraulic pressure in the supply path is adjusted to the negative pressure by the negative pressure generating means and the inverse rotation of the electric motor is stopped, wherein
when the time determining means determines that the predetermined time has elapsed, the hydraulic pressure detected by the hydraulic pressure detecting means is set as the initial value detected by the hydraulic pressure detecting means.

11. The driving force transmitting device according to claim 10, wherein:
the initial value setting means includes hydraulic pressure initial value adjusting means that adjusts the hydraulic pressure in the supply path to the hydraulic pressure corresponding to the initial value set beforehand by rotating the electric motor; and
the negative pressure generating means inversely rotates the electric motor to adjust the hydraulic pressure in the supply path to the negative pressure after the hydraulic pressure in the supply path is adjusted to the hydraulic pressure corresponding to the initial value by the hydraulic pressure initial value adjusting means.

12. The driving force transmitting device according to claim 10, wherein:
a minimum value of the negative pressure by which the hydraulic pressure detecting means can be used concerning durability is set beforehand to the hydraulic pressure detecting means; and
the negative pressure generating means sets a driving condition of the electric motor such that the hydraulic pressure in the supply path assumes a value greater than the minimum value of the negative pressure by which the hydraulic pressure detecting means can be used.

13. The driving force transmitting device according to claim 10, wherein:
a stand-by time of the electric motor necessary for a period from a time when the electric motor is started to be driven to a time when the electric motor is stopped is determined; and
the negative pressure generating means sets a driving condition of the electric motor such that the time from when the electric motor is inversely rotated to the time when the predetermined time has elapsed after the stop of the electric motor is within the stand-by time.

14. The driving force transmitting device according to claim 10, wherein:
a minimum value of the negative pressure by which the hydraulic pressure detecting means can be used concerning durability is set beforehand to the hydraulic pressure detecting means; and
the supply path has a communication opening that communicates the supply path and an outer air chamber,
wherein an amount of the communication opening is set such that, when the electric motor is inversely rotated, the hydraulic pressure in the supply path, which is determined on the basis of a first flow rate sucked from the supply path by the hydraulic pump and a second flow rate of air entering the supply path from the communication opening, becomes the value greater than the minimum value of the negative pressure that can be used by the hydraulic pressure detecting means.

15. The driving force transmitting device according to claim 10, wherein:
a stand-by time of the electric motor necessary for a period from a time when the electric motor is started to be driven to a time when the electric motor is stopped is determined; and
the supply path has a communication opening that communicates the supply path and an outer air chamber, wherein
an amount of the communication opening is set such that a time taken for air to be flown from the communication opening and for the pressure in the supply path to be recovered to an atmospheric pressure after the stop of the electric motor after the electric motor is inversely rotated is within the stand-by time.

16. The driving force transmitting device according to claim 9, further comprising:
instruction detecting means that detects an instruction for starting or stopping the transmission of the driving force from the input shaft to the output shaft by the main clutch or the primary clutch, wherein
the initial value setting means sets the initial value by detecting the hydraulic pressure by the hydraulic pressure detecting means every time the instruction detecting means detects the instruction for starting the transmission of the driving force or every time the instruction detecting means detects the instruction for stopping the transmission of the driving force.

17. The driving force transmitting device according to claim 9, wherein the negative pressure generating means inversely rotates the electric motor such that, when the electric motor is normally rotated to move the piston in a maximum moving amount, the liquid in a flow rate greater than a third flow rate that is supplied in the supply path is sucked from the supply path.

18. The driving force transmitting device according to claim 9, further comprising:

temperature detecting means for detecting a temperature in the vicinity where the hydraulic pressure detecting means is provided; and hydraulic pressure temperature correcting means for correcting the hydraulic pressure detected by the hydraulic pressure detecting means according to the temperature detected by the temperature detecting means.

\* \* \* \* \*